US012465624B2

(12) United States Patent
Steinmetz et al.

(10) Patent No.: US 12,465,624 B2
(45) Date of Patent: Nov. 11, 2025

(54) CANCER IMMUNOTHERAPY USING VIRUS PARTICLES AND IMMUNE CHECKPOINT THERAPY

(71) Applicant: CASE WESTERN RESERVE UNIVERSITY, Cleveland, OH (US)

(72) Inventors: Nicole F. Steinmetz, San Diego, CA (US); Chao Wang, Cleveland, OH (US)

(73) Assignee: CASE WESTERN RESERVE UNIVERSITY, Cleveland, OH (US)

(*) Notice: Subject to any disclaimer, the term of this patent is extended or adjusted under 35 U.S.C. 154(b) by 1162 days.

(21) Appl. No.: 17/369,405

(22) Filed: Jul. 7, 2021

(65) Prior Publication Data

US 2021/0361728 A1    Nov. 25, 2021

Related U.S. Application Data

(63) Continuation-in-part of application No. 16/612,214, filed as application No. PCT/US2018/031661 on May 8, 2018, now Pat. No. 11,617,787.

(60) Provisional application No. 63/049,434, filed on Jul. 8, 2020.

(51) Int. Cl.

| A61K 39/12 | (2006.01) |
| A61K 35/768 | (2015.01) |
| A61K 39/125 | (2006.01) |
| A61K 39/295 | (2006.01) |
| A61P 35/00 | (2006.01) |
| C07K 16/28 | (2006.01) |
| C12N 7/00 | (2006.01) |
| A61K 39/00 | (2006.01) |

(52) U.S. Cl.
CPC ............ *A61K 35/768* (2013.01); *A61P 35/00* (2018.01); *C07K 16/2818* (2013.01); *C12N 7/00* (2013.01); *A61K 2039/505* (2013.01); *A61K 2039/54* (2013.01)

(58) Field of Classification Search
CPC .......... A61P 35/00; A61P 35/04; A61P 31/14; A61K 2039/585; A61K 2039/5258
See application file for complete search history.

(56) References Cited

U.S. PATENT DOCUMENTS

| 5,004,606 A | 4/1991 | Frincke |
| 9,925,281 B2 | 3/2018 | Steinmetz et al. |
| 10,086,095 B2 | 10/2018 | Steinmetz et al. |
| 10,207,014 B2 | 2/2019 | Steinmetz et al. |
| 10,478,510 B2 | 11/2019 | Steinmetz |
| 10,765,710 B2 * | 9/2020 | Zitvogel ............... A61K 39/00 |
| 11,020,497 B2 | 6/2021 | Steinmetz et al. |
| 11,167,047 B2 | 11/2021 | Steinmetz et al. |
| 11,253,610 B2 | 2/2022 | Steinmetz |
| 2005/0019270 A1 | 1/2005 | Finlay et al. |
| 2007/0248617 A1 | 10/2007 | Bachmann et al. |
| 2007/0258889 A1 | 11/2007 | Douglas et al. |
| 2007/0284545 A1 | 12/2007 | Isacsson et al. |
| 2010/0183504 A1 | 7/2010 | Chen |
| 2015/0033418 A1 | 1/2015 | Lommel et al. |
| 2015/0265696 A1 | 9/2015 | Gourapura et al. |
| 2020/0179468 A1 | 6/2020 | Steinmetz |
| 2022/0211881 A1 | 7/2022 | Steinmetz |

FOREIGN PATENT DOCUMENTS

| JP | 2009524699 A | 7/2009 |
| WO | 200118199 A1 | 3/2001 |
| WO | 01/26682 A2 | 4/2001 |
| WO | 01/18199 A1 | 9/2002 |
| WO | 2003092623 A2 | 11/2003 |
| WO | 2012078069 A1 | 6/2012 |
| WO | 2013181557 A1 | 12/2013 |
| WO | 2014059021 A1 | 4/2014 |
| WO | 2015/188110 A1 | 12/2015 |
| WO | 2016019393 A1 | 2/2016 |
| WO | 2016/073972 A1 | 5/2016 |
| WO | 2016/149264 A1 | 9/2016 |
| WO | 2017/004123 A1 | 1/2017 |

OTHER PUBLICATIONS

Agrawal Arpita et al: "Differential Uptake of Chemically Modified Cowpea Mosaic Virus Nanoparticles in Macrophage Subpopulations Present in Inflammatory and Tumor Microenvironments", Biomacromolecules, vol. 13, No. 10, Oct. 2012 pp. 3320-3326, XP002780313.
Applicant: Case Western Reserve University; "Cancer Immunotherapy Using Virus Particles"; European Patent Application No. 21201960.8; Extended European Search Report dated Jan. 19, 2022; 11 pgs.
Brennan Frank R et al: "Cowpea mosaic virus as a vaccine carrier of heterologous antigens", Molecular Biotechnology, vol. 17, No. 1, Jan. 2001 (Jan. 2001), pp. 15-26, XP002780312, ISSN: 1073-6085.
Gonzalez Maria Jet al: "Interaction of Cowpea Mosaic Virus (CPMV) Nanoparticles with Antigen Presenting Cells In Vitro and In Vivo", PLOS ONE, vol. 4, No. 11, Nov. 2009 (Nov. 2009), XP002780311, ISSN: 1932-6203.
Patrick h. lizotte: "Novel approaches to targeting innate immunity for cancer immunotherapy", Proquest Dissertations Publishing, May 2015 (May 2015), XP002780316, Retrieved from the Internet: URL:https://search.proquest.com/docview/1695832154?pq-origsite=gscholar [retrieved on Apr. 19, 2018].
Saunders Ket al: "Efficient generation of cowpea mosaicvirus empty virus-like particles by the proteolytic processing of precursors in insect cells and plants", Virology, Elsevier, Amsterdam, NL, vol. 393, No. 2, Oct. 25, 2009 (Oct. 25, 2009), pp. 329-337, XP026691170, ISSN: 0042-6822, DOI: 10.1016/J.VIROL.2009.08.023 [retrieved on Sep. 5, 2009].

(Continued)

*Primary Examiner* — Barry A Chestnut
(74) *Attorney, Agent, or Firm* — Tarolli, Sundheim, Covell & Tummino LLP

(57) ABSTRACT

A method of treating cancer in a subject that includes administering in situ to the cancer of the subject a therapeutically effective amount of a plant virus or plant virus-like particle in combination with administration of an immune checkpoint therapy to the subject.

16 Claims, 28 Drawing Sheets

(56) References Cited

OTHER PUBLICATIONS

Applicant: Case Western Reserve University; "Cancer Immunotherapy Using Virus Particles"; European Patent Application No. 18764856.3 for Supplementary European Search Report dated Dec. 22, 2020; 8 pgs.

Attaluri, et al., "Magnetic nanoparticle hyperthermia enhances radiation therapy: A study in mouse models of human prostate cancer", Int J Hyperthermia. Jun. 2015 ; 31(4): 359-374.

Chauhan, et al., "Solubility Enhancement of Poorly Water Soluble Molecules using Dendrimers", 2007; vol. 2; No. 1; pp. 1-5.

Lee, K. L., et al.; "Combination of Plant Virus Nanoparticle-Based in Situ Vaccination with Chemotherapy Potentiates Antitumor Response". Nano letters, 17(7); Epub Jun. 26, 2017; 4019-4028. https://doi.org/10.1021/acs.nanolett.7b00107.

Miermont et al., "Cowpea Mosaic Virus Capsid: A promising Carrier for the Development of Carbohydrate Based Antitumor Vaccines", Chem. Eur. J., 2008, vol. 14, pp. 4939-4947.

Nicole F.Steinmetz, et al.; "Coated Plant Virus Imaging Agents"; U.S. Appl. No. 16/279,482, filed Feb. 19, 2019; Non-Final Rejection dated Mar. 23, 2021; 91 pgs.

Nicole F.Steinmetz; "Viral Nanoparticle Multimers"; U.S. Appl. No. 14/761,444, filed Jul. 16, 2015; Final Office Action dated Mar. 11, 2021; 11 pgs.

Office action for Chinese Patent Application No. 201580063662.6, dated Mar. 4, 2020.

Office action for European Patent Application No. 15 857 504.3-1111, dated Mar. 18, 2020.

Office action for Japanese Patent Application No. 2017-524349, dated Jan. 31, 2020.

Setaro, et al., "Generation-dependent templated self-assembly of biohybrid protein nanoparticles around photosensitizer dendrimers", Feb. 11, 2015, Abstract.

Sheen et al., "Stimulating Antitumor Immunity with Nanoparticles", Wiley Interdiscip Rev Nanomed Nanobiotechnol, Oct. 2014, vol. 6, pp. 496-505.

Yildiz et al., "Applications of viral nanoparticles in medicine", Current Opinion in Biotechnology, vol. 22, Issue 6, pp. 901-908.

Czapar, Anna et al. Tobacco Mosaic Virus Delivery of Phenanthriplatin for Cancer therapy. American Chemical Society. Nano 2016 (10) pp. 4119-4126 (Year: 2016).

Le, Duc et al. Biodistribution of Filamentous Plant Virus Nanoparticles: Pepino Mosaic Virus versus Potato Virus X. Biomacromolecules 219 Jan. 14; 20(a): pp. 469-477. (Year 2019).

Le, Duc et al. Chemical addressability of potoato virus X for its applications in bio/nanotechnology. El Sevier. Journal of Structural Biology 200 (2017). pp. 360-368. (Year: 2017).

Le, Duc et al. Potato virus X, a filamentous plant viral nanoparticle for doxorubicin delivery in cancer therapy. Royal Society of Chemistry. Nanoscale, 2017 (9). pp. 2348-2357. (Year 2017).

Nicole F. Steinmetz, U.S. Appl. No. 16/998,210, filed Aug. 7, 2020; Non-Final OA dated Dec. 7, 2022.

Tran, Hong Hanh. Developing a plant virus-based expression system for the expression of vaccines against Porcine Reproductive and Respiratory Syndrome Virus. Western Graduate & Postdoctoral Studies. Electronic Thesis and Dissertation Repository. (Year: 2017).

Bruckman et al. (Nano Letters. Mar. 2014; 14: 1551-1558).

Imamura et al. ("FOXA 1 promotes tumor progression in prostate cancer via the insulin-like growth factor binding protein 3 pathway." (2012).

Lam, et al. (WIREs Nanomed Nanobiotechnol Jan./Feb. 2018 vol. 10: 1-18).

Mitoxantrone. Drug Bank Online. Website. https://go.drugbank.com/drugs/DB01204. (Accessed Dec. 15, 2022) (Year: 2022).

Mosquera et al. (Acc. Chem. Res. 2018, 51, 9, 2305-2313 Publication Date: Aug. 29, 2018.

Nicole F.Steinmetz; U.S. Appl. No. 16/597,509, filed Oct. 9, 2019; Non-Final Office Action, dated Dec. 27, 2022; 12 pgs.

Nicole F.Steinmetz; U.S. Appl. No. 16/759,652; Filing Date: Apr. 27, 2020; Final Office Action, dated Dec. 12, 2022; 15 pgs.

Nicole F.Steinmetz; U.S. Appl. No. 17/129,463, filed Dec. 21, 2020; Non-Final Office Action, dated Dec. 8, 2022; 32 pgs.

Nicole F.Steinmetz; U.S. Appl. No. 17/522,182, filed Nov. 9, 2021; Non-Final Office Action, dated Jan. 5, 2023; 27 pgs.

Nicole F.Steinmetz; U.S. Appl. No. 17/677,147, filed Feb. 22, 2022; Non-Final Office Action, dated Jan. 13, 2023; 22 pgs.

Pellico et al. (Contrast Media and Molecular Imaging. 2019; Article ID 1845637: 1-13).

Pretto et al. ("Versatile reversible cross-linking strategy to stabilize CCMV virus like particles for efficient siRNA delivery." Bioconjugate chemistry 30.12 (2019): 3069-3077).

Royston et al. (Journal of Colloidal and Interface Science. 2009; 332: 402-407).

Tamoxifen. Drug Bank Online. Website. https://go.drugbank.com/drugs/DB00675. (Accessed: Dec. 15, 2022) (Year: 2022).

Temming et al. (bioconjugate Chemistry. 2006; 17: 1385-1394).

Xiao et al. (International Journal of Molecular Medicine. 2016; 38: 1319-326).

Zhang et al. (Theranostics. 2018; 8 (9): 2521-2548).

"CWRU researcher to turn plant virus shells against human cancers", The Daily, CWRU Researcher to Turn Plant Virus Shells Against Human Cancers. Case Western Reserve University, Apr. 18, 2016.

Alaa A. Al. Aljabali, et al.; "CPMV-DOX Delivers", Molecular Pharmaceutics, vol. 10, No. 1, Jan. 7, 2013, pp. 3-10, XP055347068, US ISSN: 1543-8384, DOI: 10.1021/MP3002057.

Applicant: Case Western Reserve University; "Cancer Immunotherapy Using Virus Particles"; Canadian Office Action, dated Aug. 4, 2020; 3 pgs.

Applicant: Case Western Reserve University; "Plant Virus Particles for Delivery of Antimitotic Agents"; Extended European Search Report; dated Aug. 25, 2020; 11 pgs.

Canan Uluog, et al.: "Intermediate dose of methotrexate toxicity in non-Hodgkin lymphoma", General Pharmacology, vol. 32, 1999, pp. 215-218, XP55711259.

Chariou, et al., "Detection and Imaging of Aggressive Cancer Cells Using an Epidermal Growth Factor Receptor (EGFR)-Targeted Filamentous Plant Virus-Based Nanoparticle", Bioconjug Chem. Feb. 18, 2015; 26(2): 262-269.

Chinese Patent Appl. No. 201580063662.6; Chinese Office Action; May 5, 2022; 3 pgs.

European Search Report for Patent Application No. 15857504.3-1111/3215520, dated May 7, 2018.

Francisco, Joseph A., et al.; "cAC10-vcMMAE, an anti-CD30-monomethyl auristatin E conjugate with potent and selective antitumor activity", Blood, American Society of Hematology, US, vol. 102, No. 4, Aug. 15, 2003, pp. 1458-1465, XP002738948, ISSN: 0006-4971, DOI: 10.1182/BLOOD-2003-01-0039.

International Search Report for Application No. PCT/US15/59675 (2016).

Inventor: Nicole Steinmetz, "Rod-Shaped Plant Virus Nanoparticles as Imaging Agent Platforms"; U.S. Appl. No. 16/149,828, filed Oct. 2, 2018, Office Action dated Aug. 28, 2020, 22 pgs.

Jantipa Jobsri, et al.: Plant Virus Particles Carrying Tumour Antigen Activate TLR7 and Induce High Levels of Protective Antibody, Plos One, vol. 10, No. 2, Jan. 1, 2015, pp. 1-16, XP055347065, DOI: 10.1371/journal.pone.0118096.

Lee et al. "Biodegradable Viral Nanoparticle/Polymer Implants Prepared via Melt-Processing", ACS Nano ePub Sep. 13, 2017 vol. 11 No. 9 pp. 8777-8780.

Lee et al., "PEGylation to Improve Protein Stability During Melt Processing", Macromol Biosci 1-43, 57-75, Oct. 2015 vol. 15 No. 10 pp. 1332-1337.

Lizotte, et al., "Plant-derived viral-like nanoparticle immunotherapy suppress development of metastatic lung cancer", Journal of Immunology, vol. 194, Issue 1 Supplement, May 2015; 4 pgs.

Matsuura et al. Self-assembly of Ni-NT A-modified [3-annulus peptides into artificial viral capsids and encapsulation of His-tagged proteins. Org. Biomol. Chem., 2016, 14, 7869. DOI: 10.1039/c6ob01227b (Year: 2016).

(56) References Cited

OTHER PUBLICATIONS

Pfizer Ltd.: "Package leaflet: Information for the patient", Jan. 1, 2014, XP55565400, Walton Oaks, Tadworth, Surrey, UK Retrieved from the Internet: URL:https://www.medicines.org.uk/emc/files/pil.6184.pdf [retrieved on Mar. 6, 2019].

Plchova et al. Expression of Human papillomavirus 16 E7ggg oncoprotein on N- and C-terminus of Potato virus X coat protein in bacterial and plant cells. Protein Expression and Purification 77 (2011); p. 146-152.

Smyth et al. Treatment of rapidly growing K-BALB and CT26 mouse tumours using Semliki Forest virus and its derived vector. Gene Therapy (2005) 12, 147-159.

Sourabh Shukla, et al.: "The Impact of Aspect Ratio on the Biodistribution and Tumor Homing of Rigid Soft-Matter Nanorods", Advanced Healthcare Materials, vol. 4, No. 6, Apr. 1, 2015, pp. 874-882, XP055473103, DE ISSN: 2192-2640, DOI: 10.1002/adhm.201400641.

Wen et al. Design of virus-based nanomaterials for medicine, biotechnology, and energy. Chem. Soc. Rev., 2016, 45, 4074. DOI: 10.1039/c5cs00287g (Year: 2016).

Nicole F. Steinmetz; U.S. Appl. No. 16/347,503, filed May 3, 2019; NonFinal Rejection dated Jun. 15, 2022; 36 pgs.

Nicole F. Steinmetz; U.S. Appl. No. 16/614,676, filed Nov. 18, 2019; NonFinal Rejection dated Jun. 3, 2022; 28 pgs.

\* cited by examiner

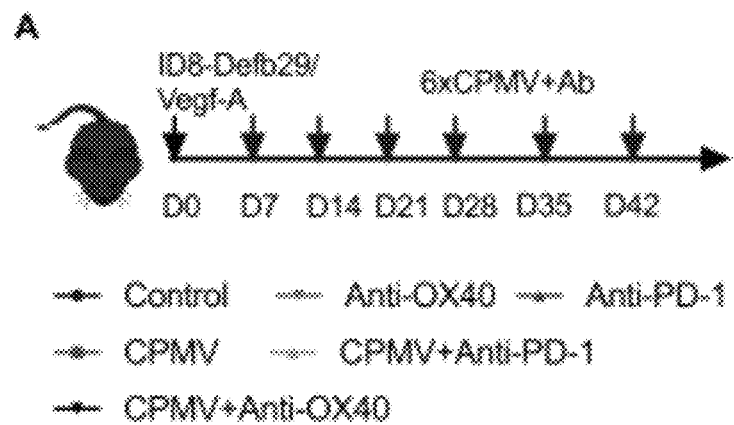
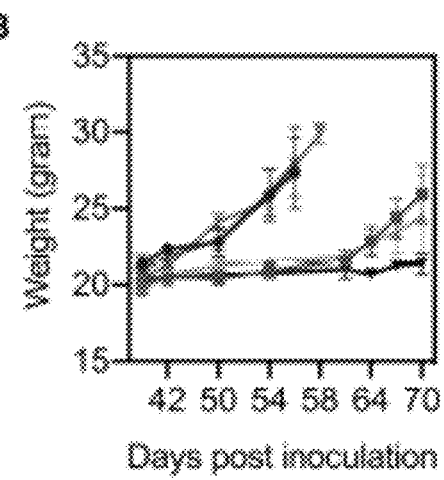
Fig. 2A
Fig. 2B
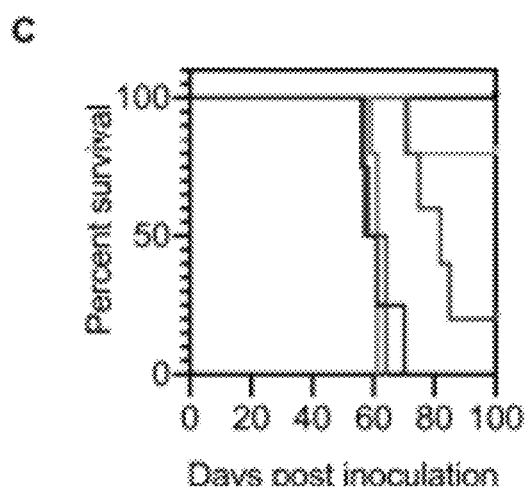
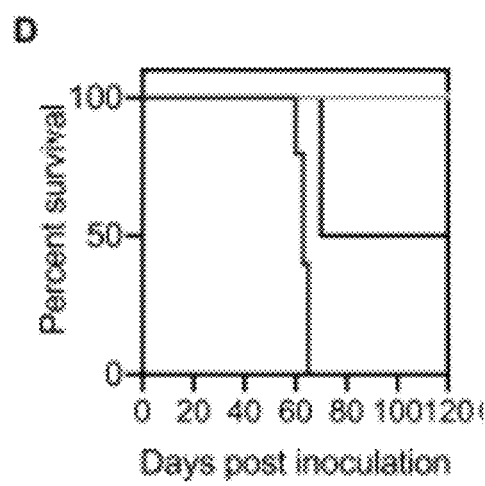
Fig. 2C
Fig. 2D

F

G

C

D

F

G

CANCER IMMUNOTHERAPY USING VIRUS PARTICLES AND IMMUNE CHECKPOINT THERAPY

RELATED APPLICATION

This application claims priority from U.S. Provisional Application No. 63/049,434, filed Jul. 8, 2020, this application is also a Continuation-in-Part of U.S. application Ser. No. 16/612,214, filed Nov. 8, 2019, which is a 371 of PCT/US2018/031661, filed May 8, 2018, the subject matter of which are incorporated herein by reference in their entirety.

GOVERNMENT FUNDING

This invention was made with Government support under NIH Training Grant No. AI007363, NIH Training Grant No. HL105338, and Grant No. NIH 1 U54 CA151662 awarded by the National Institutes of Health, and Grant No. CMMI 1333651 awarded by the National Science Foundation. The Government has certain rights in the invention.

BACKGROUND

Regardless of tissue of origin, metastatic cancers uniformly carry poor prognoses. Conventional chemo- and radiotherapy are largely ineffective for late stage disease. The emerging field of tumor immunology offers new therapeutic options. Novel therapeutics that seek to induce anti-tumor immunity, such as immune checkpoint inhibitors, chimeric antigen receptor cell therapies, and tumor-associated antigen cancer vaccines show promise, but the development of immunotherapy for cancer is in an early stage and it is likely that, as with other cancer therapies, immunotherapies will be combined for optimal efficacy. Each cancer type is unique but many solid tumors metastasize to the lungs. An option with limited exploration is direct application of immunostimulatory reagents into the suspected metastatic site (e.g., proximal a tumor site) or directly into an identified tumor (i.e., intratumoral injection). This approach, in situ vaccination, can modulate the local microenvironment and, like therapies such as T cell checkpoint blocking antibodies, can relieve immunosuppression and potentiate anti-tumor immunity against antigens expressed by the tumor.

Research into nanoparticles as cancer therapies to this point has largely focused on them as a delivery platform: the loading of particles with tumor-associated antigen and immune agonists for the stimulation of anti-tumor immunity, or the loading of particles with pre-existing conventional chemotherapeutic drugs for delivery to tumors as a means to reduce toxicity. Sheen et al., Wiley Interdiscip Rev Nanomed Nanobiotechnol., 6(5):496-505 (2014). However, the tendency of nanoparticles to interact with and to be ingested by innate immune cells gives them potential as immunostimulatory, immunoregulatory and immunostimulatory agents if they modulate the characteristics of the ingesting innate immune population.

Virus-like particles (VLPs) refer to the spontaneous organization of coat proteins into the three dimensional capsid structure of a particular virus. Like active viruses, these particles are in the 20-500 nm size range, but they are devoid of the virus nucleic acid. VLPs have already been deployed as antigen components of antiviral vaccines against infectious counterpart viruses hepatitis B (Halperin et al., Vaccine, 30(15):2556-63 (2012)) and human papilloma virus (Moreira et al., Hum Vaccin., 7(7):768-75 (2011)). By preventing infection with viruses that cause cancer, vaccines utilizing VLPs are currently contributing to reductions in cancer incidence.

Recent studies have demonstrated that VLP therapeutic efficacy extends beyond the specific antigen array that they carry and that they may possess inherent immunogenic properties that can stimulate immune responses against infectious agents that do not carry any antigen included in the VLP. Rynda-Apple et al., Nanomed., 9(12):1857-68 (2014)). VLPs have shown the ability to induce protective immune responses in the respiratory tract in mouse models of infectious diseases of the lungs. VLP treatment protected mice from bacterial pneumonia caused by methicillin-resistant *Staphylococcus aureus* (MRSA) (Rynda-Apple et al., Am J Pathol., 181(1):196-210 (2012)) and *Coxiella burnetii* (Wiley et al., PLoS ONE., 4(9):e7142 (2009)). VLPs have also been shown to protect mice in various influenza models. Patterson et al., ACS Nano., 7(4):3036-44 (2013); Richert et al., Eur J Immunol., 44(2):397-408 (2014). Protective immunity in these models was associated with recruitment, activation, and increased antigen-processing capabilities, formation of inducible bronchus-associated lymphoid tissue (iBALTs), and stimulation of $CD4^+$ T and B lymphocytes and $CD8^+$ T cells. It is important to note that these studies reported robust induction of both innate and adaptive immunity and that the VLPs utilized were not antigenically related to the infectious agents, yet appeared to exert their therapeutic effect via the inherent immunomodulatory nature of the particles. The mechanistic basis of immunomodulation of any VLP is not known, but it is possible that some VLPs have more of that capacity than others.

SUMMARY

Embodiments described herein relate to methods of treating cancer in a subject. The method includes administering in situ to the cancer of the subject a therapeutically effective amount of a plant virus or plant virus-like particle in combination with the administration of a therapeutically effective amount of an immune checkpoint therapy to the subject. In exemplary embodiments, the in situ administration of a plant virus or virus-like particle and an immune checkpoint modulating agent to the cancer can promote a synergistic effect on the antitumor response of tumor infiltrating lymphocytes (TILs) at a tumor site of the subject.

In certain embodiments, the cancer treated can include a metastatic cancer. In some embodiments, the cancer can include a low immunogenic cancer or cancers characterized by immunological escape. In certain embodiments, the cancer is selected from the group consisting of melanoma, colon cancer, and ovarian cancer.

In some embodiments, the virus-like particle is a non-infectious virus particle. In some embodiments, the virus or virus-like particle is selected from the group consisting of a plant picornavirus or virus like particle, a rod-shaped plant virus or virus like particle, and a filamentous plant virus or virus like particle. For example, the plant virus or virus-like particle can be selected from the group consisting of a cowpea mosaic virus-like particle, a tobacco mosaic virus, and a potato virus X virus-like particle. In certain embodiments, the plant virus or virus-like particle is selected from the group consisting of a cowpea mosaic virus or a cowpea mosaic virus-like particle.

In some embodiments, the in situ administration of a plant virus or virus-like particle to the cancer increases recruitment of tumor infiltrating lymphocytes (TILs) at a tumor site of the subject. The tumor infiltrating lymphocytes can include tumor infiltrating neutrophils (TINs). The plant virus or virus-like particle can include a cowpea mosaic virus-like particle, wherein the cowpea mosaic virus-like particle stimulates an anti-tumor response through recruitment of monocytes into a tumor microenvironment (TME), promotes signaling of the IFN-gamma pathway, and/or increase recruitment of TINs and natural killer cells. In some embodiments, the in situ administration of a plant virus or plant virus-like particle to the cancer increases the expression of checkpoint regulators on CD4+ effector T cells in the tumor microenvironment.

In certain embodiments, the immune checkpoint therapy can include administering a positive or stimulatory immune checkpoint modulating agent to the subject. The positive immune checkpoint modulating agent can include an OX40 (CD134) agonist, such as an agonistic anti-OX40 monoclonal antibody.

In other embodiments, the immune checkpoint therapy can include administering a negative or inhibitory immune checkpoint modulating agent. The negative or inhibitory immune checkpoint modulating agent can include a programmed cell death protein 1 (PD-1) inhibitor, such as an anti-PD-1 antibody.

The in situ administration of a plant virus or virus-like particle to cancer of the subject in combination with the administration of an immune checkpoint modulating agent to subject increases tumor infiltration by antitumor neutrophils/macrophages, natural killer cells, and CD4+ and CD8+ effector T cells and inhibits immunosuppressive cells in the tumor microenvironment.

In some embodiments, the virus-like particle is administered via intratumoral injection. In some embodiments, the plant virus or virus-like particle is administered proximal to a tumor in the subject. The virus-like particle can be administered with a pharmaceutically acceptable carrier.

In some embodiments, the plant virus or virus-like particle is formulated in a slow-release formulation. The slow release formula can include a plant virus or virus-like particle and dendrimer hybrid aggregate.

Other embodiments described herein also relate to methods of treating cancer in a subject. The method can include administering in situ to cancer of the subject a therapeutically effective amount of a cowpea mosaic virus or cowpea mosaic virus-like particle and administering to the subject a therapeutically effective amount of an immune checkpoint modulating agent, such as a PD-1 inhibitory agent and/or an OX40 agonist.

In some embodiments, the cowpea mosaic virus or cowpea mosaic virus-like particle and the PD-1 inhibitory agent and/or the OX40 agonist can be administered together with a pharmaceutically acceptable carrier. The in situ administration of the cowpea mosaic virus or a cowpea mosaic virus-like particle and the immune checkpoint modulating agent(s) to the cancer can promote a synergistic effect on the antitumor response of TILs at a tumor site of the subject.

In some embodiments, the OX40 agonist is an agonistic anti-OX40 monoclonal antibody.

In some embodiments, the PD-1 inhibitor is an inhibitory anti-PD-1 antibody.

In some embodiments, the cowpea mosaic virus or cowpea mosaic virus-like particle administered to the subject stimulates an anti-tumor response through recruitment of monocytes into a tumor microenvironment (TME), promotes signaling of the IFN-gamma pathway, and/or increases IL1β and M-CSF in the TME. In some embodiments, the in situ administration of a plant virus or virus-like particle and an immune checkpoint therapy to the cancer increases tumor infiltration by antitumor neutrophils/macrophages, natural killer cells, and CD4+ and CD8+ effector T cells and inhibits immunosuppressive cells in the tumor microenvironment.

In some embodiments, the cowpea mosaic virus or cowpea mosaic virus-like particle can be administered in situ to the cancer and the immune checkpoint therapy are administered to the subject separately. In some embodiments, the immune checkpoint therapy is administered to the subject systemically.

In certain embodiments, the cancer treated can include a metastatic cancer. In some embodiments, the cancer can include a low immunogenic cancer or cancers characterized by immunological escape. The cancer treated can be selected from the group consisting of melanoma, ovarian cancer, and colon cancer.

DETAILED DESCRIPTION

Figure 1A:
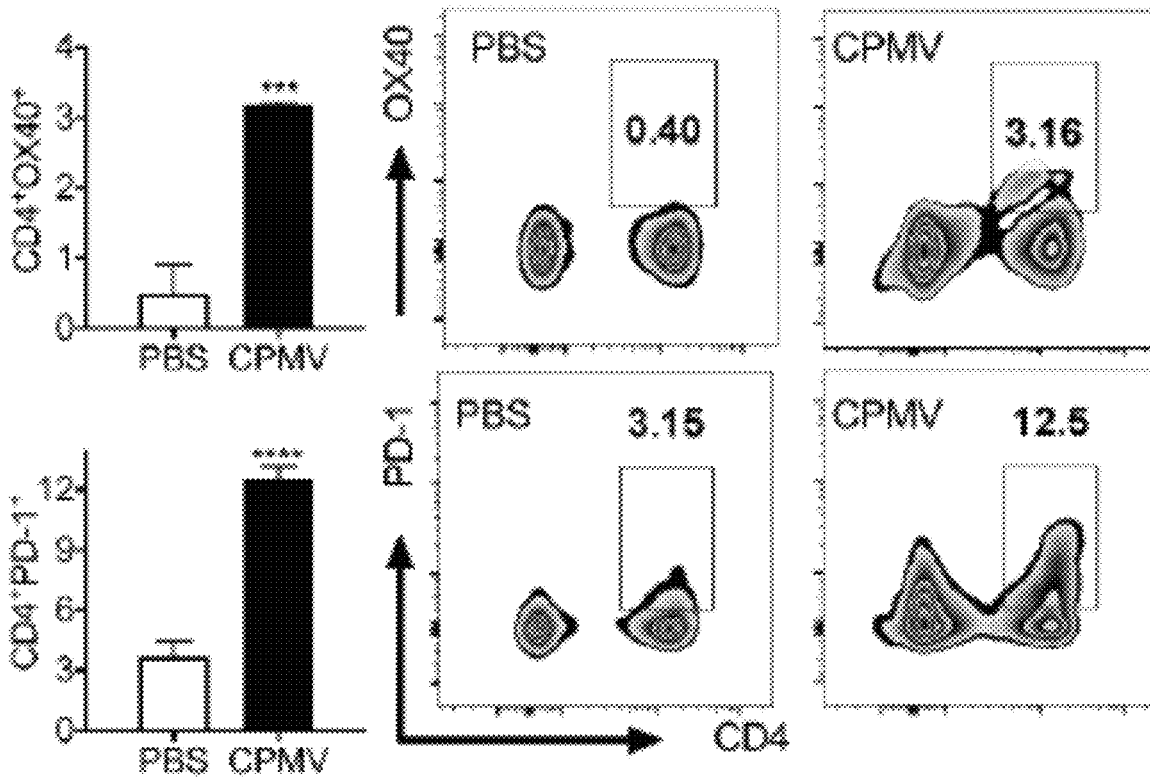
FIGS. 1(A-D) illustrate bar graphs and flow cytometry images showing administration of CPMV induces the expression of OX40 and PD-1 on CD4+ and CD8+ T cells. C57BL/6 mice were inoculated (i.p.) with $2 \times 10^6$ ID8-Defb29/Vegf-A-luc cells followed by five weekly injections (i.p.) of 100 μg CPMV. Cells collected from peritoneal washes carried out 48 h after the last treatment were analyzed by flow cytometry. A. Percentages and representative FACS plots of OX40+CD4+ and PD-1+CD4+ T cells among CD3+ T cells. B. Percentages and representative FACS plots showing PD-1 and OX40 expression on Foxp3− effector T cells and Foxp3+ regulatory T cells gated on CD3+CD4+. C. Percentages and representative FACS plots of OX40+CD8+ and PD-1+CD8+ T cells on among CD3+ T cells. D. Percentages and representative FACS plots of CD44+ OX40+ and CD44+PD-1+ subsets gated on CD3+CD8+ T cells. Data are means±SEM (n=3). Statistical significance was calculated using a paired t-test (*$p<0.05$, $p<0.01$, *$p<0.0005$, ****$p<0.0001$).
Figure 1B:
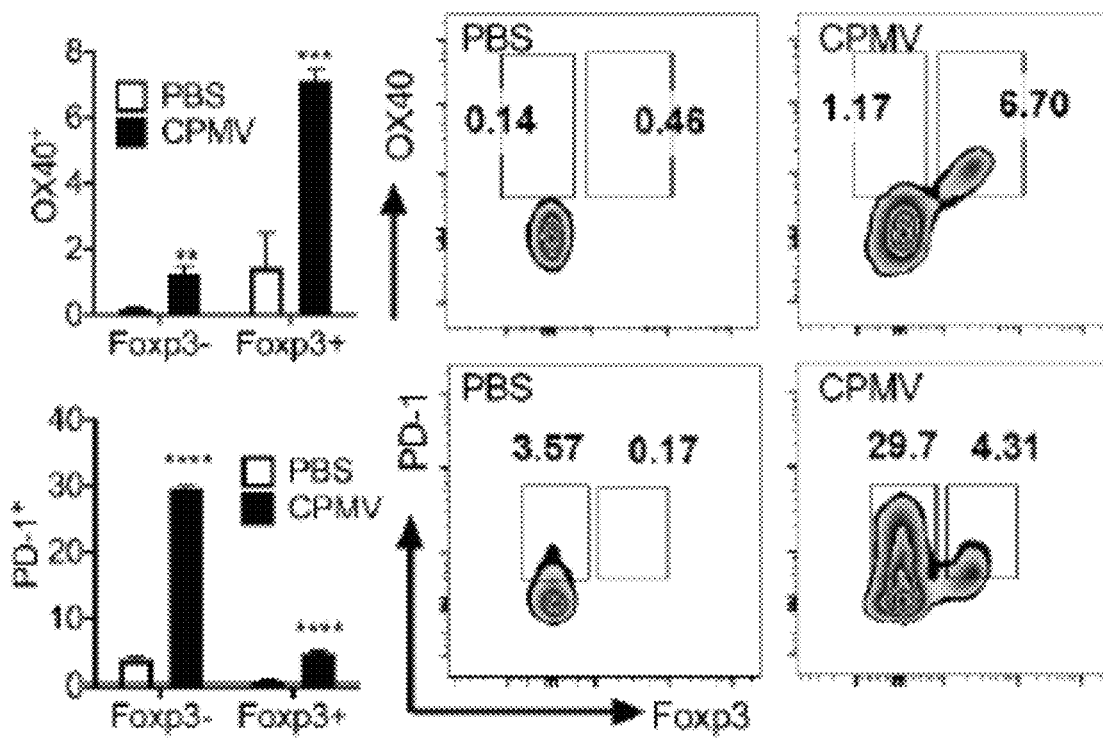

Methods involving conventional molecular biology techniques are described herein. Such techniques are generally known in the art and are described in detail in methodology treatises, such as *Current Protocols in Molecular Biology*, ed. Ausubel et al., Greene Publishing and Wiley-Interscience, New York, 1992 (with periodic updates). Unless otherwise defined, all technical terms used herein have the same meaning as commonly understood by one of ordinary skill in the art to which the application pertains. Commonly understood definitions of molecular biology terms can be found in, for example, Rieger et al., *Glossary of Genetics: Classical and Molecular*, 5th Edition, Springer-Verlag: New York, 1991, and Lewin, *Genes V*, Oxford University Press: New York, 1994.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, and other references mentioned herein are incorporated by reference in their entirety.

Definitions

As used in the description of the invention and the appended claims, the singular forms "a," "an," and "the" are intended to include the plural forms as well, unless the context clearly indicates otherwise. In addition, the recitations of numerical ranges by endpoints include all numbers subsumed within that range (e.g., 1 to 5 includes 1, 1.5, 2, 2.75, 3, 3.80, 4, 5, etc.).

The terms "comprise," "comprising," "include," "including," "have," and "having" are used in the inclusive, open sense, meaning that additional elements may be included. The terms "such as", "e.g.,", as used herein are non-limiting and are for illustrative purposes only. "Including" and "including but not limited to" are used interchangeably.

The term "or" as used herein should be understood to mean "and/or", unless the context clearly indicates otherwise.

The terms "cancer" or "tumor" refer to any neoplastic growth in a subject, including an initial tumor and any metastases. The cancer can be of the liquid or solid tumor type. Liquid tumors include tumors of hematological origin, including, e.g., myelomas (e.g., multiple myeloma), leukemias (e.g., Waldenstrom's syndrome, chronic lymphocytic leukemia, other leukemias), and lymphomas (e.g., B-cell lymphomas, non-Hodgkin's lymphoma). Solid tumors can originate in organs and include cancers of the lungs, brain, breasts, prostate, ovaries, colon, kidneys and liver.

The terms "cancer cell" or "tumor cell" can refer to cells that divide at an abnormal (i.e., increased) rate. Cancer cells include, but are not limited to, carcinomas, such as squamous cell carcinoma, non-small cell carcinoma (e.g., non-small cell lung carcinoma), small cell carcinoma (e.g., small cell lung carcinoma), basal cell carcinoma, sweat gland carcinoma, sebaceous gland carcinoma, adenocarcinoma, papillary carcinoma, papillary adenocarcinoma, cystadenocarcinoma, medullary carcinoma, undifferentiated carcinoma, bronchogenic carcinoma, melanoma, renal cell carcinoma, hepatoma-liver cell carcinoma, bile duct carcinoma, cholangiocarcinoma, papillary carcinoma, transitional cell carcinoma, choriocarcinoma, semonoma, embryonal carcinoma, mammary carcinomas, gastrointestinal carcinoma, colonic carcinomas, bladder carcinoma, prostate carcinoma, and squamous cell carcinoma of the neck and head region; sarcomas, such as fibrosarcoma, myxosarcoma, liposarcoma, chondrosarcoma, osteogenic sarcoma, chordosarcoma, angiosarcoma, endotheliosarcoma, lymphangiosarcoma, synoviosarcoma and mesotheliosarcoma; hematologic cancers, such as myelomas, leukemias (e.g., acute myelogenous leukemia, chronic lymphocytic leukemia, granulocytic leukemia, monocytic leukemia, lymphocytic leukemia), lymphomas (e.g., follicular lymphoma, mantle cell lymphoma, diffuse large B-cell lymphoma, malignant lymphoma, plasmocytoma, reticulum cell sarcoma, or Hodgkin's disease), and tumors of the nervous system including glioma, glioblastoma multiform, meningoma, medulloblastoma, schwannoma and epidymoma.

The term "nanoparticle" refers to any particle having a diameter of less than 1000 nanometers (nm). In general, the nanoparticles should have dimensions small enough to allow their uptake by eukaryotic cells. Typically the nanoparticles have a longest straight dimension (e.g., diameter) of 200 nm or less. In some embodiments, the nanoparticles have a diameter of 100 nm or less. Smaller nanoparticles, e.g., having diameters of 50 nm or less, e.g., about 1 nm to about 30 nm or about 1 nm to about 5 nm, are used in some embodiments.

The phrases "parenteral administration" and "administered parenterally" are art-recognized terms and include modes of administration other than enteral and topical administration, such as injections, and include, without limitation, intratumoral, intravenous, intramuscular, intrapleural, intravascular, intrapericardial, intraarterial, intrathecal, intracapsular, intraorbital, intracardiac, intradermal, intraperitoneal, transtracheal, subcutaneous, subcuticular, intra-articular, subcapsular, subarachnoid, intraspinal and intrasternal injection and infusion.

The phrases "systemic administration," "administered systemically," "peripheral administration" and "administered peripherally" as used herein mean the administration of a compound, agent or other material other than directly into a specific tissue, organ, or region of the subject being treated (e.g., tumor site), such that it enters the animal's system and, thus, is subject to metabolism and other like processes, for example, subcutaneous administration.

As used herein, the terms "peptide," "polypeptide" and "protein" are used interchangeably, and refer to a compound comprised of amino acid residues covalently linked by peptide bonds. A protein or peptide must contain at least two amino acids, and no limitation is placed on the maximum number of amino acids that can comprise the sequence of a protein or peptide. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof. A protein may be a receptor or a non-receptor.

A "nucleic acid" refers to a polynucleotide and includes polyribonucleotides and polydeoxyribonucleotides.

"Treating", as used herein, means ameliorating the effects of, or delaying, halting or reversing the progress of a disease or disorder. The word encompasses reducing the severity of a symptom of a disease or disorder and/or the frequency of a symptom of a disease or disorder.

A "subject", as used therein, can be a human or non-human animal. Non-human animals include, for example, livestock and pets, such as ovine, bovine, porcine, canine, feline and murine mammals, as well as reptiles, birds and fish. Preferably, the subject is human.

The language "effective amount" or "therapeutically effective amount" refers to a sufficient amount of the composition used in the practice of the invention that is effective to provide effective treatment in a subject, depending on the compound being used. That result can be reduction and/or alleviation of the signs, symptoms, or causes of a disease or disorder, or any other desired alteration of a biological system. An appropriate therapeutic amount in any individual case may be determined by one of ordinary skill in the art using routine experimentation.

A "prophylactic" or "preventive" treatment is a treatment administered to a subject who does not exhibit signs of a disease or disorder, or exhibits only early signs of the disease or disorder, for the purpose of decreasing the risk of developing pathology associated with the disease or disorder.

A "therapeutic" treatment is a treatment administered to a subject who exhibits signs of pathology of a disease or disorder for the purpose of diminishing or eliminating those signs.

"Pharmaceutically acceptable carrier" refers herein to a composition suitable for delivering an active pharmaceutical ingredient, such as the composition of the present invention, to a subject without excessive toxicity or other complications while maintaining the biological activity of the active pharmaceutical ingredient. Protein-stabilizing excipients, such as mannitol, sucrose, polysorbate-80 and phosphate buffers, are typically found in such carriers, although the carriers should not be construed as being limited only to these compounds.

Throughout the description, where compositions are described as having, including, or comprising, specific components, it is contemplated that compositions also consist essentially of, or consist of, the recited components. Similarly, where methods or processes are described as having, including, or comprising specific process steps, the processes also consist essentially of, or consist of, the recited processing steps. Further, it should be understood that the order of steps or order for performing certain actions is immaterial so long as the compositions and methods described herein remains operable. Moreover, two or more steps or actions can be conducted simultaneously.

Embodiments described herein relate to the use of in situ vaccination using a combination of plant virus or plant virus-like particles and immune checkpoint therapy (ICT) to promote systemic antitumor immunity, where the combination generates a synergistic antitumor effect that significantly prolongs survival compared to either treatment alone. It was found that in situ plant virus vaccination upregulates the expression of immune checkpoint regulators on effector T cells in the tumor microenvironment using various tumor models. It was further found that administration of a plant virus or plant virus-like particles in combination with administration of an immune checkpoint therapy to a subject with cancer can recruit CD4+ and CD8+ immune cells and promote their activation and antitumor potential in a synergistic manner. The combination therapy described herein represents a type of in situ vaccination, in which application of plant virus or plant virus-like particle directly to the tumor in combination with administration of the immune checkpoint therapy can promote tumor-specific immune responses against various cancers and induce long-lasting protection in a subject against tumor rechallenge.

Methods of treating cancer in a subject in need thereof can include administering in situ to cancer of the subject a therapeutically effective amount of a plant virus or plant virus-like particle and administering to the subject a therapeutically effective amount of an immune checkpoint therapy. The in situ vaccination approach does not rely on the plant virus or virus-like particles as a vehicle for drug or antigen delivery, but rather on their inherent immunogenicity. In some embodiments, the in situ administration of the plant virus or plant virus-like particle and an immune checkpoint modulating agent can be proximal to, or directly adjacent, a tumor site in the subject or directly to the tumor site (e.g., via intratumoral injection) to provide a high local concentration of the plant virus or plant virus-like particle and an immune checkpoint modulating agent in the tumor microenvironment (TME).

Plant Virus and Plant Virus-Like Particles

The plant virus or plant virus-like particle (VLP) can be nonreplicating and noninfectious in the subject to avoid infection of the subject and can be regarded as safe from a human health and agricultural perspective. In planta production prevents endotoxin contamination that may be a byproduct of other VLP systems derived from $E.\ coli$. The VLPs are scalable, stable over a range of temperatures (4-60° C.) and solvent:buffer mixtures.

In some embodiments, plant virus particles or plant virus-like particles in which the viral nucleic acid is not present are administered in situ to cancer of the subject. Virus-like particles lacking their nucleic acid are non-replicating and non-infectious regardless of the subject into which they are introduced.

In other embodiments, the plant virus particles include a nucleic acid within the virus particle. If present, the nucleic acid will typically be the nucleic acid encoding the virus. However, in some embodiments the viral nucleic acid may have been replaced with exogenous nucleic acid. In some embodiments, the nucleic acid is RNA, while in other embodiments the nucleic acid is DNA. A virus particle including nucleic acid will still be nonreplicating and non-infectious when it is introduced into a subject which it cannot infect. For example, plant virus particles will typically be nonreplicating and noninfectious when introduced into an animal subject.

In some embodiments, the plant virus is a plant picornavirus. A plant picornavirus is a virus belonging to the family Secoviridae, which together with mammalian picornaviruses belong to the order of the Picornavirales. Plant picornaviruses are relatively small, non-enveloped, positive-stranded RNA viruses with an icosahedral capsid. Plant picornaviruses have a number of additional properties that distinguish them from other picornaviruses, and are categorized as a subfamily of Secoviridae. In some embodiments, the virus particles are selected from the Comovirinae virus subfamily. Exemplary Comovirinae subfamily viruses for use in a method described herein can include Cowpea mosaic virus (CPMV), Broad bean wilt virus 1, and Tobacco ringspot virus. In certain embodiments, the plant virus or plant virus-like particles are from the genus *Comovirus*. A preferred example of a *Comovirus* is the cowpea mosaic virus or cowpea mosaic virus-like particles. The plant virus-like particle can be an empty cowpea mosaic virus-like particle (eCPMV).

In some embodiments, the plant virus or plant virus-like particle is a rod-shaped plant virus. A rod-shaped plant virus is a virus that primarily infects plants, is non-enveloped, and is shaped as a rigid helical rod with a helical symmetry. Rod shaped viruses also include a central canal. Rod-shaped plant virus particles are distinguished from filamentous plant virus particles as a result of being inflexible, shorter, and thicker in diameter. For example, Virgaviridae have a length of about 200 to about 400 nm, and a diameter of about 15-25 nm. Virgaviridae have other characteristics, such as having a single-stranded RNA positive sense genome with a 3'-tRNA like structure and no polyA tail, and coat proteins of 19-24 kilodaltons.

In some embodiments, the rod-shaped plant virus or virus-like particle belongs to a specific virus family, genus, or species. For example, in some embodiments, the rod-shaped plant virus belongs to the Virgaviridae family. The Virgaviridae family includes the genus *Furovirus, Hordevirus, Pecluvirus, Pomovirus, Tobamovirus*, and *Tobravirus*. In some embodiments, the rod-shaped plant virus belongs to the genus *Tobamovirus*. In further embodiments, the rod-shaped plant virus belongs to the tobacco mosaic virus (TMV) species. The tobacco mosaic virus has a capsid made from 2130 molecules of coat protein and one molecule of genomic single strand RNA 6400 bases long. The coat protein self-assembles into the rod like helical structure (16.3 proteins per helix turn) around the RNA which forms a hairpin loop structure. The protein monomer consists of 158 amino acids which are assembled into four main alpha-helices, which are joined by a prominent loop proximal to the axis of the virion. Virions are ~300 nm in length and ~18 nm in diameter. Negatively stained electron microphotographs show a distinct inner channel of ~4 nm.

In other embodiments, the plant virus or plant virus-like particle is an Alphaflexiviridae virus or virus-like particle. The genera comprising the Alphaflexiviridae family include Allexivirus, Botrexvirus, Lolavirus, Mandarivirus, Potexvirus, and Sclerodarnavirus. In further embodiments, the plant virus particle of the vaccine composition is a Potexvirus particle. Examples of Potexvirus include Allium virus X, Alstroemeria virus X, Alternanthera mosaic virus, Asparagus virus 3, Bamboo mosaic virus, Cactus virus X, Cassava common mosaic virus, Cassava virus X, Clover yellow mosaic virus, Commelina virus X, Cymbidium mosaic virus, Daphne virus X, Foxtail mosaic virus, Hosta virus X, Hydrangea ringspot virus, Lagenaria mild mosaic virus, Lettuce virus X, Lily virus X, Malva mosaic virus, Mint virus X, Narcissus mosaic virus, Nerine virus X, Opuntia virus X, Papaya mosaic virus, Pepino mosaic virus, Phaius virus X, Plantago asiatica mosaic virus, Plantago severe mottle virus, Plantain virus X, Potato aucuba mosaic virus, Potato virus X, Schlumbergera virus X, Strawberry mild yellow edge virus, Tamus red mosaic virus, Tulip virus X, White clover mosaic virus, and Zygocactus virus X. In some embodiments, the plant virus like particle is a Potato virus X virus-like particle.

The plant virus or plant virus-like particles can be obtained according to various methods known to those skilled in the art. In embodiments where plant virus particles are used, the plant virus particles can be obtained from the extract of a plant infected by the plant virus. For example, cowpea mosaic virus can be grown in black eyed pea plants, which can be infected within 10 days of sowing seeds. Plants can be infected by, for example, coating the leaves with a liquid containing the virus, and then rubbing the leaves, preferably in the presence of an abrasive powder which wounds the leaf surface to allow penetration of the leaf and infection of the plant. Within a week or two after infection, leaves are harvested and viral nanoparticles are extracted. In the case of cowpea mosaic virus, 100 mg of virus can be obtained from as few as 50 plants. Procedures for obtaining plant picornavirus particles using extraction of an infected plant are known to those skilled in the art. See Wellink J., Meth Mol Biol, 8, 205-209 (1998). Procedures are also available for obtaining virus-like particles. Saunders et al., Virology, 393(2):329-37 (2009). The disclosures of both of these references are incorporated herein by reference.

Immune Checkpoint Therapy

Embodiments herein relate to methods for the treatment of cancer using a combination of plant virus or plant virus-like particles and immune checkpoint therapy. The combination of an immune checkpoint therapy and a plant virus or plant virus-like particle can allow for a lower systemic dose of immune checkpoint therapy, mitigating the impact of adverse events, typical of immune checkpoint therapies.

Immune checkpoint therapy for cancer encompasses strategies that target immunity regulatory pathways in order to enhance immunity activity against tumor cells. It has been shown that treatment with a plant virus and immune checkpoint-targeting antibodies, such as anti-PD-1 antibodies or agonistic OX40-specific antibodies increases tumor infiltration by antitumor neutrophils/macrophages, natural killer cells, and CD4+ and CD8+ effector T cells secreting greater amounts of interferon gamma, while depleting myeloid-derived suppressive cells and regulatory T cells. Thus, in some embodiments, immune checkpoint therapy can include the administration to a subject of one or more immune checkpoint modulating agents to eradicate suppressive regulatory T cells and/or initiate an effector immune response with the in situ administration of the plant virus or virus-like particle.

An immune checkpoint modulating agent for use in a method described herein can include an agent that either inhibits negative regulators of the immune system response against cancer cells, such as programmed cell death protein 1 (PD-1), or agents that act as agonists for positive regulators, such as OX40 (CD134). In particular embodiments, the immune checkpoint modulating agents can include an immune checkpoint-targeting antibody such as anti-PD-1 or agonistic OX40-specific monoclonal antibodies.

The programmed death 1 (PD-1) immune checkpoints are negative regulators of T-cell immune function and inhibition of PD-1, results in increased activation of the immune system. In some embodiments, an immune checkpoint modulating agent administered to a subject can include a PD-1 inhibitor. In certain embodiments, the PD-1 inhibitor in an anti-PD-1 antibody. Anti-PD-1 antibodies for use in a method described herein can include monoclonal antibodies capable of inhibiting the engagement/interaction of PD-1 with PD-L1 ligand. Thus, in some embodiments, a PD-1 inhibitory agent can include an antibody that targets PD-L1.

Exemplary PD-1 inhibitory monoclonal antibodies for use in a combination therapy described herein include, but are not limited to, Pembrolizumab, Nivolumab, and Cemiplimab, and MEDI0608. Exemplary PD-L1 inhibitory monoclonal antibodies include, but are not limited to, Atezolizumab, Avelumab, Vonlerolizumab, and Durvalumab.

Additional immune checkpoint modulating agents that target negative regulators of the immune system response against cancer cells can include agents capable of inhibiting or blocking engagement/interaction with Cytotoxic T-lymphocyte-associated antigen 4 (CTLA-4), lymphocyte activation gene 3 (LAG-3, CD223), T cell immunoglobulin-3 (TIM-3), T cell immunoglobulin and ITIM domain (TIGIT), V-domain Ig suppressor of T cell activation (VISTA), and B7 homolog 3 (B7/H3).

For example, an immune checkpoint modulating agent targeting CTLA-4 can include the anti-CTLA-4 antibodies Tremelimunab, BMS-986249, and Ipilimumab, which is approved for the treatment of advanced or unresectable melanoma. Agents targeting LAG-3 can include the IMP321 fusion protein and monoclonal antibodies targeting LAG-3, such as Relatlimab or LAG525. An agent targeting TIM-3 can include the anti-TIM-3 monoclonal antibody MBG453. An agent targeting TIGIT can include the anti-TIGIT monoclonal antibody OMP-31M32. Agents targeting VISTA, also known as programmed death-1 homolog (PD-1H), can include human monoclonal antibody JNJ-61610588 and CA-170, an oral inhibitor of both PD-L1/PD-L2 and VISTA. Agents targeting B7-H3, also known as CD276, can include Enoblituzumab (MGA271) which is an engineered Fc humanized IgG1 monoclonal antibody against B7-H3, the humanized DART protein MGD009, and 8H9 which is an antibody against B7-H3 labeled with radioactive iodine (I-131) which, after internalization, promotes cancer cell death.

In some embodiments, the immune checkpoint modulating agents can include a positive regulator of the immune system response against cancer cells. In particular embodiments, immune checkpoint modulating agents that act as positive regulators of the immune system response against cancer cells can include OX40 agonistic agents. In an exemplary embodiment, an OX40 agonistic agent can include a monoclonal antibody capable of promoting the engagement/interaction of OX40 with OX40L ligand to promote the NF-κB signaling pathway and T cell clonal expansion and activation. OX40 agnostic agents for use in a method described herein can include, but are not limited to, MEDI6368 fusion protein, MEDI0562, MEDI6469, BMS986178, Pf-04518600 (PF-8600), GSK3174998 and MOXR0916.

Additional immune checkpoint modulating agents for use in a method described herein can include agonistic agents targeting positive regulators of the immune system response against cancer cells such as, but not limited to, Inducible co-stimulator (ICOS), Glucocorticoid-induced TNF receptor family-related protein (GITR), 4-1BB, CD27/CD70 pathway, and CD40. GITR agonists can include TRX-518, an aglycosylated human mAb, BMS-986156, AMG 228, MEDI1873, MK-4166, INCAGN01876, and GWN323. ICOS agonists can include JTX-2011, GSK3359609, and MEDI-570. 4-1BB (CD137) agonists can include Utomilumab (PF-05082566) and Urelumab. Agonists of the CD27/CD70 pathway can include ARGX-110, BMS-936561 (MDX-1203), and Varlilumab. CD40 agonists can include CP-870893, APX005M, ADC-1013, lucatumumab, Chi Lob 7/4, dacetuzumab, SEA-CD40, and RO7009789 monoclonal antibodies.

Additional exemplary immune checkpoint modulating agents can include, but are not limited to, agents capable of inhibiting or blocking engagement/interaction with adenosine A2a receptor (A2aR), CD73, B and T cell lymphocyte attenuator (BTLA, CD272), or non-T cell-associated inhibitory molecules such as transforming growth factor β (TGF-β), Killer immunoglobulin-like receptors (KIRs, CD158), Phosphoinositide 3-kinase gamma (PI3Kγ), and CD47 (integrin-associated protein).

Further immune checkpoint modulating agents can include molecules targeting tumor microenvironment components like Indoleamine 2,3-dioxygenase (IDO), Toll-like receptors (TLRs), IL2R, as well as arginase inhibitors such as CB-1158 or oncolytic peptides, such as LTX-315. For example agents targeting (IDO) can include BMS-986205, and Indoximod, and the oral agent epacadostat. Agents targeting TLRs for use as an immune checkpoint modulating agent in a method described herein can include MEDI9197, PG545 (pixatimod, pINN), and Polyinosinic-polycytidylic acid polylysine carboxymethylcellulose (poly-ICLC). For example, an IL-2R inhibitory agent can include NKTR-214 (bempeg) and an IL-10 inhibitory agent can include AM0010 (pegilodecakin).

In some embodiments, selection of particular immune checkpoint therapy for use in a method described herein can be achieved by determining the expression of immune checkpoint molecules generated using a plant virus (e.g., CPMV) on CD4+ effector T cells of a subject, where the increased expression of immune checkpoint molecules can predict the potency of specific immune checkpoint modulating agents.

Cancer Treatment by Virus Particle Administration

This application describes a method of treating cancer in a subject in need thereof by administering in situ to cancer of the subject a therapeutically effective amount of a plant virus or virus-like particle in combination with the administration of an immune checkpoint therapy to the subject. While not intending to be bound by theory, it appears that the in situ administration of a plant virus or virus-like particle and an immune checkpoint therapy to the cancer increases recruitment of tumor infiltrating lymphocytes (TILs), such as tumor infiltrating neutrophils (TINs), macrophages, CD4+ and CD8+ effector T cells and natural killer cells (NKs) at a tumor site of the subject. It also appears that the in situ administration of a plant virus or virus-like particle and an immune checkpoint therapy to the cancer increases the expression of checkpoint regulators on Foxp3⁻ CD4+ effector T cells in the tumor microenvironment while inhibiting immunosuppressive cells in the tumor microenvironment (TME).

"Cancer" or "malignancy" are used as synonymous terms and refer to any of a number of diseases that are characterized by uncontrolled, abnormal proliferation of cells, the ability of affected cells to spread locally or through the bloodstream and lymphatic system to other parts of the body (i.e., metastasize) as well as any of a number of characteristic structural and/or molecular features. A "cancer cell" refers to a cell undergoing early, intermediate or advanced stages of multi-step neoplastic progression. The features of early, intermediate and advanced stages of neoplastic progression have been described using microscopy. Cancer cells at each of the three stages of neoplastic progression generally have abnormal karyotypes, including translocations, inversion, deletions, isochromosomes, monosomies, and extra chromosomes. Cancer cells include "hyperplastic cells," that is, cells in the early stages of malignant progression, "dysplastic cells," that is, cells in the intermediate stages of neoplastic progression, and "neoplastic cells," that is, cells in the advanced stages of neoplastic progression.

The cancers treated by a method described herein can include the following: leukemias, such as but not limited to, acute leukemia, acute lymphocytic leukemia, acute myelocytic leukemias, such as, myeloblastic, promyelocytic, myelomonocytic, monocytic, and erythroleukemia leukemias and myelodysplastic syndrome; chronic leukemias, such as but not limited to, chronic myelocytic (granulocytic) leukemia, chronic lymphocytic leukemia, hairy cell leukemia; polycythemia vera; lymphomas such as but not limited to Hodgkin's disease, non-Hodgkin's disease; multiple myelomas such as but not limited to smoldering multiple myeloma, nonsecretory myeloma, osteosclerotic myeloma, plasma cell leukemia, solitary plasmacytoma and extramedullary plasmacytoma; Waldenstrom's macroglobulinemia; monoclonal gammopathy of undetermined significance; benign monoclonal gammopathy; heavy chain disease; bone and connective tissue sarcomas such as but not limited to bone sarcoma, osteosarcoma, chondrosarcoma, Ewing's sarcoma, malignant giant cell tumor, fibrosarcoma of bone, chordoma, periosteal sarcoma, soft-tissue sarcomas, angiosarcoma (hemangiosarcoma), fibrosarcoma, Kaposi's sarcoma, leiomyosarcoma, liposarcoma, lymphangiosarcoma, neurilemmoma, rhabdomyosarcoma, synovial sarcoma; brain tumors such as but not limited to, glioma, astrocytoma, glioblastoma, brain stem glioma, ependymoma, oligodendroglioma, nonglial tumor, acoustic neurinoma, craniopharyngioma, medulloblastoma, meningioma, pineocytoma, pineoblastoma, primary brain lymphoma; breast cancer including but not limited to ductal carcinoma, adenocarcinoma, lobular (small cell) carcinoma, intraductal carcinoma, medullary breast cancer, mucinous breast cancer, tubular breast cancer, papillary breast cancer, Paget's disease, and inflammatory breast cancer; adrenal cancer such as but not limited to pheochromocytoma and adrenocortical carcinoma; thyroid cancer such as but not limited to papillary or follicular thyroid cancer, medullary thyroid cancer and anaplastic thyroid cancer; pancreatic cancer such as but not limited to, insulinoma, gastrinoma, glucagonoma, vipoma, somatostatin-secreting tumor, and carcinoid or islet cell tumor; pituitary cancers such as but limited to Cushing's disease, prolactin-secreting tumor, acromegaly, and diabetes insipius; eye cancers such as but not limited to ocular melanoma such as iris melanoma, choroidal melanoma, and cilliary body melanoma, and retinoblastoma; vaginal cancers such as squamous cell carcinoma, adenocarcinoma, and melanoma; vulvar cancer such as squamous cell carcinoma, melanoma, adenocarcinoma, basal cell carcinoma, sarcoma, and Paget's disease; cervical cancers such as but not limited to, squamous cell carcinoma, and adenocarcinoma; uterine cancers such as but not limited to endometrial carcinoma and uterine sarcoma; ovarian cancers such as but not limited to, ovarian epithelial carcinoma, borderline tumor, germ cell tumor, fallopian tube cancer, and stromal tumor; esophageal cancers such as but not limited to, squamous cancer, adenocarcinoma, adenoid cystic carcinoma, mucoepidermoid carcinoma, adenosquamous carcinoma, sarcoma, melanoma, plasmacytoma, verrucous carcinoma, and oat cell (small cell) carcinoma; stomach cancers such as but not limited to, adenocarcinoma, fungating (polypoid), ulcerating, superficial spreading, diffusely spreading, malignant lymphoma, liposarcoma, fibrosarcoma, and carcinosarcoma; colon cancers; rectal cancers; liver cancers such as but not limited to hepatocellular carcinoma and hepatoblastoma; gallbladder cancers such as adenocarcinoma; cholangiocarcinomas such as but not limited to papillary, nodular, and diffuse; lung cancers such as non-small cell lung cancer, squamous cell carcinoma (epidermoid carcinoma), adenocarcinoma, large-cell carcinoma and small-cell lung cancer; testicular cancers such as but not limited to germinal tumor, seminoma, anaplastic, classic (typical), spermatocytic, nonseminoma, embryonal carcinoma, teratoma carcinoma, choriocarcinoma (yolk-sac tumor), prostate cancers such as but not limited to, prostatic intraepithelial neoplasia, adenocarcinoma, leiomyosarcoma, and rhabdomyosarcoma; penal cancers; oral cancers such as but not limited to squamous cell carcinoma; basal cancers; salivary gland cancers such as but not limited to adenocarcinoma, mucoepidermoid carcinoma, and adenoidcystic carcinoma; pharynx cancers such as but not limited to squamous cell cancer, and verrucous; skin cancers such as but not limited to, basal cell carcinoma, squamous cell carcinoma and melanoma, superficial spreading melanoma, nodular melanoma, lentigo malignant melanoma, acral lentiginous melanoma; kidney cancers such as but not limited to renal cell carcinoma, adenocarcinoma, hypemephroma, fibrosarcoma, transitional cell cancer (renal pelvis and/or uterer); Wilms' tumor; bladder cancers such as but not limited to transitional cell carcinoma, squamous cell cancer, adenocarcinoma, carcinosarcoma. In addition, cancers include myxosarcoma, osteogenic sarcoma, endotheliosarcoma, lymphangioendotheliosarcoma, mesothelioma, synovioma, hemangioblastoma, epithelial carcinoma, cystadenocarcinoma, bronchogenic carcinoma, sweat gland carcinoma, sebaceous gland carcinoma, papillary carcinoma and papillary adenocarcinomas (for a review of such disorders, see Fishman et al., 1985, Medicine, 2d Ed., J. B. Lippincott Co., Philadelphia and Murphy et al., 1997, Informed Decisions: The Complete Book of Cancer Diagnosis, Treatment, and Recovery, Viking Penguin, Penguin Books U.S.A., Inc., United States of America).

The inherent immunogenicity resulting from an in situ vaccination approach described herein appears to be uniquely potent when the plant virus or virus-like particles are inhaled or when administered through intratumoral administration into dermal tumors or as IP administration when treating disseminated, metastatic ovarian or colon cancer. For treatment of lung tumors, the plant virus or virus-like particles can be intratracheally injected into a subject with established lung tumors and this immunostimulatory treatment results in the rejection of those tumors and systemic immunity that prevents growth of distal tumors. The plant virus or virus-like particles described herein (e.g., CPMV or PVX) alone are able to stimulate systemic antitumor immunity. The in situ administration of a combination of a plant virus or virus-like particles and an immune checkpoint modulating agent can render the tumor microenvironment inhospitable to tumor cell seeding or continued growth and provide a synergistic effect on the antitumor response of TILs at a tumor site of the subject.

Primary lung cancer is the second most common cancer in the United States, behind only breast cancer. Additionally, most other majors cancers frequently metastasize to the lung, including breast, bladder, colon, kidney, melanoma, and prostate. Therefore, in some embodiments, the virus particles are used to treat cancer selected from the group consisting of but not limited to melanoma, breast cancer, bladder cancer, kidney cancer, colon cancer, lung cancer, prostate cancer and ovarian cancer. In some embodiments, the virus particles are used to treat lung cancer. Inhalation is a preferred method of administering the plant virus or plant virus-like particles when treating lung cancer. However, inhaled virus particles are able to treat cancer beyond the lung as a result of their ability to stimulate a systemic immune response. For example, in some embodiments, a combination of plant virus or virus-like particles and an immune checkpoint modulating agent are used to treat metastatic cancer which has spread to one or more sites beyond the initial point where cancer has occurred. In other embodiments, the virus or virus-like particles can be administered proximal to tumors in other tissues.

In particular embodiments, the cancer treated in accordance with a method described herein can include a cancer characterized by tumors with low immunogenicity. In certain embodiments, cancers with low immunogenicity treated using a combination of a plant virus or plant virus-like particle and an immune checkpoint modulating agent can include ovarian cancer, colon cancer, and melanoma characterized by tumors with low immunogenicity. In exemplary embodiments, a combination of CPMV or CPMV virus-like particles and an anti-PD-1 antibody can be used to treat ovarian cancer characterized by tumors with low immunogenicity in a subject and CPMV and anti-OX40 agonistic antibodies can be used to treat colon and melanoma cancer characterized by tumors with low immunogenicity.

In some embodiments, the method includes administering in situ a plant virus or plant virus-like particle to the subject in combination with one or more immune checkpoint modulating agents. The immune checkpoint modulating agents can target the same immune checkpoint or can target two or more immune checkpoints. In an exemplary embodiment, a method of treating cancer in a subject can include administering in situ to the subject a therapeutically effective amount of a cowpea mosaic virus or cowpea mosaic virus-like particle in combination with a PD-1 inhibitor and/or an OX40 agonist.

Methods described herein can further include the step of administering a therapeutically effective amount of an additional cancer therapy to the subject. A "cancer therapy", as used herein, can include any combination of agents or treatment regimen that is capable of negatively affecting cancer in an animal, for example, by killing cancer cells, inducing apoptosis in cancer cells, reducing the growth rate of cancer cells, reducing the incidence or number of metastases, reducing tumor size, inhibiting tumor growth, reducing the blood supply to a tumor or cancer cells, promoting an immune response against cancer cells or a tumor, preventing or inhibiting the progression of cancer, or increasing the lifespan of an animal with cancer. Cancer therapeutics can include one or more therapies such as, but not limited to, chemotherapies, radiation therapies, hormonal therapies, and/or biological therapies/immunotherapies. A reduction, for example, in cancer volume, growth, migration, and/or dispersal in a subject may be indicative of the efficacy of a given therapy.

In some embodiments, the method can further include the step of administering a therapeutically effective amount of an additional anticancer therapeutic agent to the subject. The anticancer therapeutic agents can be in the form of biologically active ligands, small molecules, peptides, polypeptides, proteins, DNA fragments, DNA plasmids, interfering RNA molecules, such as siRNAs, oligonucleotides, and DNA encoding for shRNA. In some embodiments, cytotoxic compounds are included in an anticancer agent described herein. Cytotoxic compounds include small-molecule drugs such as doxorubicin, mitoxantrone, methotrexate, and pyrimidine and purine analogs, referred to herein as antitumor agents.

The anticancer therapeutic agent can include an anticancer or an antiproliferative agent that exerts an antineoplastic, chemotherapeutic, antiviral, antimitotic, antitumorgenic, and/or immunotherapeutic effects, e.g., prevent the development, maturation, or spread of neoplastic cells, directly on the tumor cell, e.g., by cytostatic or cytocidal effects, and not indirectly through mechanisms such as biological response modification. There are large numbers of anti-proliferative agent agents available in commercial use, in clinical evaluation and in pre-clinical development. For convenience of discussion, anti-proliferative agents are classified into the following classes, subtypes and species: ACE inhibitors, alkylating agents, angiogenesis inhibitors, angiostatin, anthracyclines/DNA intercalators, anti-cancer antibiotics or antibiotic-type agents, antimetabolites, antimetastatic compounds, asparaginases, bisphosphonates, cGMP phosphodiesterase inhibitors, calcium carbonate, cyclooxygenase-2 inhibitors, DHA derivatives, DNA topoisomerase, endostatin, epipodophylotoxins, genistein, hormonal anticancer agents, hydrophilic bile acids (URSO), immunomodulators or immunological agents, integrin antagonists, interferon antagonists or agents, MMP inhibitors, miscellaneous antineoplastic agents, monoclonal antibodies, nitrosoureas, NSATDs, ornithine decarboxylase inhibitors, pBATTs, radio/chemo sensitizers/protectors, retinoids, selective inhibitors of proliferation and migration of endothelial cells, selenium, stromelysin inhibitors, taxanes, vaccines, and vinca alkaloids.

The major categories that some anti-proliferative agents fall into include antimetabolite agents, alkylating agents, antibiotic-type agents, hormonal anticancer agents, immunological agents, interferon-type agents, and a category of miscellaneous antineoplastic agents. Some anti-proliferative agents operate through multiple or unknown mechanisms and can thus be classified into more than one category.

Examples of anticancer therapeutic agents that can be administered in combination with a plant virus or virus-like particle described herein include Taxol, Adriamycin, Dactinomycin, Bleomycin, Vinblastine, Cisplatin, acivicin; aclarubicin; acodazole hydrochloride; acronine; adozelesin; aldesleukin; altretamine; ambomycin; ametantrone acetate; aminoglutethimide; amsacrine; anastrozole; anthramycin; asparaginase; asperlin; azacitidine; azetepa; azotomycin; batimastat; benzodepa; bicalutamide; bisantrene hydrochloride; bisnafide dimesylate; bizelesin; bleomycin sulfate; brequinar sodium; bropirimine; busulfan; cactinomycin; calusterone; caracemide; carbetimer; carboplatin; carmustine; carubicin hydrochloride; carzelesin; cedefingol; chlorambucil; cirolemycin; cladribine; crisnatol mesylate; cyclophosphamide; cytarabine; dacarbazine; daunorubicin hydrochloride; decitabine; dexormaplatin; dezaguanine; dezaguanine mesylate; diaziquone; doxorubicin; doxorubicin hydrochloride; droloxifene; droloxifene citrate; dromostanolone propionate; duazomycin; edatrexate; eflomithine hydrochloride; elsamitrucin; enloplatin; enpromate; epipropidine; epirubicin hydrochloride; erbulozole; esorubicin hydrochloride; estramustine; estramustine phosphate sodium; etanidazole; etoposide; etoposide phosphate; etoprine; fadrozole hydrochloride; fazarabine; fenretinide; floxuridine; fludarabine phosphate; fluorouracil; fluorocitabine; fosquidone; fostriecin sodium; gemcitabine; gemcitabine hydrochloride; hydroxyurea; idarubicin hydrochloride; ifosfamide; ilmofosine; interleukin II (including recombinant interleukin II, or rIL2), interferon-α-2a; interferon alfa-2b; interferon alfa-n1; interferon alfa-n3; interferon beta-I a; interferon gamma-I b; iproplatin; irinotecan hydrochloride; lanreotide acetate; letrozole; leuprolide acetate; liarozole hydrochloride; lometrexol sodium; lomustine; losoxantrone hydrochloride; masoprocol; maytansine; mechlorethamine hydrochloride; megestrol acetate; melengestrol acetate; melphalan; menogaril; mercaptopurine; methotrexate; methotrexate sodium; metoprine; meturedepa; mitindomide; mitocarcin; mitocromin; mitogillin; mitomalcin; mitomycin; mitosper; mitotane; mitoxantrone hydrochloride; mycophenolic acid; nocodazole; nogalamycin; ormaplatin; oxisuran; pegaspargase; peliomycin; pentamustine; peplomycin sulfate; perfosfamide; pipobroman; piposulfan; piroxantrone hydrochloride; plicamycin; plomestane; porfimer sodium; porfiromycin; prednimustine; procarbazine hydrochloride; puromycin; puromycin hydrochloride; pyrazofurin; riboprine; rogletimide; safingol; safingol hydrochloride; semustine; simtrazene; sparfosate sodium; sparsomycin; spirogermanium hydrochloride; spiromustine; spiroplatin; streptonigrin; streptozocin; sulofenur; talisomycin; tecogalan sodium; tegafur; temozolomide, teloxantrone hydrochloride; temoporfin; teniposide; teroxirone; testolactone; thiamiprine; thioguanine; thiotepa; tiazofurin; tirapazamine; toremifene citrate; trestolone acetate; triciribine phosphate; trimetrexate; trimetrexate glucuronate; triptorelin; tubulozole hydrochloride; uracil mustard; uredepa; vapreotide; verteporfin; vinblastine sulfate; vincristine sulfate; vindesine; vindesine sulfate; vinepidine sulfate; vinglycinate sulfate; vinleurosine sulfate; vinorelbine tartrate; vinrosidine sulfate; vinzolidine sulfate; vorozole; zeniplatin; zinostatin; zorubicin hydrochloride.

Other anticancer therapeutic agents include, but are not limited to: 20-epi-1,25 dihydroxyvitamin D3; 5-ethynyluracil; abiraterone; aclarubicin; acylfulvene; adecypenol; adozelesin; aldesleukin; ALL-TK antagonists; altretamine; ambamustine; amidox; amifostine; aminolevulinic acid; amrubicin; amsacrine; anagrelide; anastrozole; andrographolide; angiogenesis inhibitors; antagonist D; antagonist G; antarelix; anti-dorsalizing morphogenetic protein-1; antiandrogen, prostatic carcinoma; antiestrogen; antineoplaston; antisense oligonucleotides; aphidicolin glycinate; apoptosis gene modulators; apoptosis regulators; apurinic acid; ara-CDP-DL-PTBA; arginine deaminase; asulacrine; atamestane; atrimustine; axinastatin 1; axinastatin 2; axinastatin 3; azasetron; azatoxin; azatyrosine; baccatin III derivatives; balanol; batimastat; BCR/ABL antagonists; benzochlorins; benzoylstaurosporine; beta lactam derivatives; betaalethine; betaclamycin B; betulinic acid; bFGF inhibitor; bicalutamide; bisantrene; bisaziridinylspermine; bisnafide; bistratene A; bizelesin; breflate; bropirimine; budotitane; buthionine sulfoximine; calcipotriol; calphostin C; camptothecin derivatives; canarypox IL-2; capecitabine; carboxamide-amino-triazole; carboxyamidotriazole; CaRest M3; CARN 700; cartilage derived inhibitor; carzelesin; casein kinase inhibitors (ICOS); castanospermine; cecropin B; cetrorelix; chlorlns; chloroquinoxaline sulfonamide; cicaprost; cis-porphyrin; cladribine; clomifene analogues; clotrimazole; collismycin A; collismycin B; combretastatin A4; combretastatin analogue; conagenin; crambescidin 816; crisnatol; cryptophycin 8; cryptophycin A derivatives; curacin A; cyclopentanthraquinones; cycloplatam; cypemycin; cytarabine ocfosfate; cytolytic factor; cytostatin; dacliximab; decitabine; dehydrodidemnin B; deslorelin; dexamethasone; dexifosfamide; dexrazoxane; dexverapamil; diaziquone; didemnin B; didox; diethylnorspermine; dihydro-5-azacytidine; 9-dioxamycin; diphenyl spiromustine; docosanol; dolasetron; doxifluridine; doxorubicin; droloxifene; dronabinol; duocarmycin SA; ebselen; ecomustine; edelfosine; edrecolomab; eflornithine; elemene; emitefur; epirubicin; epristeride; estramustine analogue; estrogen agonists; estrogen antagonists; etanidazole; etoposide phosphate; exemestane; fadrozole; fazarabine; fenretinide; filgrastim; finasteride; flavopiridol; flezelastine; fluasterone; fludarabine; fluorodaunorunicin hydrochloride; forfenimex; formestane; fostriecin; fotemustine; gadolinium texaphyrin; gallium nitrate; galocitabine; ganirelix; gelatinase inhibitors; gemcitabine; glutathione inhibitors; hepsulfam; heregulin; hexamethylene bisacetamide; hypericin; ibandronic acid; idarubicin; idoxifene; idramantone; ilmofosine; ilomastat; imidazoacridones; imiquimod; immunostimulant peptides; insulin-like growth factor-1 receptor inhibitor; interferon agonists; interferons; interleukins; iobenguane; iododoxorubicin; ipomeanol, 4-; iroplact; irsogladine; isobengazole; isohomohalicondrin B; itasetron; jasplakinolide; kahalalide F; lamellarin-N triacetate; lanreotide; leinamycin; lenograstim; lentinan sulfate; leptolstatin; letrozole; leukemia inhibiting factor; leukocyte alpha interferon; leuprolide+estrogen+progesterone; leuprorelin; levamisole; liarozole; linear polyamine analogue; lipophilic disaccharide peptide; lipophilic platinum compounds; lissoclinamide 7; lobaplatin; lombricine; lometrexol; lonidamine; losoxantrone; lovastatin; loxoribine; lurtotecan; lutetium texaphyrin; lysofylline; lytic peptides; maitansine; mannostatin A; marimastat; masoprocol; maspin; matrilysin inhibitors; matrix metalloproteinase inhibitors; menogaril; merbarone; meterelin; methioninase; metoclopramide; MIF inhibitor; mifepristone; miltefosine; mirimostim; mismatched double stranded RNA; mitoguazone; mitolactol; mitomycin analogues; mitonafide; mitotoxin fibroblast growth factor-saporin; mitoxantrone; mofarotene; molgramostim; monoclonal antibody, human chorionic gonadotrophin; monophosphoryl lipid A+myobacterium cell wall sk; mopidamol; multiple drug resistance gene inhibitor; multiple tumor suppressor 1-based therapy; mustard anticancer agent; mycaperoxide B; mycobacterial cell wall extract; myriaporone; N-acetyldinaline; N-substituted benzamides; nafarelin; nagrestip; naloxone+pentazocine; napavin; naphterpin; nartograstim; nedaplatin; nemorubicin; neridronic acid; neutral endopeptidase; nilutamide; nisamycin; nitric oxide modulators; nitroxide antioxidant; nitrullyn; 06-benzylguanine; octreotide; okicenone; oligonucleotides; onapristone; ondansetron; ondansetron; oracin; oral cytokine inducer; ormaplatin; osaterone; oxaliplatin; oxaunomycin; palauamine; palmitoylrhizoxin; pamidronic acid; panaxytriol; panomifene; parabactin; pazelliptine; pegaspargase; peldesine; pentosan polysulfate sodium; pentostatin; pentrozole; perflubron; perfosfamide; perillyl alcohol; phenazinomycin; phenylacetate; phosphatase inhibitors; picibanil; pilocarpine hydrochloride; pirarubicin; piritrexim; placetin A; placetin B; plasminogen activator inhibitor; platinum complex; platinum compounds; platinum-triamine complex; porfimer sodium; porfiromycin; prednisone; propyl bis-acridone; prostaglandin J2; proteasome inhibitors; protein A-based immune modulator; protein kinase C inhibitor; protein kinase C inhibitors, microalgal; protein tyrosine phosphatase inhibitors; purine nucleoside phosphorylase inhibitors; purpurins; pyrazoloacridine; pyridoxylated hemoglobin polyoxyethylene conjugate; raf antagonists; raltitrexed; ramosetron; ras farnesyl protein transferase inhibitors; ras inhibitors; ras-GAP inhibitor; retelliptine demethylated; rhenium Re 186 etidronate; rhizoxin; ribozymes; RII retinamide; rogletimide; rohitukine; romurtide; roquinimex; rubiginone B1; ruboxyl; safingol; saintopin; SarCNU; sarcophytol A; sargramostim; Sdi 1 mimetics; semustine; senescence derived inhibitor 1; sense oligonucleotides; signal transduction inhibitors; signal transduction modulators; single chain antigen-binding protein; silicon phthalocyanine (PC4) sizofuran; sobuzoxane; sodium borocaptate; sodium phenylacetate; solverol; somatomedin binding protein; sonermin; sparfosic acid; spicamycin D; spiromustine; splenopentin; spongistatin 1; squalamine; stem cell inhibitor; stem-cell division inhibitors; stipiamide; stromelysin inhibitors; sulfinosine; superactive vasoactive intestinal peptide antagonist; suradista; suramin; swainsonine; synthetic glycosamOinoglycans; tallimustine; tamoxifen methiodide; tauromustine; tazarotene; tecogalan sodium; tegafur; tellurapyrylium; telomerase inhibitors; temoporfin; temozolomide; teniposide; tetrachlorodecaoxide; tetrazomine; thaliblastine; thalidomide; thiocoraline; thrombopoietin; thrombopoietin mimetic; thymalfasin; thymopoietin receptor agonist; thymotrinan; thyroid stimulating hormone; tin ethyl etiopurpurin; tirapazamine; titanocene bichloride; topsentin; toremifene; totipotent stem cell factor; translation inhibitors; tretinoin; triacetyluridine; triciribine; trimetrexate; triptorelin; tropisetron; turosteride; tyrosine kinase inhibitors; tyrphostins; UBC inhibitors; ubenimex; urogenital sinus-derived growth inhibitory factor; urokinase receptor antagonists; vapreotide; variolin B; vector system, erythrocyte gene therapy; velaresol; veramine; verdins; verteporfin; vinorelbine; vinxaltine; vitaxin; vorozole; zanoterone; zeniplatin; zilascorb; and zinostatin stimalamer.

Other anticancer agents can include the following marketed drugs and drugs in development: Erbulozole (also known as R-55104), Dolastatin 10 (also known as DLS-10 and NSC-376128), Mivobulin isethionate (also known as CI-980), Vincristine, NSC-639829, Discodermolide (also known as NVP-XX-A-296), ABT-751 (Abbott, also known as E-7010), Altorhyrtins (such as Altorhyrtin A and Altorhyrtin C), Spongistatins (such as Spongistatin 1, Spongistatin 2, Spongistatin 3, Spongistatin 4, Spongistatin 5, Spongistatin 6, Spongistatin 7, Spongistatin 8, and Spongistatin 9), Cemadotin hydrochloride (also known as LU-103793 and NSC-D-669356), Epothilones (such as Epothilone A, Epothilone B, Epothilone C (also known as desoxyepothilone A or dEpoA), Epothilone D (also referred to as KOS-862, dEpoB, and desoxyepothilone B), Epothilone E, Epothilone F, Epothilone B N-oxide, Epothilone A N-oxide, 16-aza-epothilone B, 21-aminoepothilone B (also known as BMS-310705), 21-hydroxyepothilone D (also known as Desoxyepothilone F and dEpoF), 26-fluoroepothilone), Auristatin PE (also known as NSC-654663), Soblidotin (also known as TZT-1027), LS-4559-P (Pharmacia, also known as LS-4577), LS-4578 (Pharmacia, also known as LS-477-P), LS-4477 (Pharmacia), LS-4559 (Pharmacia), RPR-112378 (Aventis), Vincristine sulfate, DZ-3358 (Daiichi), FR-182877 (Fujisawa, also known as WS-9885B), GS-164 (Takeda), GS-198 (Takeda), KAR-2 (Hungarian Academy of Sciences), BSF-223651 (BASF, also known as ILX-651 and LU-223651), SAH-49960 (Lilly/Novartis), SDZ-268970 (Lilly/Novartis), AM-97 (Armad/Kyowa Hakko), AM-132 (Arnad), AM-138 (Armad/Kyowa Hakko), IDN-5005 (Indena), Cryptophycin 52 (also known as LY-355703), AC-7739 (Ajinomoto, also known as AVE-8063A and CS-39.HCl), AC-7700 (Ajinomoto, also known as AVE-8062, AVE-8062A, CS-39-L-Ser.HCl, and RPR-258062A), Vitilevuamide, Tubulysin A, Canadensol, Centaureidin (also known as NSC-106969), T-138067 (Tularik, also known as T-67, TL-138067 and TI-138067), COBRA-1 (Parker Hughes Institute, also known as DDE-261 and WHI-261), H10 (Kansas State University), H16 (Kansas State University), Oncocidin A1 (also known as BTO-956 and DIME), DDE-313 (Parker Hughes Institute), Fijianolide B, Laulimalide, SPA-2 (Parker Hughes Institute), SPA-1 (Parker Hughes Institute, also known as SPIKET-P), 3-IAABU (Cytoskeleton/Mt. Sinai School of Medicine, also known as MF-569), Narcosine (also known as NSC-5366), Nascapine, D-24851 (Asta Medica), A-105972 (Abbott), Hemiasterlin, 3-BAABU (Cytoskeleton/Mt. Sinai School of Medicine, also known as MF-191), TMPN (Arizona State University), Vanadocene acetylacetonate, T-138026 (Tularik), Monsatrol, Inanocine (also known as NSC-698666), 3-IAABE (Cytoskeleton/Mt. Sinai School of Medicine), A-204197 (Abbott), T-607 (Tularik, also known as T-900607), RPR-115781 (Aventis), Eleutherobins (such as Desmethyleleutherobin, Desaetyleleutherobin, Isoeleutherobin A, and Z-Eleutherobin), Caribaeoside, Caribaeolin, Halichondrin B, D-64131 (Asta Medica), D-68144 (Asta Medica), Diazonamide A, A-293620 (Abbott), NPI-2350 (Nereus), Taccalonolide A, TUB-245 (Aventis), A-259754 (Abbott), Diozostatin, (–)-Phenylahistin (also known as NSCL-96F037), D-68838 (Asta Medica), D-68836 (Asta Medica), Myoseverin B, D-43411 (Zentaris, also known as D-81862), A-289099 (Abbott), A-318315 (Abbott), HTI-286 (also known as SPA-110, trifluoroacetate salt) (Wyeth), D-82317 (Zentaris), D-82318 (Zentaris), SC-12983 (NCI), Resverastatin phosphate sodium, BPR-OY-007 (National Health Research Institutes), and SSR-250411 (Sanofi).

Still other anticancer therapeutic agents include alkylating agents, such as nitrogen mustards (e.g., mechloroethamine, cyclophosphamide, chlorambucil, melphalan, etc.), ethylenimine and methylmelamines (e.g., hexamethylmelamine, thiotepa), alkyl sulfonates (e.g., busulfan), nitrosoureas (e.g., carmustine, lomusitne, semustine, streptozocin, etc.), or triazenes (decarbazine, etc.), antimetabolites, such as folic acid analog (e.g., methotrexate), or pyrimidine analogs (e.g., fluorouracil, floxouridine, Cytarabine), purine analogs (e.g., mercaptopurine, thioguanine, pentostatin, vinca alkaloids (e.g., vinblastin, vincristine), epipodophyllotoxins (e.g., etoposide, teniposide), platinum coordination complexes (e.g., cisplatin, carboblatin), anthracenedione (e.g., mitoxantrone), substituted urea (e.g., hydroxyurea), methyl hydrazine derivative (e.g., procarbazine), adrenocortical suppressant (e.g., mitotane, amino glutethimide).

In particular embodiments, anticancer agents include angiogenesis inhibitors such as angiostatin K1-3, DL-α-difluoromethyl-ornithine, endostatin, fumagillin, genistein, minocycline, staurosporine, and (±)-thalidomide; DNA intercalating or cross-linking agents such as bleomycin, carboplatin, carmustine, chlorambucil, cyclophosphamide, cisplatin, melphalan, mitoxantrone, and oxaliplatin; DNA synthesis inhibitors such as methotrexate, 3-Amino-1,2,4-benzotriazine 1,4-dioxide, aminopterin, cytosine β-D-arabinofuranoside, 5-Fluoro-5'-deoxyuridine, 5-Fluorouracil, gaciclovir, hydroxyurea, and mitomycin C; DNA-RNA transcription regulators such as actinomycin D, daunorubicin, doxorubicin, homoharringtonine, and idarubicin; enzyme inhibitors such as S(+)-camptothecin, curcumin, (–)-deguelin, 5,6-dichlorobenz-imidazole 1-β-D-ribofuranoside, etoposine, formestane, fostriecin, hispidin, cyclocreatine, mevinolin, trichostatin A, tyrophostin AG 34, and tyrophostin AG 879, Gene Regulating agents such as 5-aza-2'-deoxycitidine, 5-azacytidine, cholecalciferol, 4-hydroxytamoxifen, melatonin, mifepristone, raloxifene, all trans-retinal, all trans retinoic acid, 9-cis-retinoic acid, retinol, tamoxifen, and troglitazone; Microtubule Inhibitors such as colchicine, dolostatin 15, nocodazole, paclitaxel, podophyllotoxin, rhizoxin, vinblastine, vincristine, vindesine, and vinorelbine; and various other antitumor agents such as 17-(allylamino)-17-demethoxygeldanamycin, 4-Amino-1,8-naphthalimide, apigenin, brefeldin A, cimetidine, dichloromethylene-diphosphonic acid, leuprolide, luteinizing-hormone-releasing hormone, pifithrin, rapamycin, thapsigargin, and bikunin, and derivatives (as defined for imaging agents) thereof.

In some embodiments, the method can further include the step of ablating the cancer. Ablating the cancer can be accomplished using a method selected from the group consisting of cryoablation, thermal ablation, radiotherapy, chemotherapy, radiofrequency ablation, electroporation, alcohol ablation, high intensity focused ultrasound, photodynamic therapy, administration of monoclonal antibodies, immunotherapy, and administration of immunotoxins.

In some embodiments, the step ablating the cancer includes immunotherapy of the cancer. Cancer immunotherapy is based on therapeutic interventions that aim to utilize the immune system to combat malignant diseases. It can be divided into unspecific approaches and specific approaches. Unspecific cancer immunotherapy aims at activating parts of the immune system generally, such as treatment with specific cytokines known to be effective in cancer immunotherapy (e.g., IL-2, interferon's, cytokine inducers).

In contrast, specific cancer immunotherapy is based on certain antigens that are preferentially or solely expressed on cancer cells or predominantly expressed by other cells in the context of malignant disease (usually in vicinity of the tumor site). Specific cancer immunotherapy can be grouped into passive and active approaches.

In passive specific cancer immunotherapy substances with specificity for certain structures related to cancer that are derived from components of the immune system are administered to the patient. The most prominent and successful approaches are treatments with humanized or mouse/human chimeric monoclonal antibodies against defined cancer associated structures (such as Trastuzumab, Rituximab, Cetuximab, Bevacizumab, Alemtuzumab). The pharmacologically active substance exerts is activity as long as a sufficient concentration is present in the body of the patient, therefore administrations have to be repeated based on pharmacokinetic and pharmacodynamic considerations.

On the other hand, active specific cancer immunotherapy aims at antigen-specific stimulation of the patient's immune system to recognize and destroy cancer cells. Active specific cancer immunotherapy therefore, in general, is a therapeutic vaccination approach. There are many types of cancer vaccine approaches being pursued, such as vaccination with autologous or allogeneic whole tumor cells (in most cases genetically modified for better immune recognition), tumor cell lysates, whole tumor associated antigens (produced by means of genetic engineering or by chemical synthesis), peptides derived from protein antigens, DNA vaccines encoding for tumor associated antigens, surrogates of tumor antigens such as anti-idiotypic antibodies used as vaccine antigens, and the like. These manifold approaches are usually administered together with appropriate vaccine adjuvants and other immunomodulators in order to elicit a quantitatively and qualitatively sufficient immune response (many novel vaccine adjuvant approaches are being pursued in parallel with the development of cancer vaccines). Another set of cancer vaccine approaches relies on manipulating dendritic cells (DC) as the most important antigen presenting cell of the immune system. For example, loading with tumor antigens or tumor cell lysates, transfection with genes encoding for tumor antigens and in-vivo targeting are suitable immunotherapies that can be used together with the virus or virus-like particles of the invention for cancer treatment.

In some embodiments, the step of ablating the cancer includes administering a therapeutically effective amount of radiotherapy (RT) to the subject. It is contemplated that the combination treatment of radiotherapy and a CPMV-immune checkpoint modulating agent in situ vaccine can result in significantly reduced tumor growth compared to RT or CPMV-immune checkpoint modulating agent treatment alone. Without being bound by theory, it is believed that RT can prime the tumor by debulking the tumor to provide a burst of tumor antigens in the context of immunogenic cell death that fosters specific immune recognition and response to those antigen; in turn, plant virus nanoparticle-mediated immune stimulation can further augment antitumor immunity to protect from outgrowth of metastases and recurrence of the disease. Thus, in some embodiments, RT is administered prior to in situ administration of the plant virus or plant virus-like particle and immune checkpoint modulating agent. In some embodiments, administering in situ to the cancer, (e.g., a tumor site) a therapeutically effective amount of a plant virus or virus-like particle and an immune checkpoint modulating agent to the subject in combination with administering radiotherapy to the subject can result in an additional increase in tumor infiltrating lymphocytes (TILs), such as tumor infiltrating neutrophils (TINs) at the tumor site of the subject.

Radiotherapy uses high-energy rays to treat disease, usually x-rays and similar rays (such as electrons). Radiotherapy administered to a subject can include both external and internal. External radiotherapy (or external beam radiation) aims high-energy x-rays at the tumor site including in some cases the peri-tumor margin. External radiotherapy typically includes the use of a linear accelerator (e.g., a Varian 2100C linear accelerator). External radiation therapy can include three-dimensional conformal radiation therapy (3D-CRT), image guided radiation therapy (IGRT), intensity modulated radiation therapy (IMRT), helical-tomotherapy, photon beam radiation therapy, proton beam radiation therapy, stereotactic radiosurgery and/or sterotactic body radiation therapy (SBRT).

Internal radiotherapy (brachytherapy) involves having radioactive material placed inside the body and allows a higher dose of radiation in a smaller area than might be possible with external radiation treatment. It uses a radiation source that's usually sealed in an implant. Exemplary implants include pellets, seeds, ribbons, wires, needles, capsules, balloons, or tubes. Implants are placed in your body, very close to or inside the tumor. Internal radiotherapy can include intracavitary or interstitial radiation. During intracavitary radiation, the radioactive source is placed in a body cavity (space), such as the uterus. With interstitial radiation, the implants are placed in or near the tumor, but not in a body cavity.

It has been shown that moderate magnetic nanoparticle hyperthermia (mNPH) treatment administered to a tumor can generate immune-based systemic resistance to tumor rechallenge. Therefore, in some embodiments, a therapeutically effective amount of a moderate magnetic nanoparticle hyperthermia (mNPH) treatment can be administered to the subject in combination with a plant virus-like particle, immune checkpoint modulating agent and/or radiotherapy, wherein the mNPH is activated with an alternating magnetic field (AMF) to produce moderate heat. Without being bound by theory, it is believed that plant virus-like particle immune adjuvants, such as a plant virus nanoparticle and/or a mNPH, will combine with RT-induced generation of immunogenic cell death (ICD) to expand the tumor specific effector T cell population causing longer local and distant tumor remission.

A mNPH treatment can include the use of a magnetic iron oxide nanoparticle (IONP). Once administered to the subject intratumorally, the mNPH can, in some embodiments, be activated with an alternating magnetic field (AMF) to produce moderate heat (e.g., 43°/60 min) at the tumor site. In some embodiments the RT is hypofractionated RT (HFRT) that delivers larger but fewer doses/fractions than typical RT therapies. In an exemplary embodiment, a therapeutically effective amount of RT can be administered to a subject in combination with a plant virus-like particle, an immune checkpoint modulating agent and/or a mNPH for the treatment of oral melanoma.

Cargo Molecules

In some embodiments, the plant virus or plant virus-like particle is loaded with or bonded to a cargo molecule. A variety of different types of cargo molecules can be loaded into or bonded to the virus particles. Cargo molecules that are loaded into the virus particle must be sufficiently small to fit within the virus capsid (i.e., have a size of 10 nm or less for a typical icosahedral capsid). Preferred cargo molecules for the present invention include antitumor agents. Alternately, rather than being loaded into the plant virus or plant virus-like particle, the cargo molecule can be bonded or conjugated to the plant virus or plant virus-like particle. The term "conjugating" when made in reference to an cargo molecule, such as an anticancer agent and a plant virus particle as used herein, means covalently linking the cargo molecule to the virus subject to the single limitation that the nature and size of the agent and the site at which it is covalently linked to the virus particle do not interfere with the biodistribution of the modified virus.

In general, cargo molecules can be conjugated to the plant virus or plant virus-like particle by any suitable technique, with appropriate consideration of the need for pharmacokinetic stability and reduced overall toxicity to the patient. The cargo molecule can be linked to the interior or the exterior of the virus or virus-like particle, while in some embodiments the cargo molecule is linked to both the interior and the exterior of the virus or virus-like particle. The location of the cargo molecule on the interior or exterior can be governed by the amino acids of the viral coat protein.

A cargo molecule can be coupled to a plant virus or plant virus-like particle either directly or indirectly (e.g. via a linker group). In some embodiments, the cargo molecule is directly attached to a functional group capable of reacting with the agent. For example, a nucleophilic group, such as an amino or sulfhydryl group, can be capable of reacting with a carbonyl-containing group, such as an anhydride or an acid halide, or with an alkyl group containing a good leaving group (e.g., a halide). Alternatively, a suitable chemical linker group can be used. A linker group can serve to increase the chemical reactivity of a substituent on either the agent or the virus particle, and thus increase the coupling efficiency. A preferred group suitable as a site for attaching cargo molecules to the virus particle is one or more lysine residues present in the viral coat protein that have a free amino group that can be capable of reacting with a carbonyl-containing group, such as an anhydride or an acid halide, or with an alkyl group containing a good leaving group (e.g., a halide). Viral coat proteins also contain glutamic and aspartic acids. The carboxylate groups of these amino acids also present attractive targets for functionalization using carbodiimide activated linker molecules; cysteines can also be present which facilitate chemical coupling via thiol-selective chemistry (e.g., maleimide-activated compounds). Further, viral coat proteins contain tyrosines, which can be modified using diazonium coupling reactions. In addition, genetic modification can be applied to introduce any desired functional residue, including non-natural amino acids, e.g. alkyne- or azide-functional groups. See Hermanson, G. T. Bioconjugation Techniques. (Academic Press, 2008) and Pokorski, J. K. and N. F. Steinmetz, Mol Pharm 8(1): 29-43 (2011), the disclosures of which are incorporated herein by reference.

Alternatively, a suitable chemical linker group can be used. A linker group can serve to increase the chemical reactivity of a substituent on either the agent or the virus particle, and thus increase the coupling efficiency. Suitable linkage chemistries include maleimidyl linkers, which can be used to link to thiol groups, isothiocyanate and succinimidyl (e.g., N-hydroxysuccinimidyl (NHS)) linkers, which can link to free amine groups, diazonium which can be used to link to phenol, and amines, which can be used to link with free acids such as carboxylate groups using carbodiimide activation. Useful functional groups are present on viral coat proteins based on the particular amino acids present, and additional groups can be designed into recombinant viral coat proteins. It will be evident to those skilled in the art that a variety of bifunctional or polyfunctional reagents, both homo- and hetero-functional (such as those described in the catalog of the Pierce Chemical Co., Rockford, Ill.), can be employed as a linker group. Coupling can be effected, for example, through amino groups, carboxyl groups, sulfhydryl groups or oxidized carbohydrate residues.

Other types of linking chemistries are also available. For example, methods for conjugating polysaccharides to peptides are exemplified by, but not limited to coupling via alpha- or epsilon-amino groups to $NaIO_4$-activated oligosaccharide (Bocher et al., J. Immunol. Methods 27, 191-202 (1997)), using squaric acid diester (1,2-diethoxycyclobutene-3,4-dione) as a coupling reagent (Tietze et al. Bioconjug Chem. 2:148-153 (1991)), coupling via a peptide linker wherein the polysaccharide has a reducing terminal and is free of carboxyl groups (U.S. Pat. No. 5,342,770), and coupling with a synthetic peptide carrier derived from human heat shock protein hsp65 (U.S. Pat. No. 5,736,146). Further methods for conjugating polysaccharides, proteins, and lipids to plant virus peptides are described by U.S. Pat. No. 7,666,624.

Dosage and Formulation of Plant Virus or Plant Virus-Like Particles and Immune Checkpoint Modulating Agents When used in vivo, the plant virus or plant virus-like particles and an immune checkpoint therapy, alone or in combination, can be administered as a pharmaceutical composition, comprising a mixture, and a pharmaceutically acceptable carrier. The plant virus or virus-like particle and/or an immune checkpoint modulating agent may be present in a pharmaceutical composition in an amount from 0.001 to 99.9 wt %, more preferably from about 0.01 to 99 wt %, and even more preferably from 0.1 to 95 wt %.

The plant virus particles or virus-like particles and/or an immune checkpoint modulating agent, or pharmaceutical compositions comprising these particles or agents, may be administered by any method designed to provide the desired effect. Administration may occur enterally or parenterally;

for example intratumorally, orally, rectally, intracisternally, intravaginally, intraperitoneally or locally. Parenteral administration methods include intravascular administration (e.g., intravenous bolus injection, intravenous infusion, intra-arterial bolus injection, intra-arterial infusion and catheter instillation into the vasculature), peri- and intra-target tissue injection, subcutaneous injection or deposition including subcutaneous infusion (such as by osmotic pumps), intramuscular injection, intraperitoneal injection, intracranial and intrathecal administration for CNS tumors, and direct application to the target area, for example by a catheter or other placement device. In a particular embodiment, the plant virus or virus-like particle and the immune checkpoint modulating agent are administered to the subject by intratumoral injection.

When formulated as separate compositions, "combination therapy" is intended to embrace administration of these therapeutic agents in a sequential manner, that is, wherein each therapeutic agent is administered at a different time, as well as administration of these therapeutic agents, in a substantially simultaneous manner. For example, administration of the plant virus or plant virus-like particle is carried out in a substantially simultaneous manner as the one or more immune checkpoint modulating agent administration. Sequential or substantially simultaneous administration of each therapeutic agent can be effected by any appropriate route including, but not limited to, intratumoral routes, intraperitoneal routes, oral routes, intravenous routes, intramuscular routes, and direct absorption through mucous membrane tissues. A preferred method for administering the plant virus or virus-like particle and one or more immune checkpoint modulating agents to a subject having cancer is by intratumoral injection. However, the therapeutic agents can be administered by the same route or by different routes. For example, plant virus or plant virus-like particles of the combination selected may be administered by intratumoral injection while the immune checkpoint modulating agent(s) of the combination may be administered orally or intravenously. Alternatively, for example, all therapeutic agents may be administered by intratumorally injection. The sequence in which the therapeutic agents are administered is not narrowly critical.

The compositions can also include, depending on the formulation desired, pharmaceutically-acceptable, non-toxic carriers or diluents, which are defined as vehicles commonly used to formulate pharmaceutical compositions for animal or human administration. The diluent is selected so as not to affect the biological activity of the combination. Examples of such diluents are distilled water, physiological phosphate-buffered saline, Ringer's solutions, dextrose solution, and Hank's solution. In addition, the pharmaceutical composition or formulation may also include other carriers, adjuvants, or nontoxic, nontherapeutic, nonimmunogenic stabilizers and the like.

Suitable pharmaceutically acceptable carriers may contain inert ingredients which do not unduly inhibit the biological activity of the compounds. The pharmaceutically acceptable carriers should be biocompatible, e.g., non-toxic, non-inflammatory, non-immunogenic and devoid of other undesired reactions upon the administration to a subject. Standard pharmaceutical formulation techniques can be employed, such as those described in Remington's Pharmaceutical Sciences, ibid. Suitable pharmaceutical carriers for parenteral administration include, for example, sterile water, physiological saline, bacteriostatic saline (saline containing about 0.9% mg/ml benzyl alcohol), phosphate-buffered saline, Hank's solution, Ringer's-lactate and the like. Methods for encapsulating compositions (such as in a coating of hard gelatin or cyclodextran) are known in the art (Baker, et al., "Controlled Release of Biological Active Agents", John Wiley and Sons, 1986).

A pharmaceutically acceptable carrier for a pharmaceutical composition can also include delivery systems known to the art for entraining or encapsulating drugs, such as anticancer drugs. In some embodiments, the disclosed compounds can be employed with such delivery systems including, for example, liposomes, nanoparticles, nanospheres, nanodiscs, dendrimers, and the like. See, for example Farokhzad, O. C., Jon, S., Khademhosseini, A., Tran, T. N., Lavan, D. A., and Langer, R. (2004). "Nanoparticle-aptamer bioconjugates: a new approach for targeting prostate cancer cells." Cancer Res., 64, 7668-72; Dass, C. R. (2002). "Vehicles for oligonucleotide delivery to tumours." J. Pharm. Pharmacol., 54, 3-27; Lysik, M. A., and Wu-Pong, S. (2003). "Innovations in oligonucleotide drug delivery." J. Pharm. Sci., 92, 1559-73; Shoji, Y., and Nakashima, H. (2004). "Current status of delivery systems to improve target efficacy of oligonucleotides." Curr. Pharm. Des., 10, 785-96; Allen, T. M., and Cullis, P. R. (2004). "Drug delivery systems: entering the mainstream." Science, 303, 1818-22. The entire teachings of each reference cited in this paragraph are incorporated herein by reference.

Suitable doses can vary widely depending on the therapeutic or imaging agent being used. A typical pharmaceutical composition for intravenous administration would be about 0.1 mg to about 10 g per subject per day. However, in other embodiments, doses from about 1 mg to about 1 g, or from about 10 mg to about 1 g can be used. Single or multiple administrations of the compositions may be administered depending on the dosage and frequency as required and tolerated by the subject. In any event, the administration regime should provide a sufficient quantity of the composition of this invention to effectively treat the subject.

The formulations may be conveniently presented in unit dosage form and may be prepared by any of the methods well known in the art of pharmacy. Preferably, such methods include the step of bringing the virus particles into association with a pharmaceutically acceptable carrier that constitutes one or more accessory ingredients. In general, the formulations are prepared by uniformly and intimately bringing the active agent into association with a liquid carrier, a finely divided solid carrier, or both, and then, if necessary, shaping the product into the desired formulations. The methods of the invention include administering to a subject, preferably a mammal, and more preferably a human, the composition of the invention in an amount effective to produce the desired effect.

One skilled in the art can readily determine an effective amount of plant virus, plant virus-like particles and/or immune checkpoint modulating agents to be administered to a given subject, by taking into account factors such as the size and weight of the subject; the extent of disease penetration; the age, health and sex of the subject; the route of administration; and whether the administration is local or systemic. Those skilled in the art may derive appropriate dosages and schedules of administration to suit the specific circumstances and needs of the subject. For example, suitable doses of the virus particles to be administered can be estimated from the volume of cancer cells to be killed or volume of tumor to which the virus particles are being administered.

Useful dosages of the active agents can be determined by comparing their in vitro activity and the in vivo activity in animal models. Methods for extrapolation of effective dosages in mice, and other animals, to humans are known in the art. An amount adequate to accomplish therapeutic or prophylactic treatment is defined as a therapeutically- or prophylactically-effective dose. In both prophylactic and therapeutic regimes, agents are usually administered in several dosages until an effect has been achieved. Effective doses of the virus particles vary depending upon many different factors, including means of administration, target site, physiological state of the patient, whether the patient is human or an animal, characteristics of the subject, such as general health, age, sex, body weight and tolerance to drugs as well as the degree, severity and type of cancer, other medications administered, and whether treatment is prophylactic or therapeutic. The skilled artisan will be able to determine appropriate dosages depending on these and other factors using standard clinical techniques.

The therapeutically effective amounts of plant virus or plant virus-like particle and/or an immune checkpoint therapy can include the amount(s) effective to increase tumor infiltration by antitumor neutrophils/macrophages, natural killer cells, an/or CD4+ and CD8+ effector T cells and inhibit immunosuppressive cells in the tumor microenvironment. In some embodiments, a therapeutically effective amount of a plant virus or plant virus-like particle and an immune checkpoint therapy can include the amount effective to generate systemic tumor-specific T cells targeting the subject's tumor cells. In an exemplary embodiment, a therapeutically effective amount of a plant virus or plant virus-like particle and an immune checkpoint modulating agent can include the amount effective to produce a synergistic effect on the antitumor response of TILs at a tumor site of the subject.

The methods described herein contemplate single as well as multiple administrations, given either simultaneously or over an extended period of time. A pharmaceutically acceptable composition containing the plant virus, virus-like particle, and/or additional cancer therapeutic can be administered at regular intervals, depending on the nature and extent of the cancer's effects, and on an ongoing basis. Administration at a "regular interval," as used herein, indicates that the therapeutically effective amount is administered periodically (as distinguished from a one-time dose). In one embodiment, the pharmaceutically acceptable composition including the plant virus, virus-like particle, one or more immune checkpoint modulating agents, and/or an additional cancer therapeutic is administered periodically, e.g., at a regular interval (e.g., bimonthly, monthly, biweekly, weekly, twice weekly, daily, twice a day or three times or more often a day). In an exemplary embodiment, the pharmaceutically acceptable composition is administered to the subject weekly.

The administration interval for a single individual can be fixed, or can be varied over time, depending on the needs of the individual. For example, in times of physical illness or stress, or if disease symptoms worsen, the interval between doses can be decreased.

For example, the administration of a plant virus or virus like particle and/or the additional therapeutic agent can take place at least once on day 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or alternatively, at least once on week 1, 2, 3, 4, 5, 6, 7, 8, 9, 10, 11, 12, 13, 14, 15, 16, 17, 18, 19 or 20, or any combination thereof, using single or divided doses of every 60, 48, 36, 24, 12, 8, 6, 4, or 2 hours, or any combination thereof. Administration can take place at any time of day, for example, in the morning, the afternoon or evening. For instance, the administration can take place in the morning, e.g., between 6:00 a.m. and 12:00 noon; in the afternoon, e.g., after noon and before 6:00 p.m.; or in the evening, e.g., between 6:01 p.m. and midnight.

In some embodiments, the frequency of administration of a plant virus or plant virus-like particle and/or an immune checkpoint modulating agent can pose challenging for clinical implementation. Therefore, in some embodiments, the plant virus or plant virus-like particle and/or an immune checkpoint modulating agent administered in situ to a subject can be formulated in a slow release formulation in order to sustain immune stimulation by maintaining a therapeutic concentration of the plant virus or plant virus-like particle and/or immune checkpoint modulating agent in situ while alleviating the need for frequent administrations. In some embodiments, a slow release formulation can include a polymer-based hydrogel or a dendrimer.

In some embodiments, a slow-release formulation can include a plant virus or plant virus-like particle and/or an immune checkpoint modulating agent dendrimer hybrid aggregate. The dendrimer can include a positively-charged polyamidoamine (PAMAM) dendrimer, such as a medium-sized generation 3 (G3) or generation 4 (G4) PAMAM dendrimer. Depending on the specific application, the plant virus or plant virus-like particle and/or an immune checkpoint modulating agent-dendrimer hybrid aggregates can vary in size and release rate of the plant virus-like particle from the dendrimer when administered to a subject. In some embodiments, the plant virus or plant virus-like particle and/or an immune checkpoint modulating agent-dendrimer hybrid aggregates are formulated so that at low salt the assembly of the aggregates is triggered and while under physiologic salt concentrations disassembly and plant virus nanoparticle release is induced. In an exemplary embodiment, CPMV and polyamidoamine generation 4 dendrimer form aggregates (CPMV-G4). In particular embodiments, the plant virus-like particle-dendrimer hybrid aggregates, such as CPMV-G4 aggregates, can be administered in situ in combination with an immune checkpoint modulating agent for the treatment of ovarian cancer or gliomas.

Examples have been included to more clearly describe particular embodiments of the invention. However, there are a wide variety of other embodiments within the scope of the present invention, which should not be limited to the particular examples provided herein.

EXAMPLES

We previously reported that in situ vaccination with Cowpea mosaic virus (CPMV) promotes the activation of multiple innate immune cells and triggers their repolarization from pro-tumor to antitumor phenotypes, leading to the secretion of cytokines in the tumor microenvironment and the induction of CD8+ cytotoxic T lymphocyte (CTL) responses in multiple murine tumor models. CPMV is particularly useful as an adjuvant because it remodels the suppressive tumor microenvironment by increasing the number of tumor infiltrating lymphocytes (TILs), inducing the killing of tumor cells, which thus release a full range of tumor-associated antigens. We therefore hypothesized that CPMV in situ vaccination combined with ICT could improve the objective response rate by synergistically enhancing the amplitude of the vaccine-induced immune response, increasing the number of antigen-specific TILs and achieving a stronger response to lower systemic doses of ICT, mitigating the impact of adverse events.

To identify checkpoint-targeting drugs suitable for combination therapy with CPMV, we characterized the expression of different immune checkpoint regulators after CPMV treatment, focusing on PD-1 and OX40 as representative negative and positive regulators, respectively. PD-1 is expressed on the surface of immune cells, especially activated T cells, and interacts with programmed death ligand 1 (PD-L1), which is abundantly expressed on multiple tumor cells. The engagement of PD-1 by PD-L1 causes the inhibition or exhaustion of activated immune cells and thus suppress the antitumor response. Antibodies that block PD-1/PD-L1 interactions allow the differentiation of CD8+ T cells into CTLs that help to eradicate the tumor. In contrast, OX40 is a costimulatory molecule that augments antitumor responses. OX40 is a member of the TNF receptor superfamily and is expressed on CD4+ and CD8+ effector T cells as well as regulatory T cells. When engaged by its ligand OX40L, it triggers the NF-kB signaling pathway, leading to T cell clonal expansion and activation. Therefore, agonistic OX40-specific antibodies can promote T cell activation and elicit a stronger antitumor immune response. Although inhibitory anti-PD-1 antibodies and agonistic OX40-specific antibodies can promote tumor suppression in several tumor models, their efficacy is poor in tumors with low immunogenicity. In this example, we characterized the expression of PD-1 and OX40 in response to CPMV treatment in order to increase the immunogenicity of tumors, and then assessed the effectiveness of combination therapy using mouse models of ovarian cancer, colon cancer and melanoma.

Materials and Methods

CPMV Preparation and Therapeutic Antibodies

Wild-type CPMV was produced in house as previously described. Briefly, Black-eyed pea plants (*Vigna unguiculata*) were inoculated with CPMV (0.1 mg mL-1) in 10 mM potassium phosphate buffer (pH 7.0) and propagated for 3 weeks. The virus concentration in plant extracts was determined by UV/vis spectroscopy (ε260 nm=8.1 mg-1 mL cm-1), and virus integrity was determined by size exclusion chromatography. Monoclonal rat antibodies against the mouse proteins OX40/CD134 (clone OX86; rat IgG1) and PD-1/CD279 (clone RMP1-14; rat IgG2a) were purchased from BioXCell.

Cell Lines and Cell Culture

B16F10 cells (American Type Culture Collection) were cultured in Dulbecco's Modified Eagle's Medium (DMEM, Thermo Fisher Scientific), supplemented with 10% (v/v) fetal bovine serum (FBS, Atlanta Biologicals) and 1% (v/v) penicillin-streptomycin (Thermo Fisher Scientific). CT26-luc cells (a gift from Dr. Jeremy Rich, UCSD) were cultured in complete medium (RPMI 1640 containing 10% (v/v) FBS and 1% (v/v) penicillin-streptomycin). ID8-Defb29/Vegf-A cells were transfected with luciferase as previously described, and maintained in RPMI 1640 medium supplemented with 10% (v/v) FBS and 1% (v/v) Pen/Strep, 2 mM L-glutamine, 1 mM sodium pyruvate and 0.05 mM 2-mercaptoethanol. Both cell lines were maintained at 37° C., 5% $CO_2$, below 50% confluence, and early-passage cultures were used in the experiments.

Tumor Inoculation and Animal Studies

All experiments were conducted in accordance with UCSD's Institutional Animal Care and Use Committee and involved female C57BL/6 or BALB/c mice (The Jackson Laboratory) 6-8 weeks of age. For the dermal melanoma tumor model, $2.5 \times 10^5$ B16F10 cells were suspended in 50 µL PBS and were injected (i.d.) into the right flank of C57BL/6 mice on day 0. CPMV (100 µg), antibody (50 µg), or both reagents were administered by intratumoral injection in 30 µL PBS. Tumor volumes were measured using a digital caliper. The tumor volume ($mm^3$) was calculated as follows: (long diameter ´ short diameter2)/2. Animals were euthanized when the tumor volume exceeded 1500 $mm^3$. For the ovarian tumor model, $2 \times 10^6$ ID8-Defb29/Vegf-A cells/200 µL PBS were injected (i.p.) into C57BL/6 mice. The mice were monitored weekly for signs of tumor progression, including abdominal distension, weight, circumference, and other morbidity indicators. CPMV (100 µg), antibody (50 µg), or both reagents were administered weekly by injection (i.p.) in 200 µL PBS for six treatments in total. Mice were euthanized when their weight reached 35 grams or when moribund. For the colon tumor model, $5 \times 10^5$ CT26-luc cells/200 µL PBS were injected (i.p.) into BALB/c mice. CPMV (50 µg), antibody (50 µg), or both reagents were administered on days 7 and 14 by injection (i.p.) in 200 µL PBS. Tumor growth was monitored by body weight and total bioluminescence imaging, based on the i.p. injection of 100 mg kg-1 luciferin (Thermo Fisher Scientific) followed by analysis in an IVIS Spectrum Imaging System (PerkinElmer). Total bioluminescence was determined using Living Image software (PerkinElmer). Regions of interest were quantified as average radiance (photons/s). Mice were euthanized when their weight reached 24 grams or when moribund.

Quantification of IFNγ

Peritoneal cavity washes or cell culture supernatants were tested by enzyme-linked immunosorbent assay (ELISA) to detect IFNγ (BioLegend) according to the manufacturer's instructions.

Flow Cytometry

Fresh tumor cells were excised from mice, processed into single-cell suspensions and washed in cold PBS containing 1 mM EDTA, and then resuspended in staining buffer (PBS containing 2% (v/v) FBS, 1 mM EDTA, 0.1% (w/v) sodium azide). Fc receptors were blocked using anti-mouse CD16/CD32 (Biolegend) for 15 min and then tested with the following fluorescence-labeled antibodies (BioLegend) for 30 min at 4° C.: CD45 (30-F11), CD11b (M1/70), CD86 (GL-1), major histocompatibility complex class II (MHCII, M5/114.15.2), Ly6G (1A8), CD11c (N418 A), F4/80 (BM8), Ly6C (HK1.4), NK1.1 (PK136), CD4 (GK1.5), CD3 3ε (145-2V11 A), CD8α (53-6.7), CD44 (IM7), CD62L (MEL-14), and isotype controls. For intracellular cytokine staining, single cell suspensions were made from the spleens of treated mice. Splenocytes ($10^6$ cells mL-1) were co-cultured with freeze-thaw tumor lysates ($10^6$ cells mL-1) or CPMV (0.1 mg mL-1) for 48 h and treated with brefeldin A (10 mg mL-1) for the last 5 h at 37° C. Following staining for surface antibodies as described above, the cells were fixed in 3% paraformaldehyde, permeabilized with 0.1% (w/v) saponin, and incubated with anti-IFNγ (XMG1.2, BioLegend) for 30 min in 0.1% (w/v) saponin. Cells were washed twice and resuspended in staining buffer for data acquisition. Flow cytometry was carried out using a BD LSRII cytometer (BD Biosciences), and the data were analyzed using FlowJo software (Tree Star). OneComp eBeads (eBiosciences) were used as compensation controls.

Depletion of CD4+ and CD8+ T Cells

For the CT26-luc colon tumor model, monoclonal antibodies (BioXCell) specific for CD4 (clone GK1.5, rat IgG2b) and CD8 (clone 53-6.7, rat IgG2a) were injected on the first day of treatment, and on days 2, 5, 8 and 10 thereafter, each at a dose of 0.1 mg per injection. For the B16F10 melanoma tumor model, the same antibodies at the same dose were injected on days 1, 3, 6 and 10 after the first treatment.

Statistical Analysis

All results are expressed as means±SEM (n=3-5) as indicated. Student's t-test was used to compare the statistical difference between two groups, and one-way or two-way analysis of variance (ANOVA) with Sidak's or Tukey's multiple comparison tests were used to compare three or more groups (*$p<0.05$, $p<0.01$, *$p<0.0005$, **$p<0.0001$). Survival rates were analyzed using the log-rank (Mantel-Cox) test ($p<0.01$). All statistical tests were performed using GraphPad Prism v7.0 (GraphPad Software).

Results

Figure 1C:
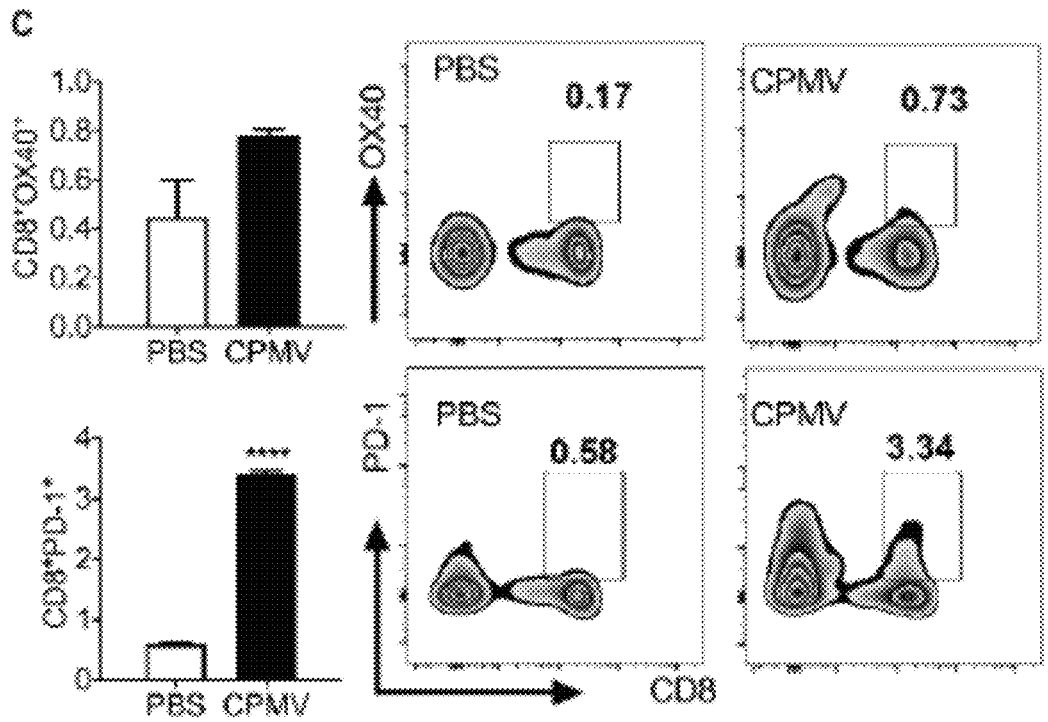
Figure 1D:
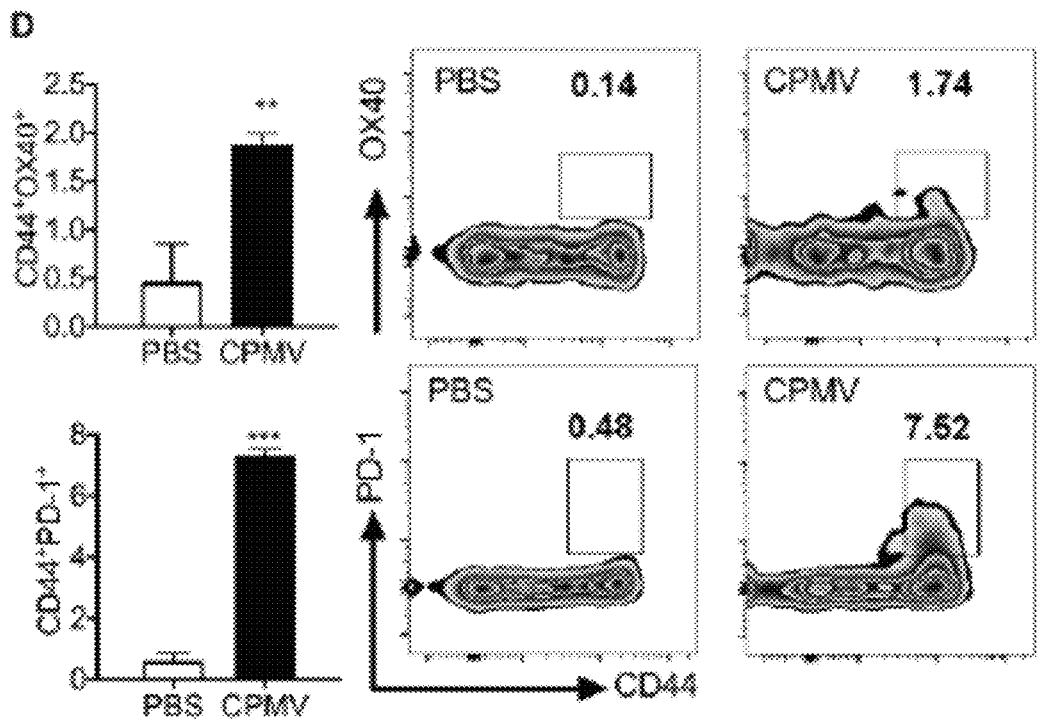

In Situ Vaccination with CPMV Upregulates the Expression of PD-1 and OX40 on Intratumoral Effector T Cells In Vivo To explore the expression of PD-1 and OX40 after CPMV treatment, luciferase labeled ID8-Defb29/Vegf-A (ID8-Defb29/Vegf-A-luc) ovarian tumor cells were implanted into C57BL/6 mice via the intraperitoneal (i.p.) route. The establishment of ascites/tumors was confirmed by luminescence detection 35 days post inoculation (dpi). At this point the mice were injected (i.p.) with 100 µg CPMV in PBS and peritoneal lavage was carried out 24 h later to collect T cells. A single dose of CPMV significantly increased the expression of PD-1 and OX40 in the total CD4+ T cell population from the tumor microenvironment. However, the upregulation of PD-1 was mostly restricted to Foxp3–CD4+ effector T cells whereas the upregulation of OX40 was mostly restricted to Foxp3+CD4+ regulatory T cells (FIG. 6). Multiple CPMV treatments (five doses, weekly injection starting from 7 dpi) were also carried out, and the expression of both checkpoint proteins was measured 48 h after the last treatment. As described for the single treatment, the upregulation of PD-1 on CD4+ T cells was mostly observed among the effector T cell population, whereas the upregulation of OX40 mostly observed among the regulatory T cells (FIG. 1A, B). We also found that PD-1 expression was significantly upregulated in the total CD8+ T cell population ($p<0.0001$) and specifically among CD44+CD8+ effector T cells ($p<0.005$). OX40 showed a similar profile among CD8+ T cells but with much weaker expression than PD-1 (FIG. 1C, D). These results indicate that in situ vaccination with CPMV can sensitize the tumor to both OX40 agonists and PD-1 inhibitors. In this tumor model, we found that PD-1 was the best target for combination therapy because CPMV increased the expression of PD-1 on both CD4+ and CD8+ effector T cells to a greater extent than OX40.

Figures 2E, 2F, 2G, 2H, 2I:
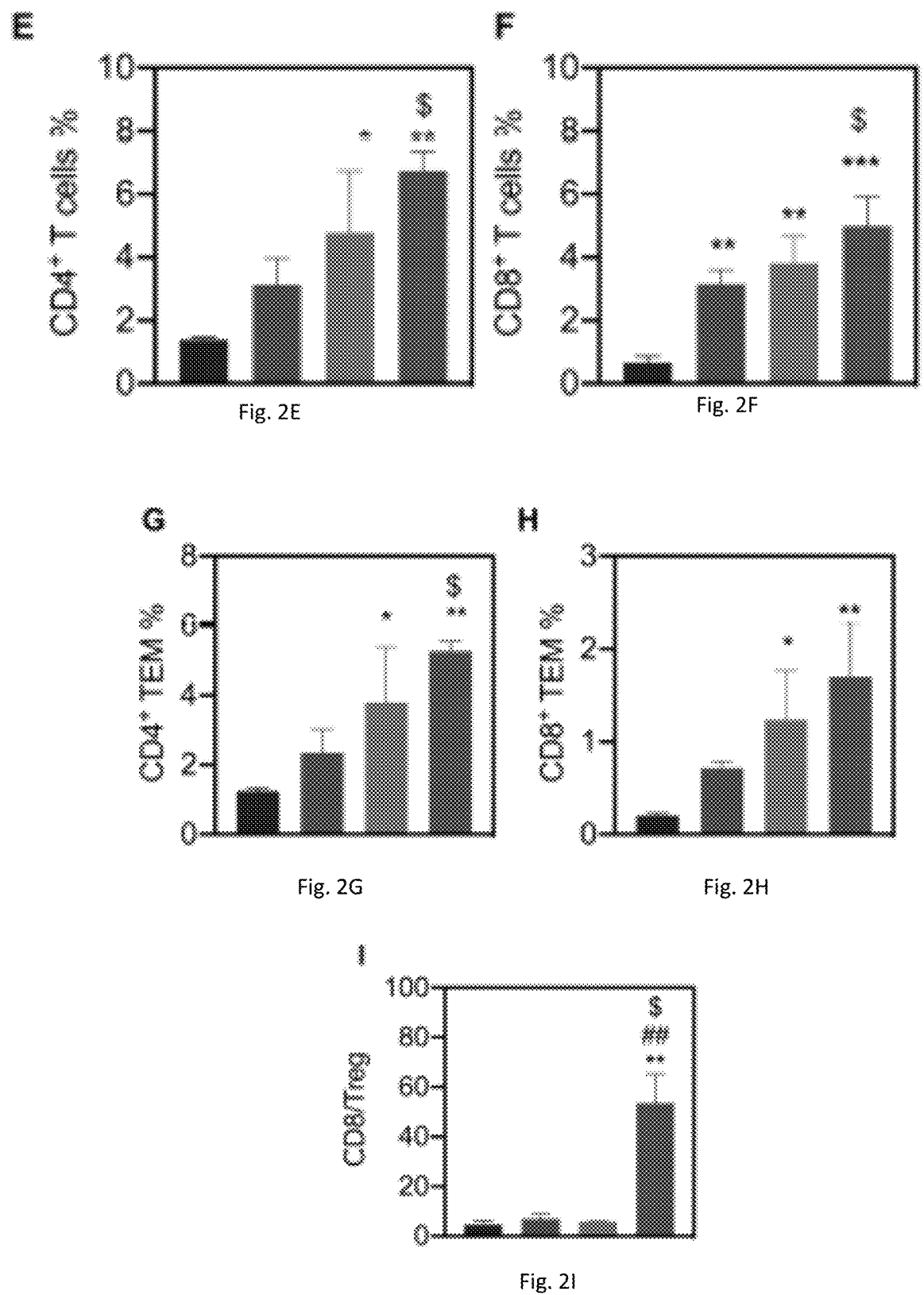
FIGS. 2(A-N) illustrate graphs showing combined CPMV and PD-1 inhibitor treatment synergistically enhances immunotherapeutic efficacy in a model of ovarian cancer. A. Schematic of the treatment strategy and dosing regimen. C57BL/6 mice were inoculated (i.p.) with $2 \times 10^6$ ID8-Defb29/Vegf-A cells followed by six weekly injections (i.p.) of 50 μg antibody (PD-1 antagonist or OX40 agonist), 100 μg CPMV, the combination, or PBS as a control. B. Body weight was measured to monitor tumor growth. C. Survival curves of the treatment groups. D. Survival curves of the combination therapy groups following tumor re-challenge at 100 dpi. E-N. C57BL/6 mice were inoculated (i.p.) with $2 \times 10^6$ ID8-Defb29/Vegf-A-luc cells followed by two i.p. doses (21 and 28 dpi) of the PD-1 inhibitor antibody (100 μg), CPMV (100 μg), or the combination, and spleens and peritoneal ascites were collected 2 days after the second dose. E-J. Percentages of CD4+ and CD8+ infiltrated T cells (and their subsets) and NK cells determined by flow cytometry. K. IFNγ levels in the supernatant of peritoneal ascites. L-M. Percentages of total CD4+ and CD8+ infiltrated T cells staining positive for IFNγ. N. Splenocytes were cultured in fresh medium, CPMV suspensions, or ID8-Defb29/Vegf-A cell lysates for 24 h. Intracellular IFNγ was measured in CD8+ T cells by flow cytometry. Data are means±SEM (n=3). Statistical significance was calculated by one-way ANOVA: * vs PBS; # vs CPMV monotherapy; $ vs antibody monotherapy (*$p<0.05$; $p<0.01$; *$p<0.0005$; ****$p<0.0001$).
Figure 2J:
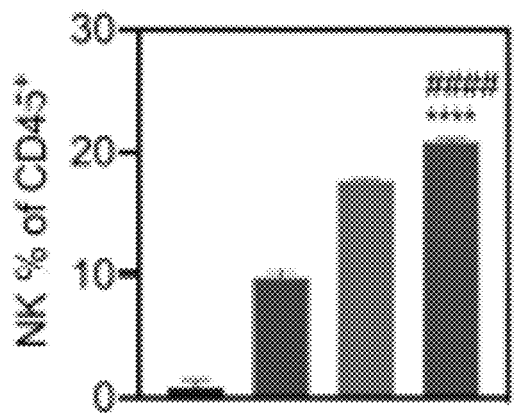

Combined CPMV and PD-1 Inhibitor Treatment Synergistically Prevents Ovarian Tumor Growth in the Peritoneal Cavity Following Re-Challenge Given the ability of CPMV to induce the expression of PD-1 and (to a lesser extent) OX40 in the microenvironment of ovarian tumors, we hypothesized that the antitumor responses to CPMV could be augmented by combining CPMV treatment with a PD-1 inhibitor or OX40 agonist. As above, we implanted $2\times10^6$ ID8-Defb29/Vegf-A ovarian cancer cells into C57BL/6 mice, and administered 100 µg of CPMV in PBS 7 dpi, this time with or without 50 µg of the antagonistic (PD-1) or agonistic (OX40) antibody (FIG. 2A). Control mice were injected with PBS alone. Six doses were injected at weekly intervals, and tumor growth was monitored by measuring body weight (FIG. 2B). There was no difference in tumor growth between the solo ICT groups and PBS controls, indicating that neither the rat anti-mouse PD-1 IgG2a (clone RMP1-14, BioXCell) nor the rat anti-mouse OX40 IgG1 (clone OX86, BioXCell) alone were sufficient to suppress tumor growth. As expected, ~20% of the mice treated with CPMV alone survived compared to 100% of the control mice at 100 dpi. Tumor growth was suppressed in both combination therapy groups, with $^3$80% of the mice surviving until 100 dpi, whereas all mice in the control and solo ICT groups died by 70 dpi (FIG. 2C). However, only mice treated with CPMV and the PD-1 inhibitor achieved 100% survival when re-challenged with the initial dose of 2'106 ID8-Defb29/Vegf-A tumor cells (FIG. 2D).

Figure 2K:
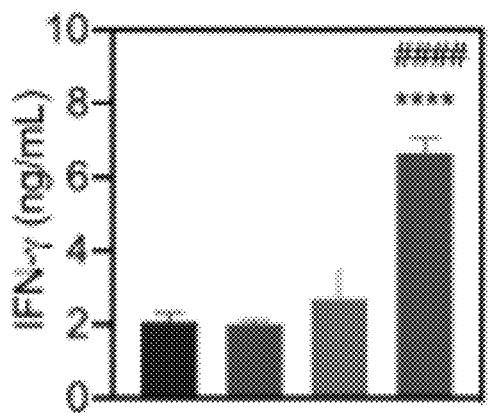
Figure 2L:
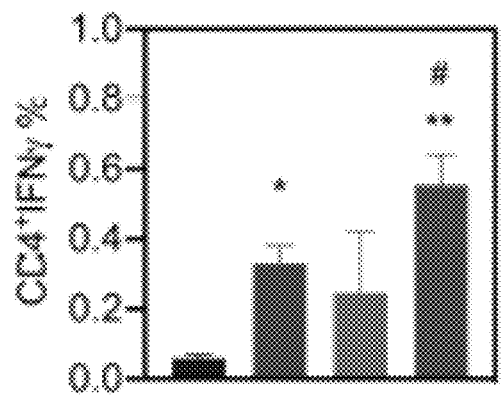
Figure 2M:
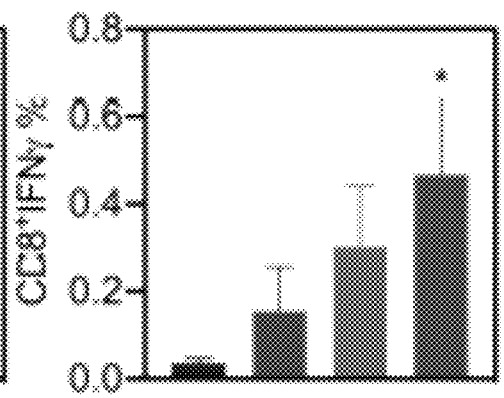
Figure 7A:
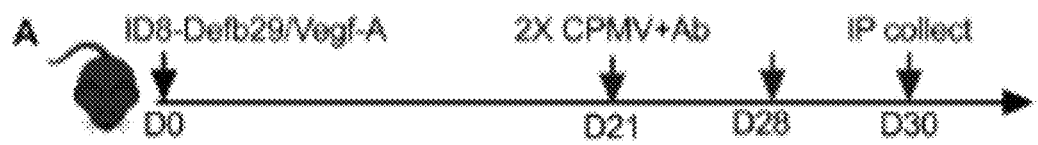
FIGS. 7(A-J) illustrate combined CPMV and PD-1 inhibitor treatment enhances the activation of immune cells in the microenvironment of ID8-Defb29/Vegf-A ovarian tumors. A. C57BL/6 mice were inoculated (i.p.) with $2\times10^6$ ID8-Defb29/Vegf-A-luc cells followed by two injections (i.p.) treatments of the PD-1 antagonist (100 µg), CPMV (100 µg), or the combination (21 and 28 dpi). Peritoneal cavity wash cells were collected 2 days after the second treatment. B-H. Relative proportions of innate immune cell subsets in peritoneal ascites determined by flow cytometry. I. Percentage of total CD45− tumor cells. J. Percentage of CD45− tumor cells expressing PD-L1. Data are means±SEM (n=3). Statistical significance was calculated by one-way ANOVA: * vs PBS; # vs CPMV; $ vs Ab; *p<0.05; p<0.01; *p<0.0005; ****p<0.0001.
Figure 7B:
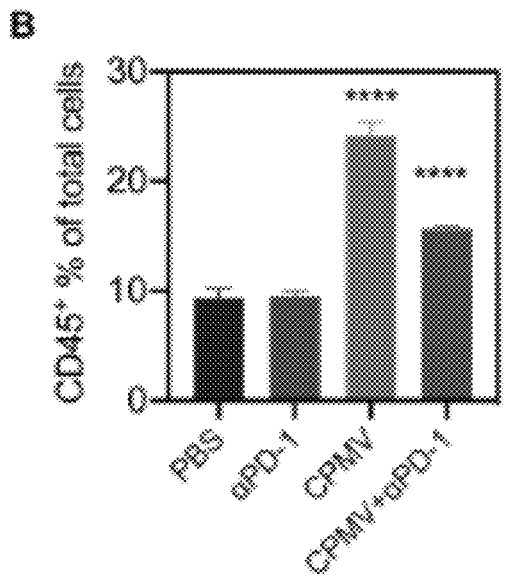
Figure 7C:
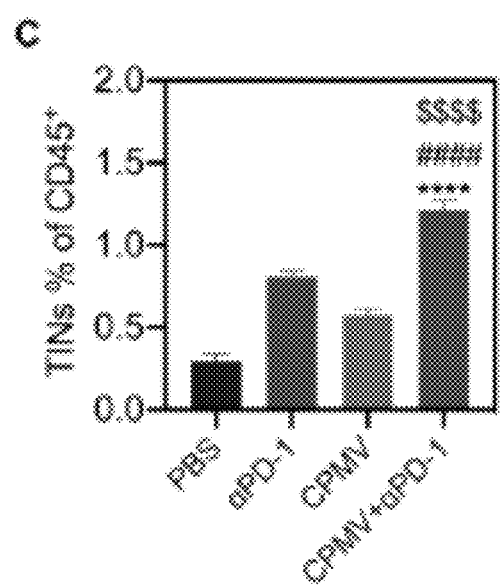
Figure 7D:
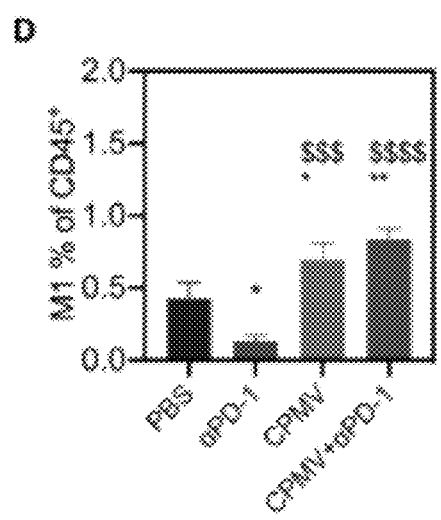
Figure 7E:
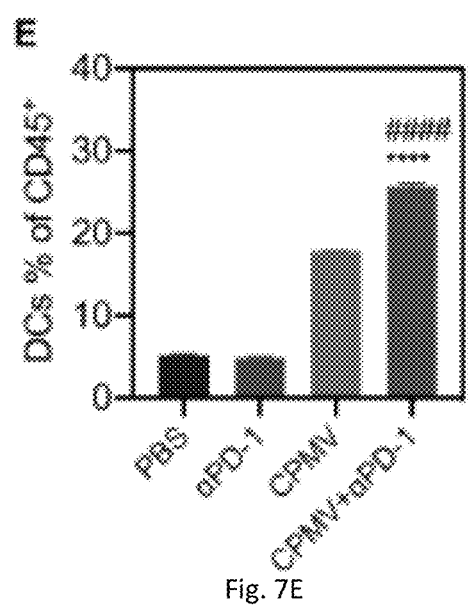
Figure 7F:
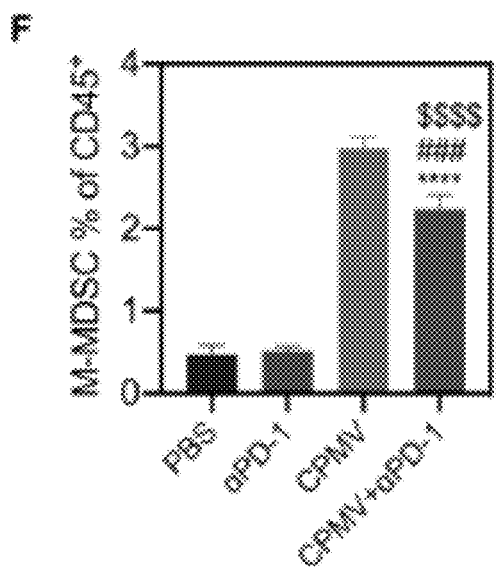
Figure 7G:
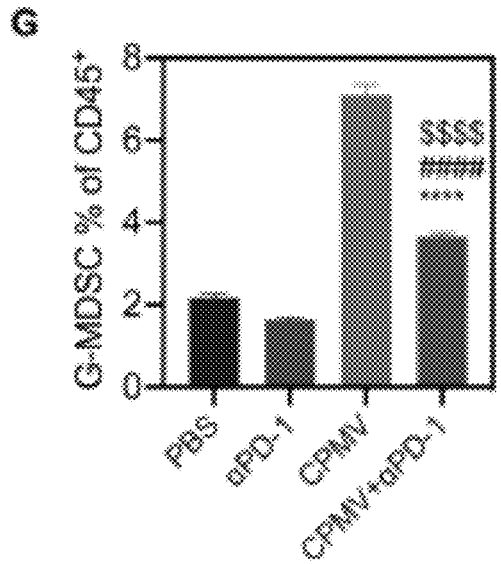
Figure 7H:
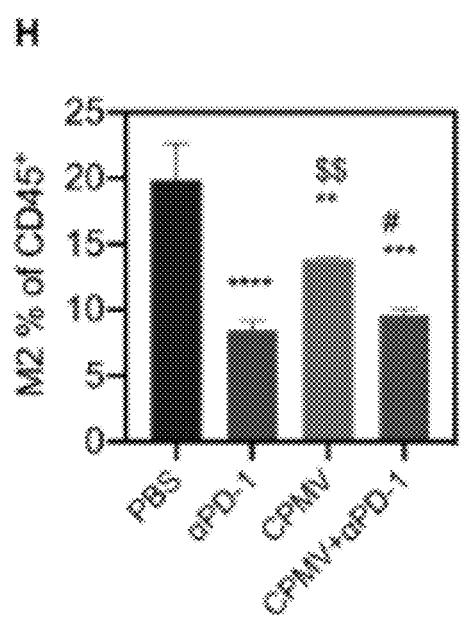

Combined CPMV and PD-1 Inhibitor Treatment Promotes the Repolarization of Myeloid Cells and the Activation of Cytotoxic Lymphocytes To evaluate how the combination of CPMV in situ vaccination and PD-1 inhibition affects the behavior of immune cells, we injected mice with two doses (21 and 28 dpi) of the PD-1 inhibitor alone (100 µg), CPMV alone (100 µg), the combined reagents, or PBS as a control, and collected ascites from mice 2 days after the second treatment. The solo CPMV treatment and combination therapy significantly ($p<0.0001$) increased the total number of TILs compared to the control and solo PD-1 inhibitor groups (FIG. 7B). However, the TILs isolated from mice treated with CPMV alone contained a significantly higher proportion of granulocytic myeloid derived suppressive cells (G-MDSCs: CD11b+Ly6G+MHCII–CD86–) and monocytic myeloid derived suppressive cells (M-MDSCs: CD11b+Ly6G–Ly6C+MHCII–SSClow) compared to the control group, as well as higher proportions of type 1 neutrophils (N1/TINs: CD11b+Ly6G+MHCII+CD86+), type 1 macrophages (M1: CD11b+F4/80+MHCII+CD86+) and dendritic cells (DCs: CD11b+CD11c+). The combination therapy also resulted in a high proportion of N1, M1 and DCs, but the proportion of MDSCs and type 2 macrophages (M2: CD11b+F4/80+ MHCII–CD86–) was lower compared to the solo CPMV group (FIG. 7C-H). Further subset analysis revealed that the combination treatment increased the total number of CD4+ and CD8+ T cells and their effector memory subsets in the peritoneal ascites, as well as the CD8+/regulatory T cell ratio and proportion of natural killer (NK) cells, compared to the other groups (FIG. 2E-J). The level of secreted interferon γ (IFNγ) was significantly higher in the ascites supernatant following combination therapy, and intracellular staining indicated that both CD4+ and CD8+ T cells in this group secreted more IFNγ (FIG. 2K-M). The combination therapy therefore appeared to recruit multiple antitumor immune cell types while depleting the immunosuppressive cell populations.

Figure 2N:
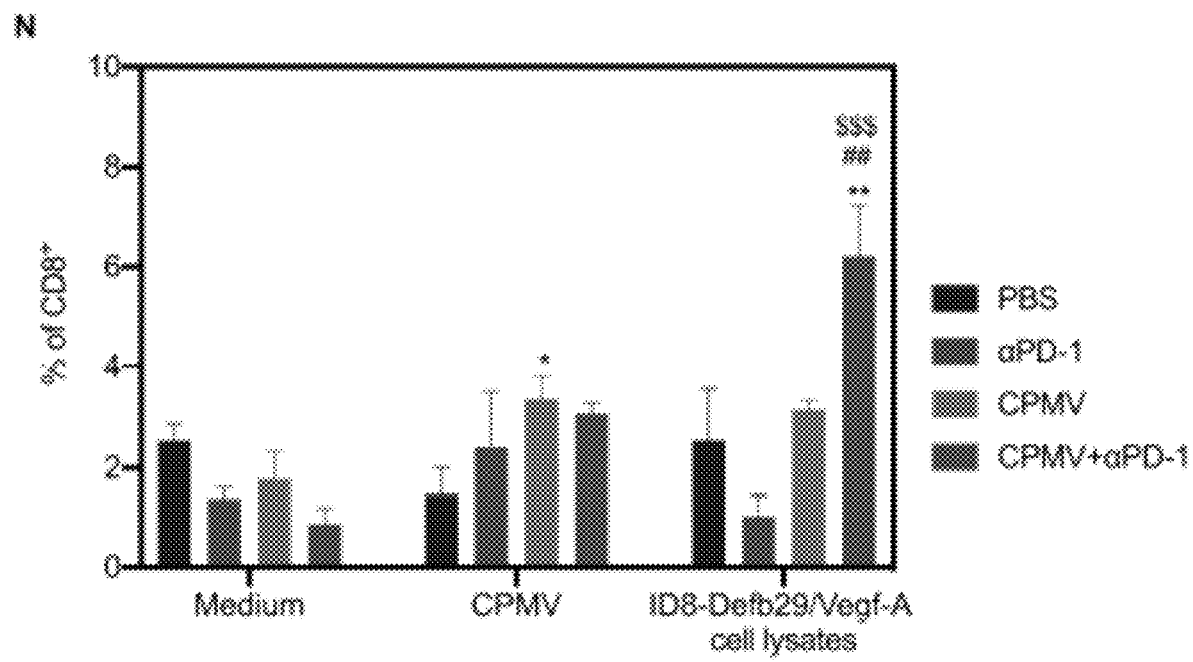
Figure 8:
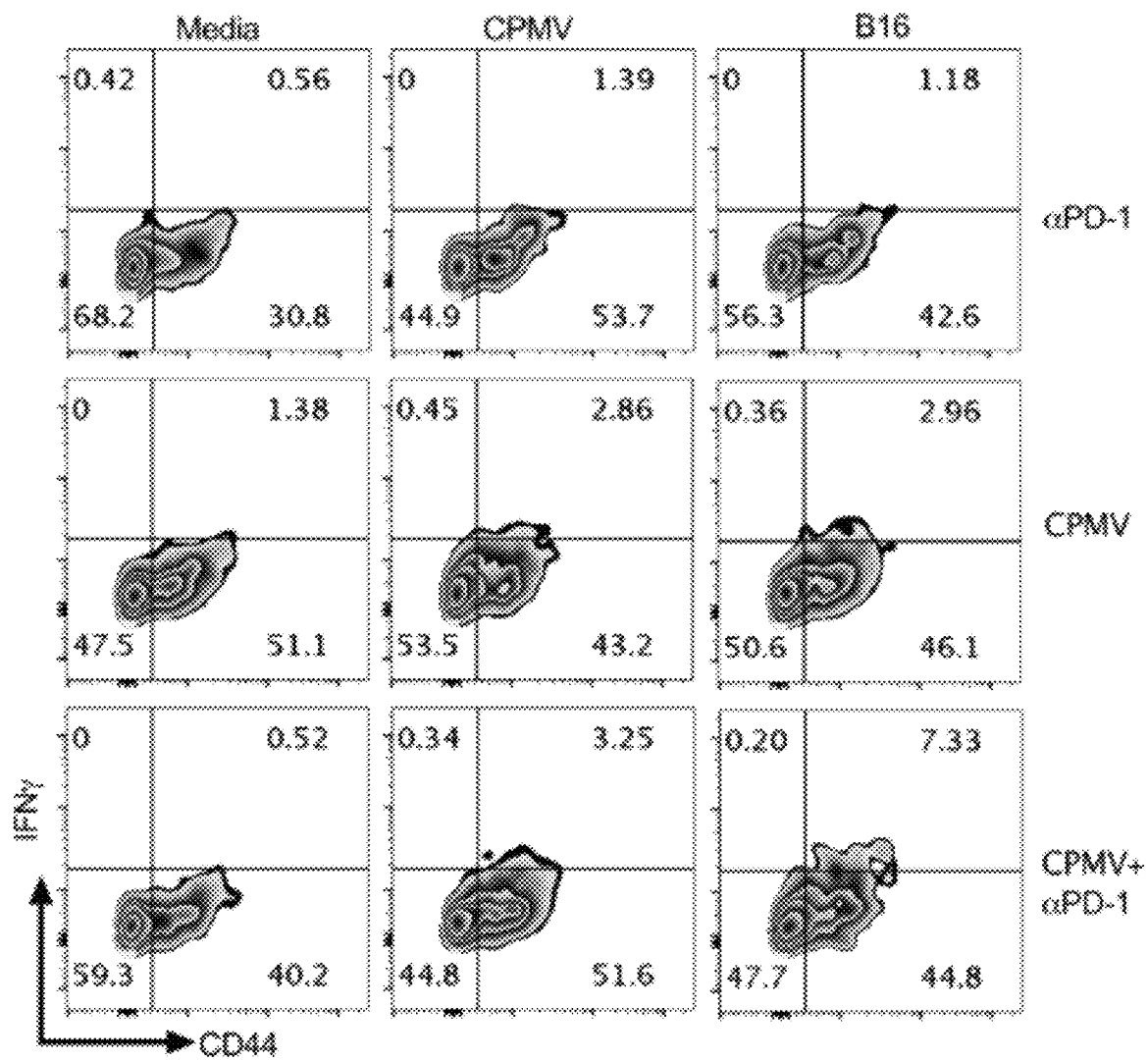
FIG. 8 illustrates representative flow plots of intracellular IFNγ staining in the splenocytes of ID8-Defb29/Vegf-A tumor-bearing mice. Splenocytes from the treatment groups were cultured in fresh medium or with CPMV or ID8-Defb29/Vegf-A tumor cell lysates for 24 h. Intracellular TFNγ in CD8+ T cells was measured by flow cytometry.

To determine whether the CPMV plus PD-1 inhibitor combination could induce a systemic immune response to prevent metastasis, we collected splenocytes from the different treatment groups and pulsed them with fresh medium, a CPMV suspension, or ID8-Defb29/Vegf-A tumor cell lysates (FIG. 2N and FIG. 8). After 24 h, we observed a marked increase in the number of tumor-specific IFNγ-secreting CD8+ effector T cells in the spleens of mice from the combination therapy group compared to the control, CPMV monotherapy and solo ICT groups. These results showed that the CPMV plus PD-1 inhibitor combination elicited long-term immune system activation by generating systemic tumor-specific T cells targeting the ID8 Defb29/Vegf-A tumor cells.

Figure 7I:
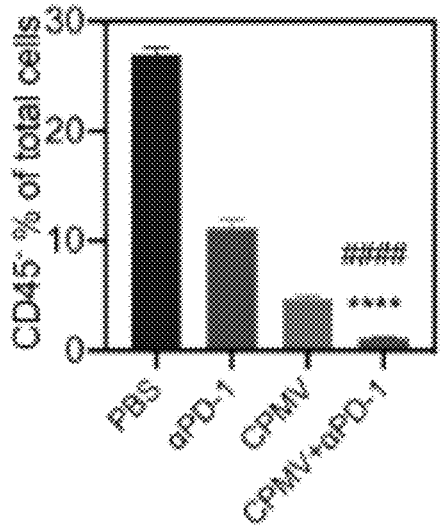
Figure 7J:
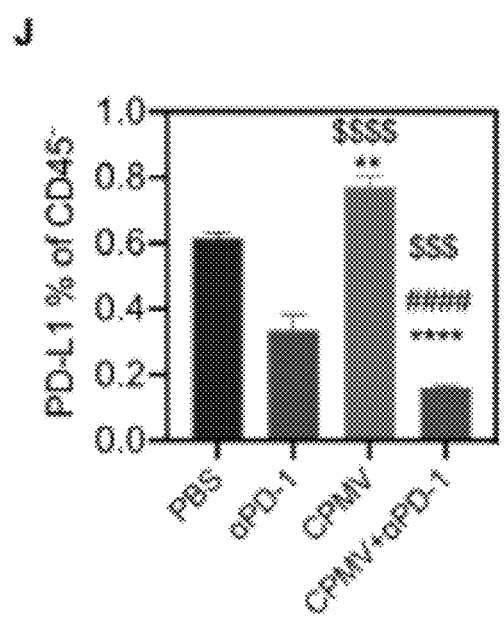

Finally, we observed the depletion of CD45– tumor cells in the combination therapy group, reduced by 23-fold compared to the control group, 10-fold compared to the solo ICT group, and 4-fold compared to the CPMV monotherapy group (FIG. 7I). We also found that the expression of PD-L1 in tumor cells was significantly increased by CPMV treatment alone compared to the PBS control (FIG. 7J), suggesting the antitumor effect of CPMV may be hindered by the interaction between PD-1 on cytotoxic T cells and PD-L1 on tumor cells. PD-1 inhibitors therefore appear to compensate for the weaknesses of CPMV.

Figure 3A:
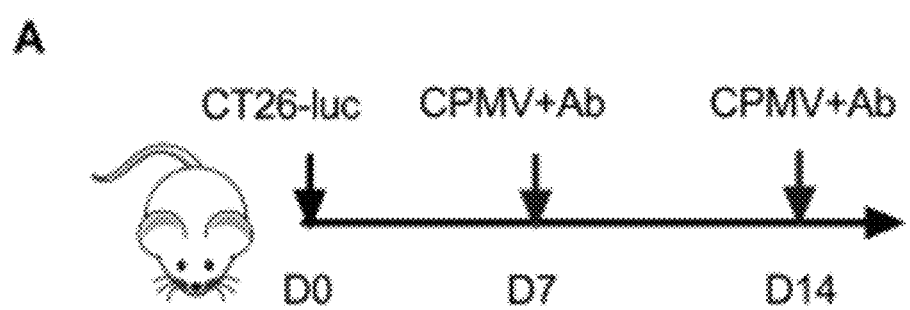
FIGS. 3(A-G) illustrate graphs and images showing combined CPMV and OX40 agonist treatment induces systemic antitumor effects in a CT26 colon tumor model. A. Schematic of the treatment strategy and dosing regimen. BALB/c mice were inoculated (i.p.) with $5\times10^5$ CT26-luc cells followed by two weekly injections (i.p.) of 50 µg antibody (PD-1 antagonist or OX40 agonist), 50 µg CPMV, the combination, or PBS as a control. B. IVIS images showing the growth of luc+CT26 tumors in the different treatment groups. C. The average luciferase expression of tumor cells 17 dpi in the different treatment groups. Data are means±SEM (n=3-5). Statistical significance was calculated by one-way ANOVA: * vs PBS; *p<0.05; p<0.01; *p<0.0005; ****p<0.0001. D. Survival curves of the treatment groups. Statistical significance was calculated using a log-rank Mantel-Cox test: *p<0.05, p<0.01. E. Schematic of the T cell depletion strategy using a CT26-luc colon tumor model. F. The average luciferase expression of tumor cells from different treatment groups in the T cell depletion study: PBS (blue), CPMV+OX40 agonist (red), CD4-specific antibody (100 µg, green), CD8-specific antibody (100 µg, purple). Data are means±SEM (n=4-5). G. Survival rate of each treatment group in the T cell depletion study. Statistical significance was calculated using a log-rank Mantel-Cox test: p<0.01.
Figure 3B:
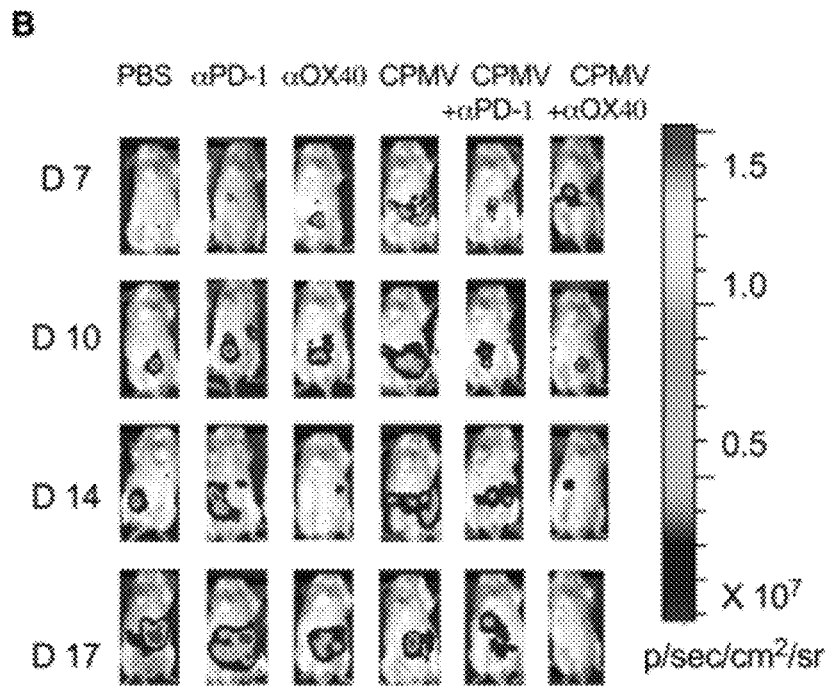
Figure 3C:
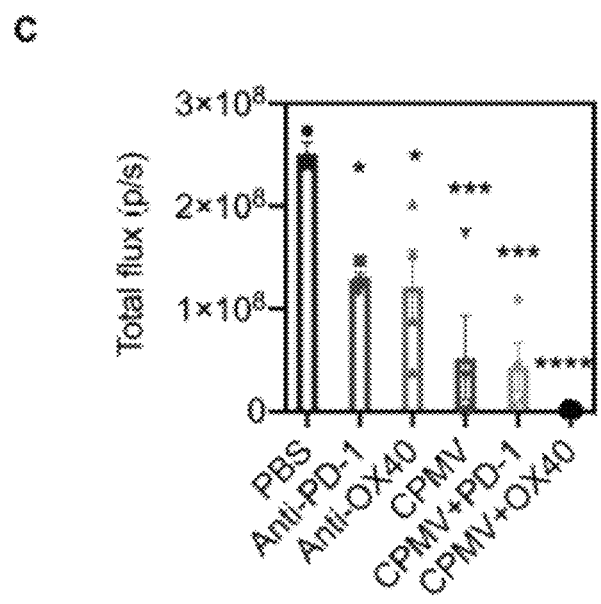
Figure 3D:
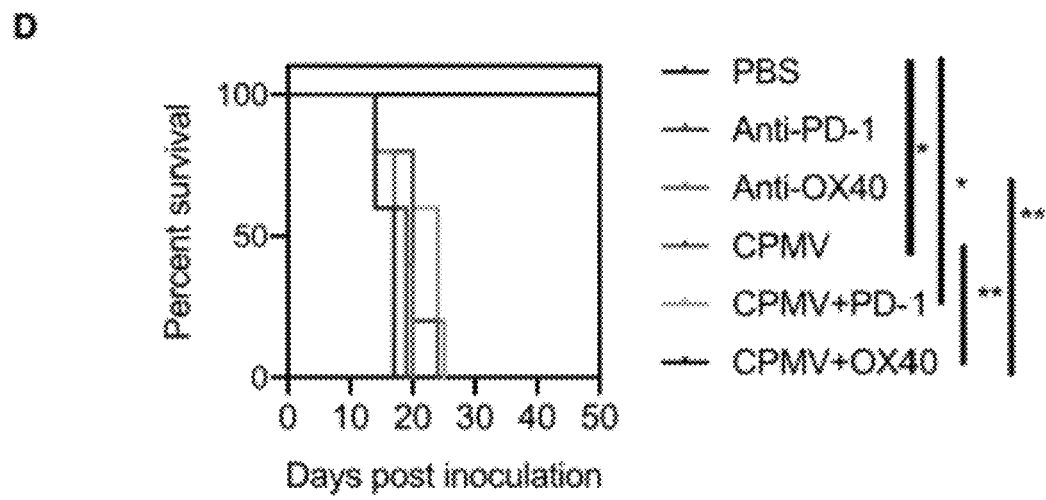
Figure 3E:
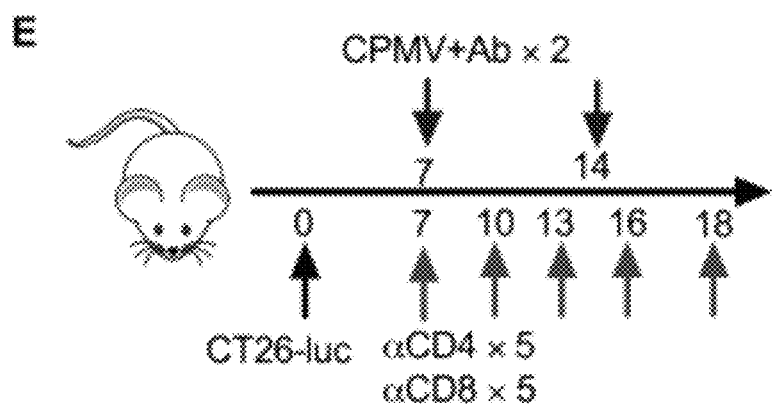
Figure 3F:
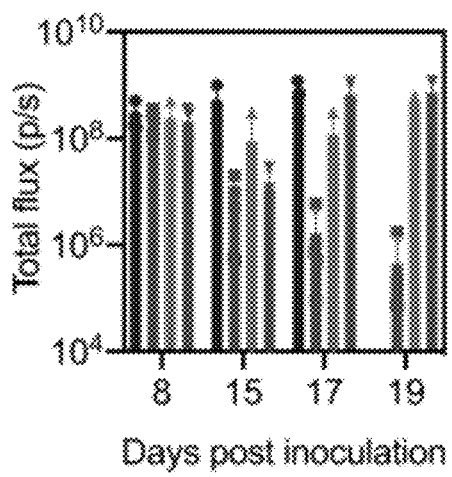
Figures 9A, 9B:
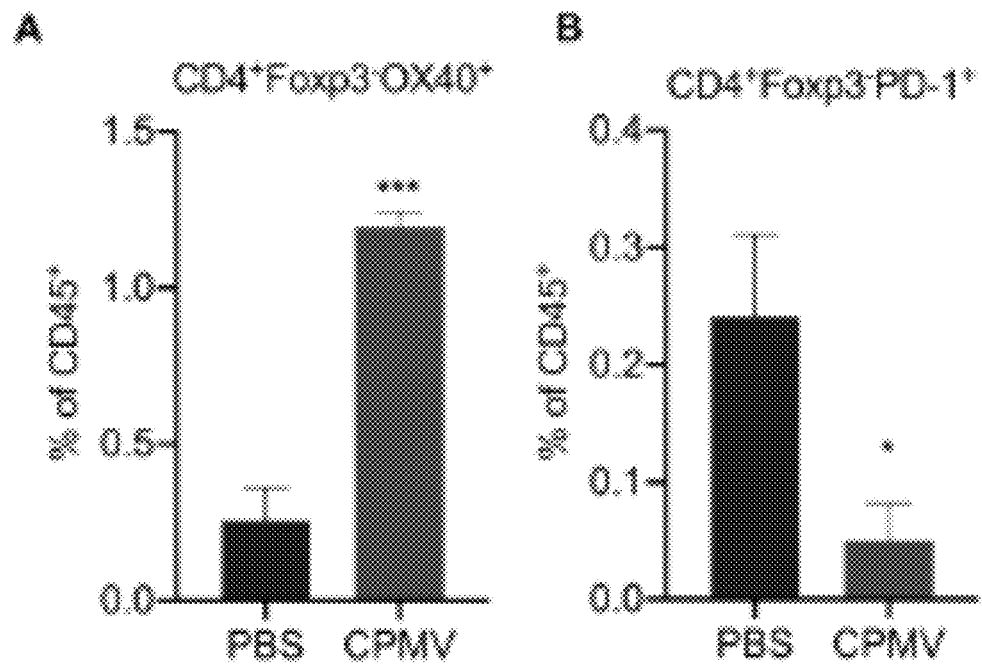
FIGS. 9(A-D) illustrate CPMV induces the expression of OX40 on T effector cells in the CT26 colon tumor model. BALB/c mice were inoculated (i.p.) with $5\times10^5$ CT26-luc cells, and tumor-bearing mice were injected (i.p) with 100 µg CPMV (7 and 14 dpi). Peritoneal ascites were collected 48 h later and analyzed by flow cytometry. A-B. Percentages of OX40+CD4+Foxp3− (A) and PD-1+CD4+Foxp3− (B) effector T cells among CD45+ cells. C-D. Percentages of OX40+CD8+CD44+(C) and PD-1+CD8+CD44+(D) effector T cells among CD45+ cells. Data are means±SEM (n=3). Statistical significance was calculated using a paired t-test (*p<0.05, p<0.01, *p<0.0005).
Figures 9C, 9D:
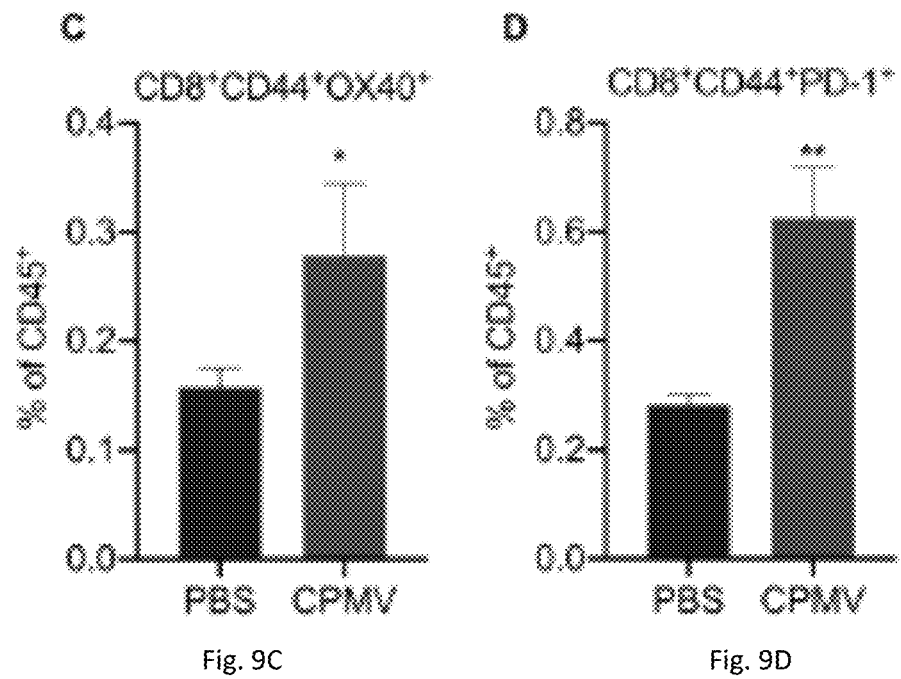
Figure 10A:
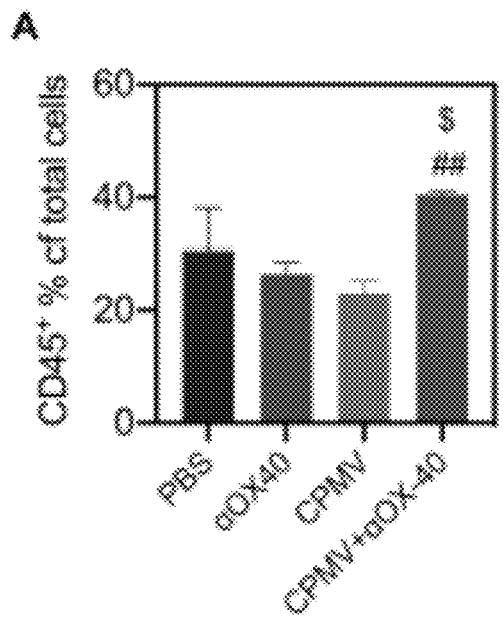
FIGS. 10(A-I) illustrate combined CPMV and OX40 agonist treatment enhances the activation of immune cells in the microenvironment of CT26 colon tumors. BALB/c mice were inoculated (i.p.) with $5\times10^5$ CT26-luc cells followed by two injections (i.p.) of the OX40 agonist (100 µg), CPMV (100 µg), or both reagents (7 and 14 dpi). Peritoneal cavity wash cells were collected 48 h after the second treatment. Data are means±SEM (n=3). Statistical significance was calculated by one way ANOVA: * vs PBS; # vs CPMV; $ vs Ab; *p<0.05; p<0.01; *p<0.0005; ****p<0.0001.
Figure 10B:
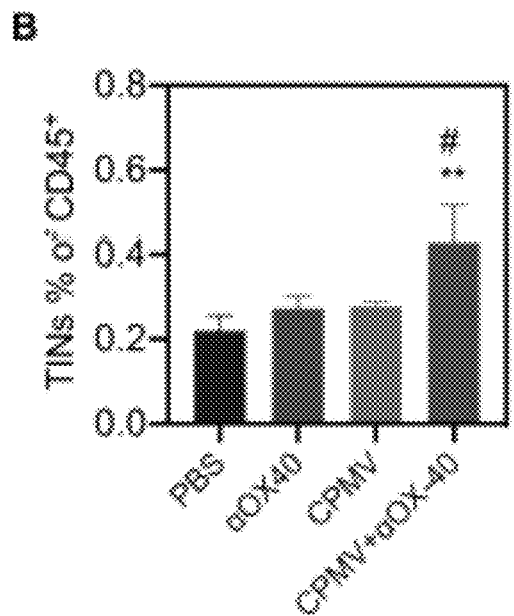
Figure 10C:
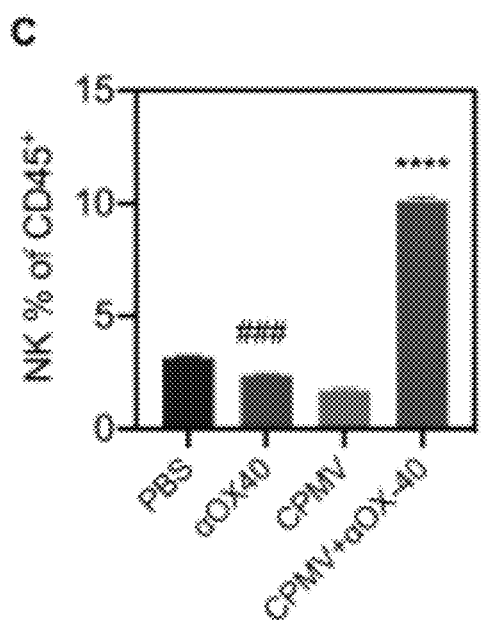
Figure 10D:
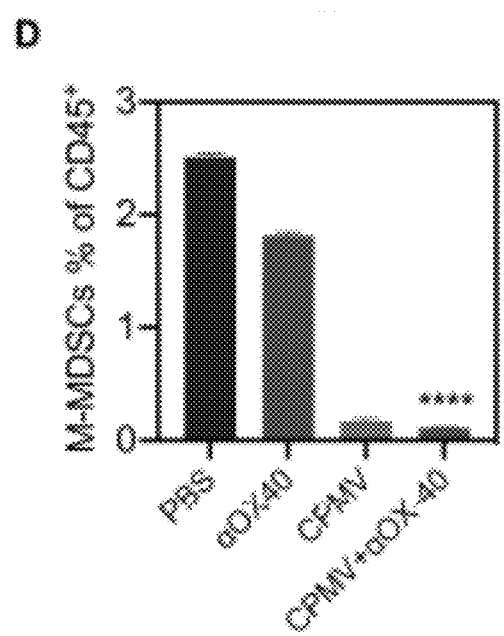
Figure 10E:
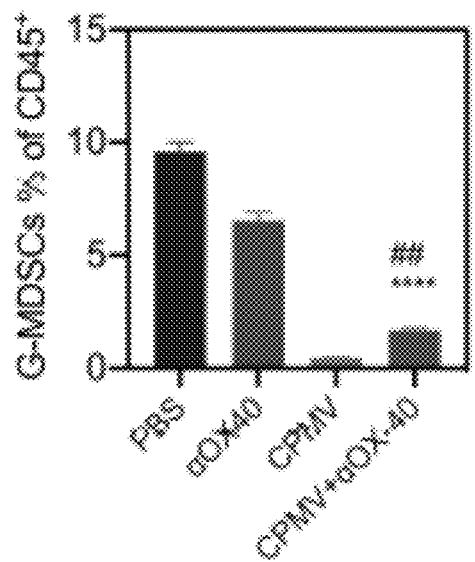
Figure 10F:
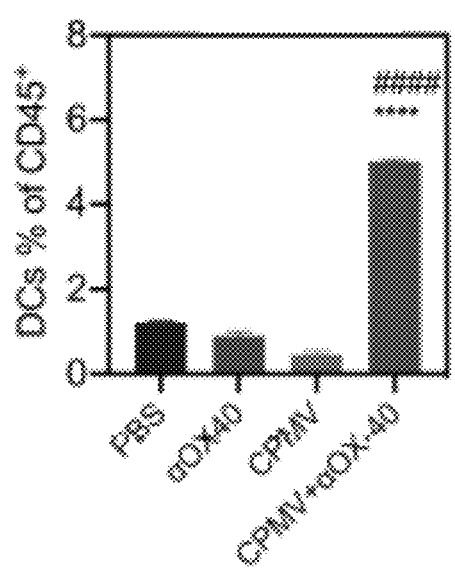
Figure 10G:
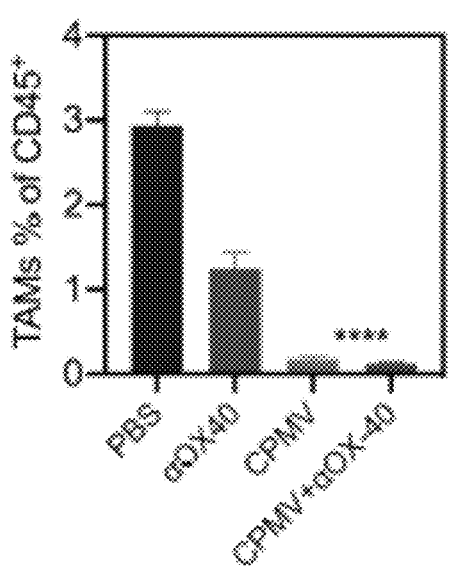
Figure 10H:
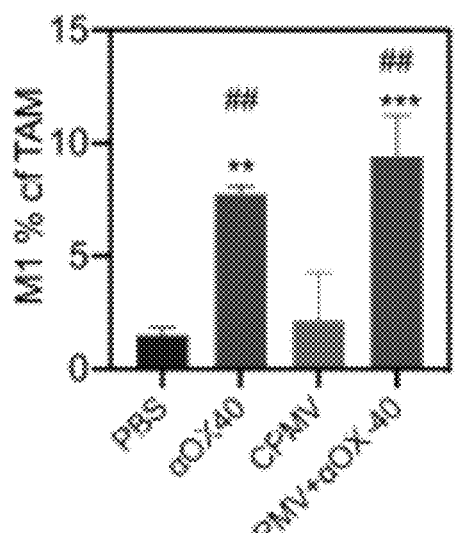
Figure 10I:
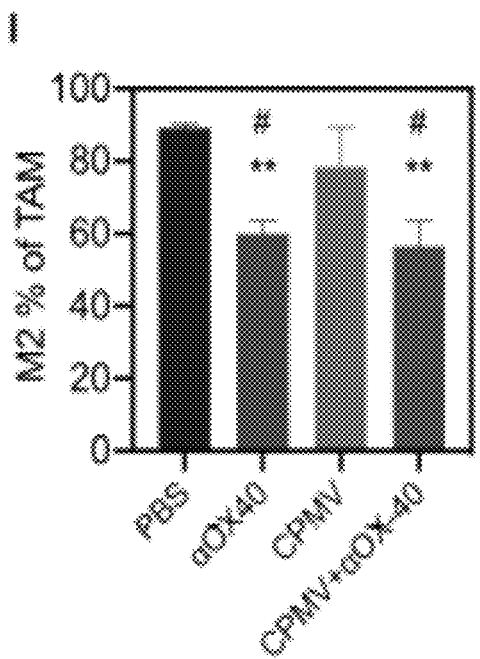
Figure 11A:
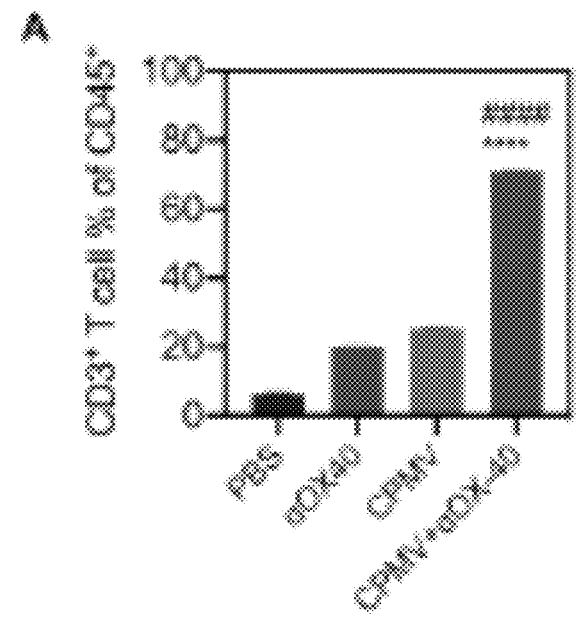
FIGS. 11(A-H) illustrate combined CPMV and OX40 agonist treatment induces the infiltration of lymphocytes and systemic antitumor effects in the microenvironment of CT26 colon tumors. BALB/c mice were inoculated (i.p.) with $5\times10^5$ CT26-luc cells followed by two injections (i.p.) of the OX40 agonist (100 µg), CPMV (100 µg), or both reagents (7 and 14 dpi). Peritoneal cavity wash cells were collected 48 h after the second treatment. Data are means±SEM (n=3). Statistical significance was calculated by one-way ANOVA: * vs PBS; # vs CPMV; $ vs Ab; *p<0.05; p<0.01; *p<0.0005; ****p<0.0001.
Figure 11B:
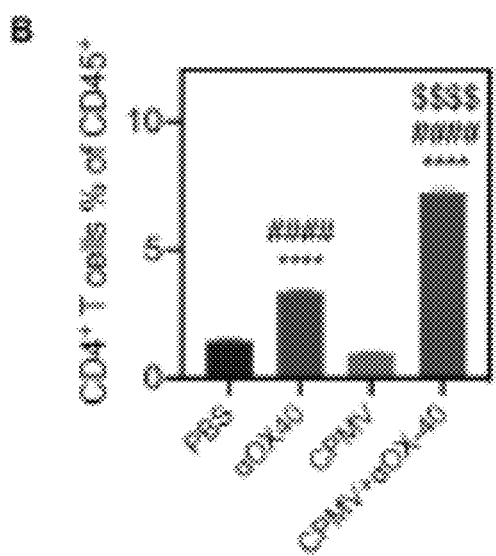
Figure 11C:
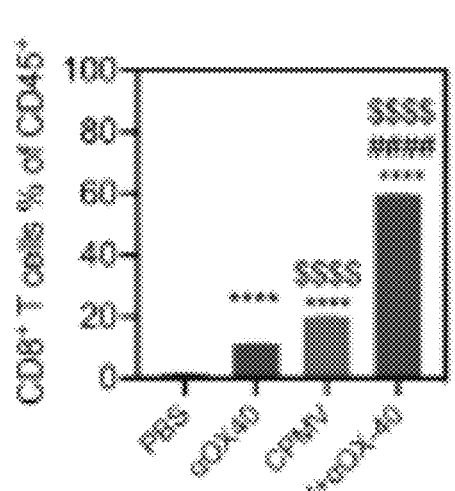
Figure 11D:
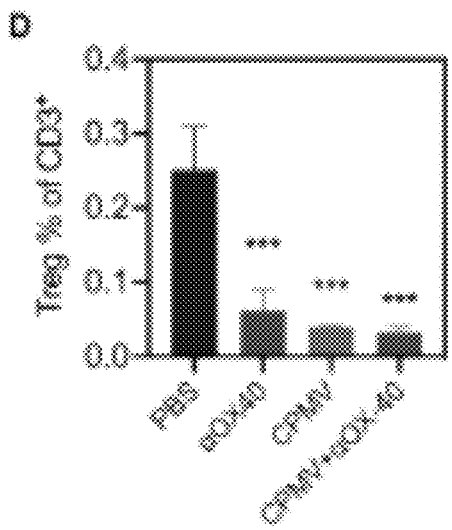
Figure 11E:
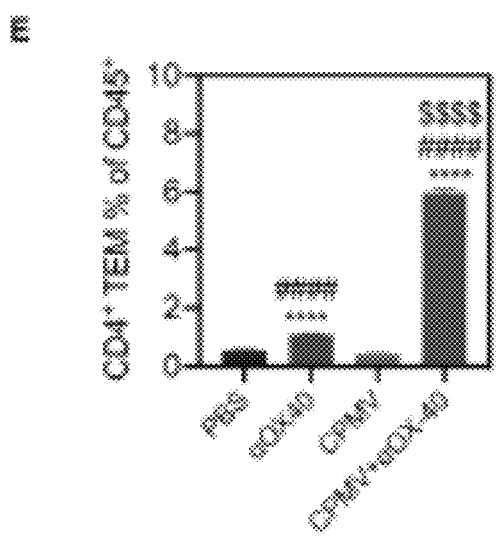
Figure 11F:
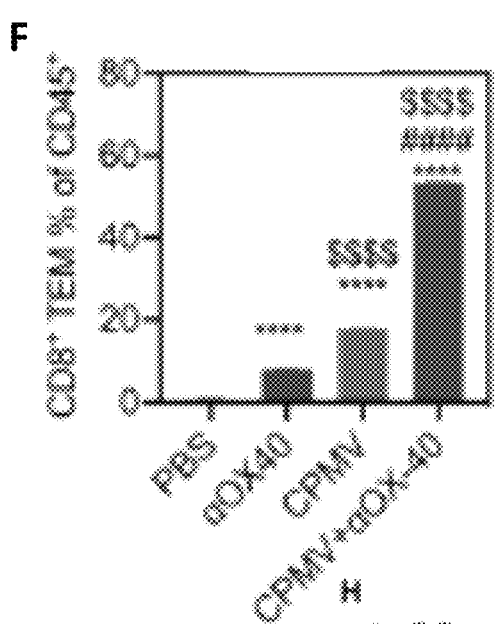
Figure 11G:
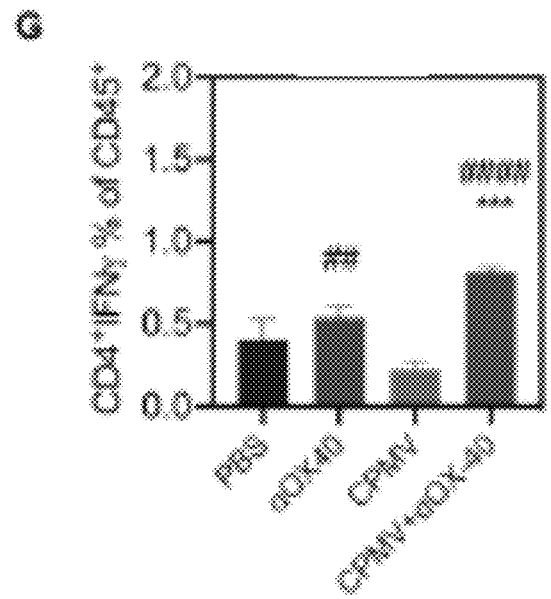
Figure 11H:
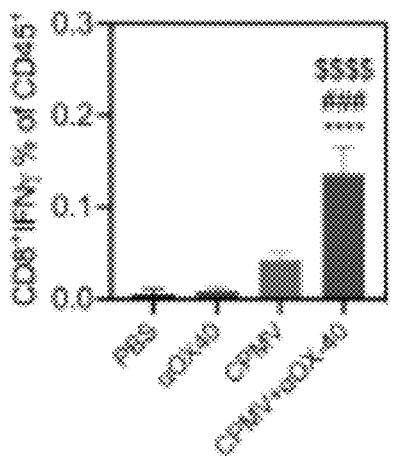
Figure 12:
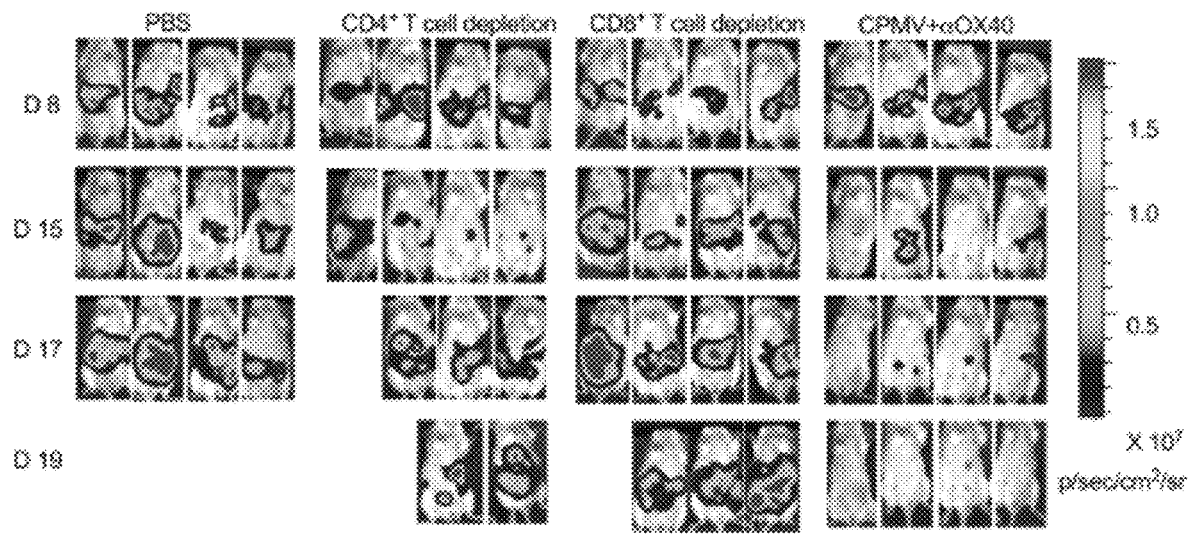
FIG. 12 illustrates IVIS images showing the growth of CT26-luc tumor cells from different treatment groups following T cell depletion.

CPMV Upregulates OX40 Expression on Foxp3−CD4+ T Cells and Combination Therapy with an OX40 Agonist is Efficacious in a Model of Colon Cancer Next we used a CT26 solid tumor model of peritoneal colon carcinomatosis to determine the immunomodulatory potential of CPMV in situ vaccination as described above. Accordingly, BALB/c mice were inoculated (i.p.) with luciferase-labeled CT26 (CT26-luc) tumor cells and injected (i.p.) with CPMV. Analysis of the ascites revealed that CPMV significantly ($p<0.0005$) increased the expression of OX40 on Foxp3−CD4+ effector T cells, whereas the level of PD-1 significantly ($p<0.01$) declined (FIG. 9A,B). We also found that CPMV induced the expression of PD-1 and OX40 on CD44+CD8+ effector T cells to a similar degree (FIG. 9C,D). As described above for the ovarian tumor model, we sought to demonstrate the synergistic antitumor efficacy of the combination of CPMV and ICT in colon tumors derived from CT26-luc cells. We therefore treated CT26-luc tumor-bearing mice with two doses (7 and 14 dpi) of CPMV combined with either the inhibitory anti-PD-1 antibody or the agonistic OX40-specific antibody, as well as setting up the corresponding monotherapy and PBS control groups (FIG. 3A). In the control group, the tumor burden increased rapidly and all mice were euthanized by 19 dpi. Mice treated with either antibody alone had smaller tumors than the control group when assessed at 17 dpi ($p<0.05$) but they did not survive any longer than the control group (FIG. 3B-D). Treatment with CPMV alone or CPMV plus the PD-1 inhibitor achieved a comparable benefit, extending survival by approximately 1 week compared to controls ($p<0.05$). However, the CPMV plus OX40 agonist achieved significantly more potent antitumor effects than other groups and prevented tumor growth in animals for up to 50 days ($p=0.0067$ vs PBS; FIG. 3D). These results indicated that the expression of immune checkpoint molecules on Foxp3−CD4+ effector T cells can help to predict the potency of specific combination therapies.

Figure 3G:
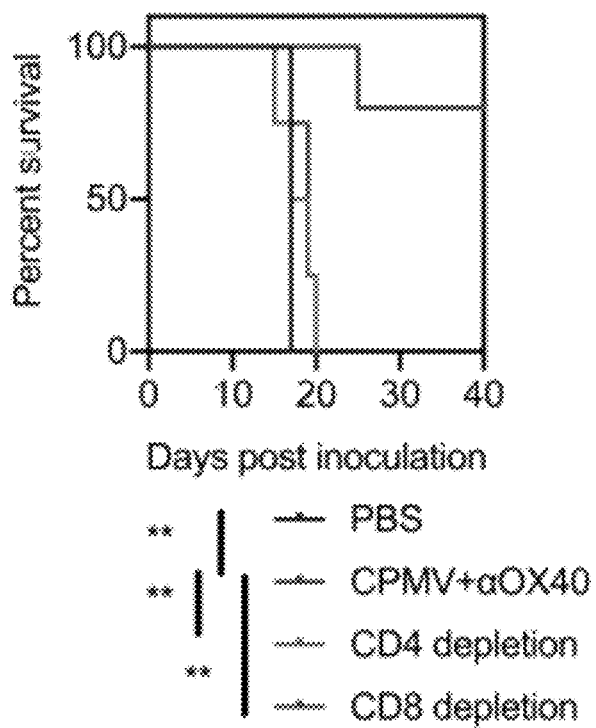

Flow cytometry revealed that the CPMV plus OX40 agonist combination recruited the highest proportion of TILs, antitumor innate immune cell types, and T cells in the peritoneal ascites of CT26 tumor-bearing mice, while depleting the populations of immunosuppressive cells (FIGS. 10 and 11). Intriguingly, the OX40 agonist monotherapy exclusively increased the total CD4+ and effector memory CD4+ T cell counts and the expression of IFNγ in CD4+ T cells, whereas CPMV monotherapy exclusively increased those factors in CD8+ T cells. In contrast, both CD4+ and CD8+ T cells were activated by the CPMV plus OX40 agonist combination therapy (FIG. 11). To determine which components of the immune system are responsible for the therapeutic efficacy of the combination therapy, we examined the effect on CT26-luc tumor-bearing mice pre-treated with neutralizing antibodies against CD4 and CD8 to remove specific subpopulations (FIG. 3E-G and FIG. 12). Notably, the depletion of either CD8+ or CD4+ T cells significantly ($p<0.01$) abrogated the tumor suppression achieved by the combination therapy, indicating that the combination of CPMV plus OX40 agonist induced the priming of both CD8+ and CD4+ T cells, resulting in potent antitumor efficacy (FIG. 3G).

Figure 4A:
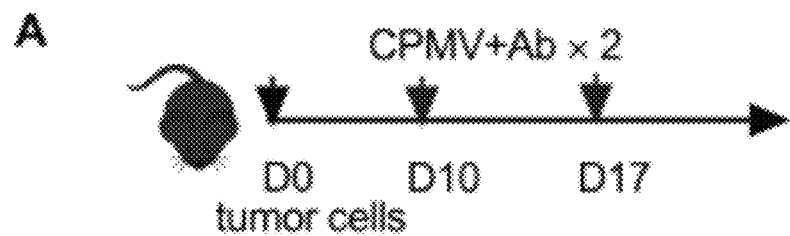
FIGS. 4(A-G) illustrate graphs showing combined CPMV and OX40 agonist treatment induces systemic antitumor effects in a B16F10 dermal melanoma model. A. Schematic of treatment strategy and dosing regimen. C57BL/6 mice were inoculated intradermally (i.d.) with $2.5\times10^5$ B16F10 cells on the right flank and followed by two doses (directly into the resulting tumor) of 100 µg antibody (PD-1 antagonist or OX40 agonist), 100 µg CPMV, the combination, or PBS as a control. B. Average tumor growth curve of mice receiving PBS (blue), PD-1 inhibitor (100 µg, red), OX40 agonist (100 µg, green), CPMV (100 µg, purple), CPMV+PD-1 inhibitor (orange), or CPMV+OX40 agonist (black). Data are means±SEM (n=3). Tumor growth over time was compared by two-way ANOVA with Tukey's test: ****p<0.0001, n.s. no significant difference. C. Survival rate of each treatment group. D. Survival curves of combination therapy groups following tumor re-challenge. Data are means±SEM (n=5 for control, n=2 for CPMV+OX40 agonist). E. Percentage of CD45+ leukocytes among total cells, the percentages of CD3+, CD4+ and CD8+ T cells among CD45+ cells, and the percentage of CD44$^+$CD62L$^-$ memory T cells among CD4+ and CD8+ T cell subsets. Data are means±SEM (n=3). Statistical significance was calculated by one-way ANOVA: * vs PBS; # vs CPMV; $ vs ICT (*p<0.05; p<0.01; *p<0.0005; **p<0.0001). F. Schematic of the T cell depletion strategy using a B16 dermal melanoma tumor model. G. Survival rate of each treatment group in the T cell depletion study. Data are means±SEM (n=4-5). Statistical significance was calculated using a log-rank Mantel-Cox test. p<0.01. ns: no significant difference.
Figure 4B:
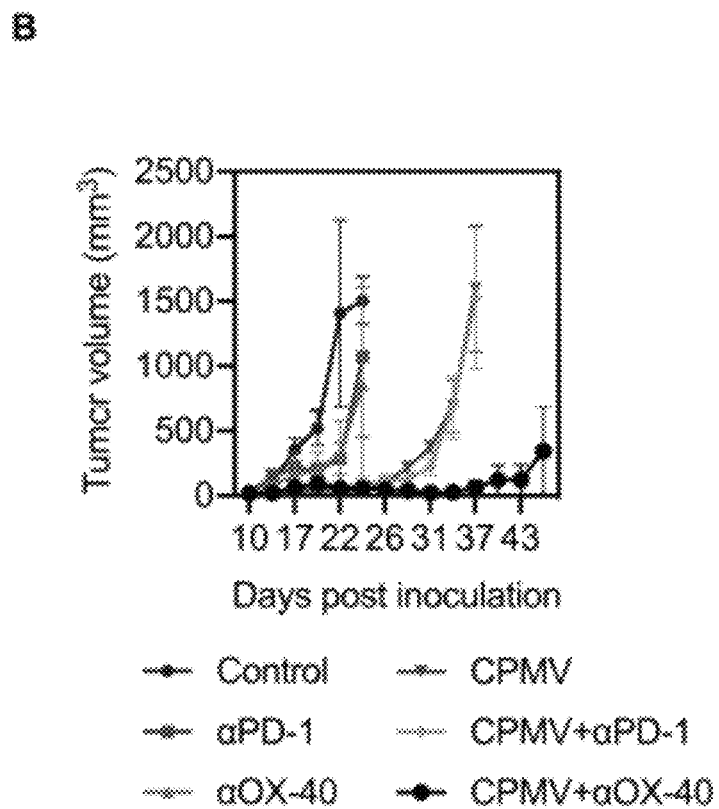
Figure 4C:
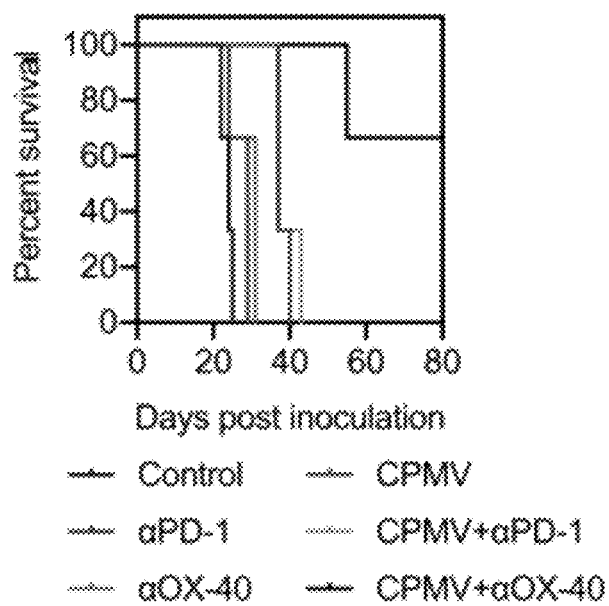
Figure 4D:
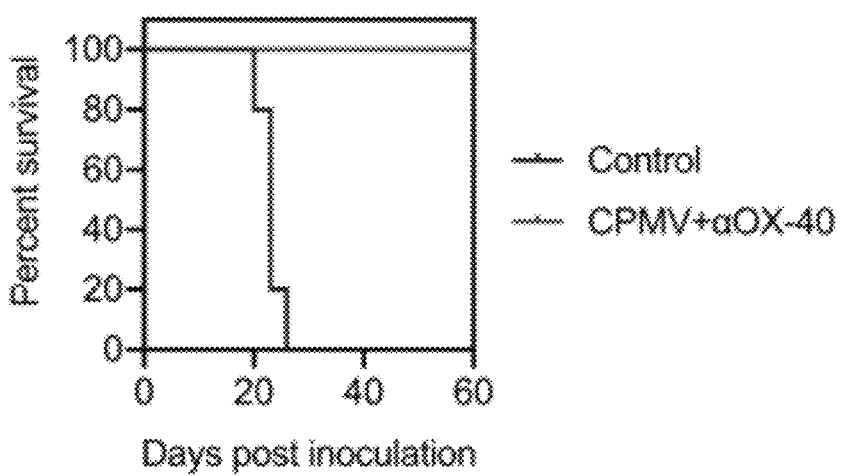
Figure 13A:
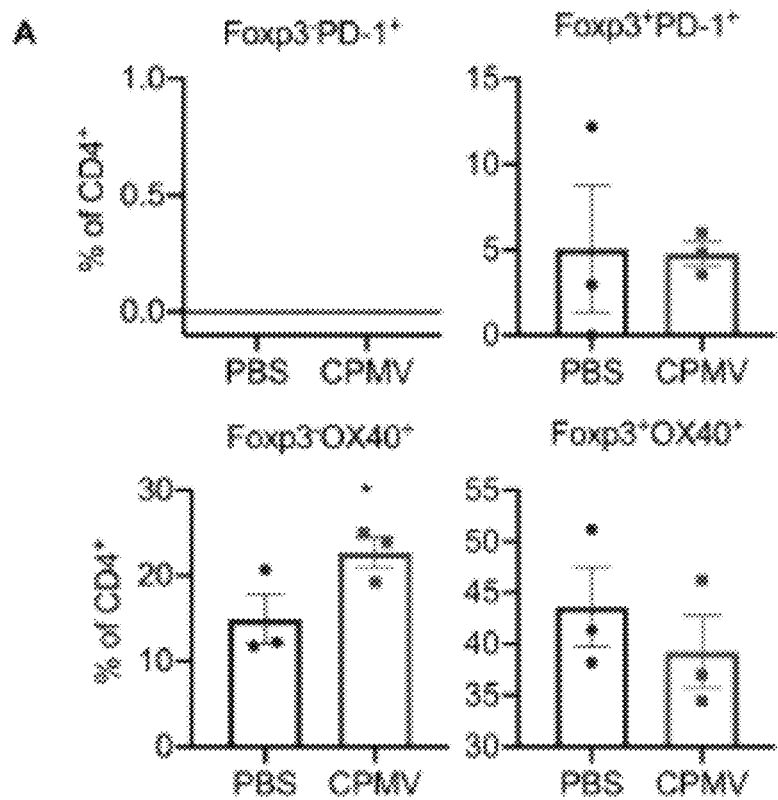
FIG. 13(A-C) illustrate expression of OX40 and PD-1 on CD8+ effector T cells from the microenvironment of B16F10 dermal melanoma. C57BL/6 mice were inoculated (i.d.) with $2.5\times10^5$ B16F10 cells followed by two injections of the OX40 agonist (100 μg), CPMV (100 μg), or both reagents into the tumor (10 and 17 dpi). Tumor tissues were collected 24 h after the second treatment. A-B. Percentage and representative FACS plots of PD-1 and OX40 expression on Foxp3− effector T cells and Foxp3+ regulatory T cells. C. Percentages of OX40+CD8+CD44+ and PD-1+CD8+CD44+ effector T cells. Data are means±SEM (n=3). Statistical significance was calculated using a paired t-test (*p<0.05, p<0.01, *p<0.0005).
Figure 13B:
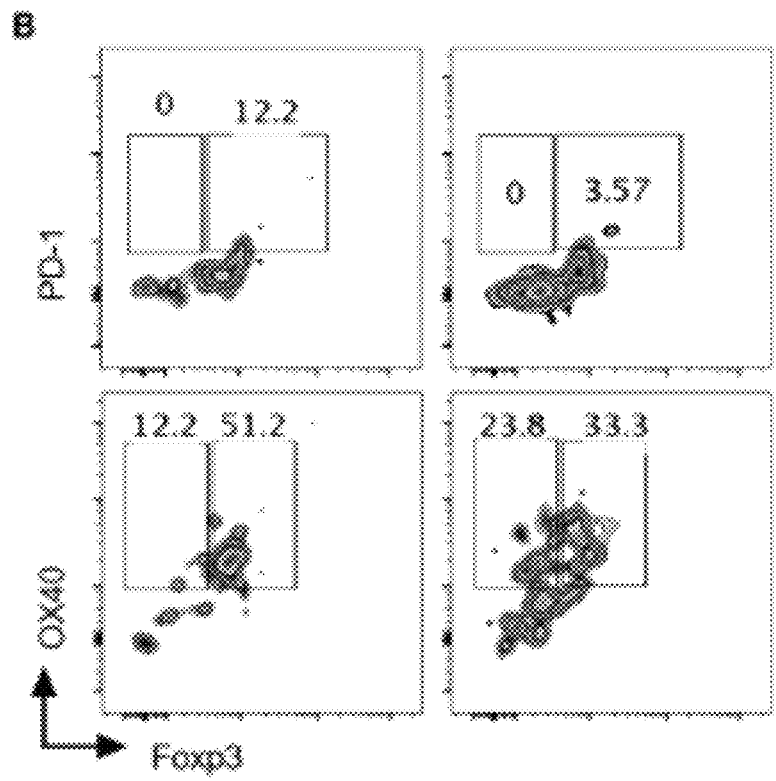
Figure 13C:
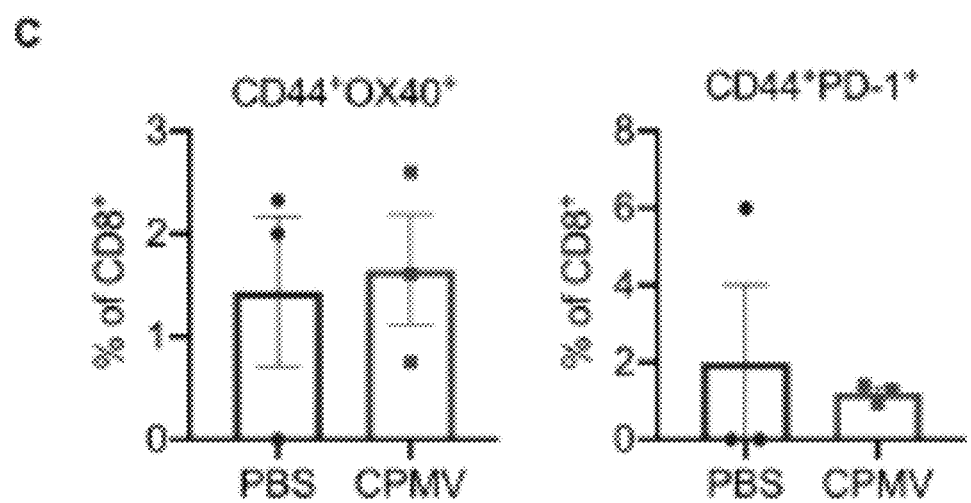
Figure 14:
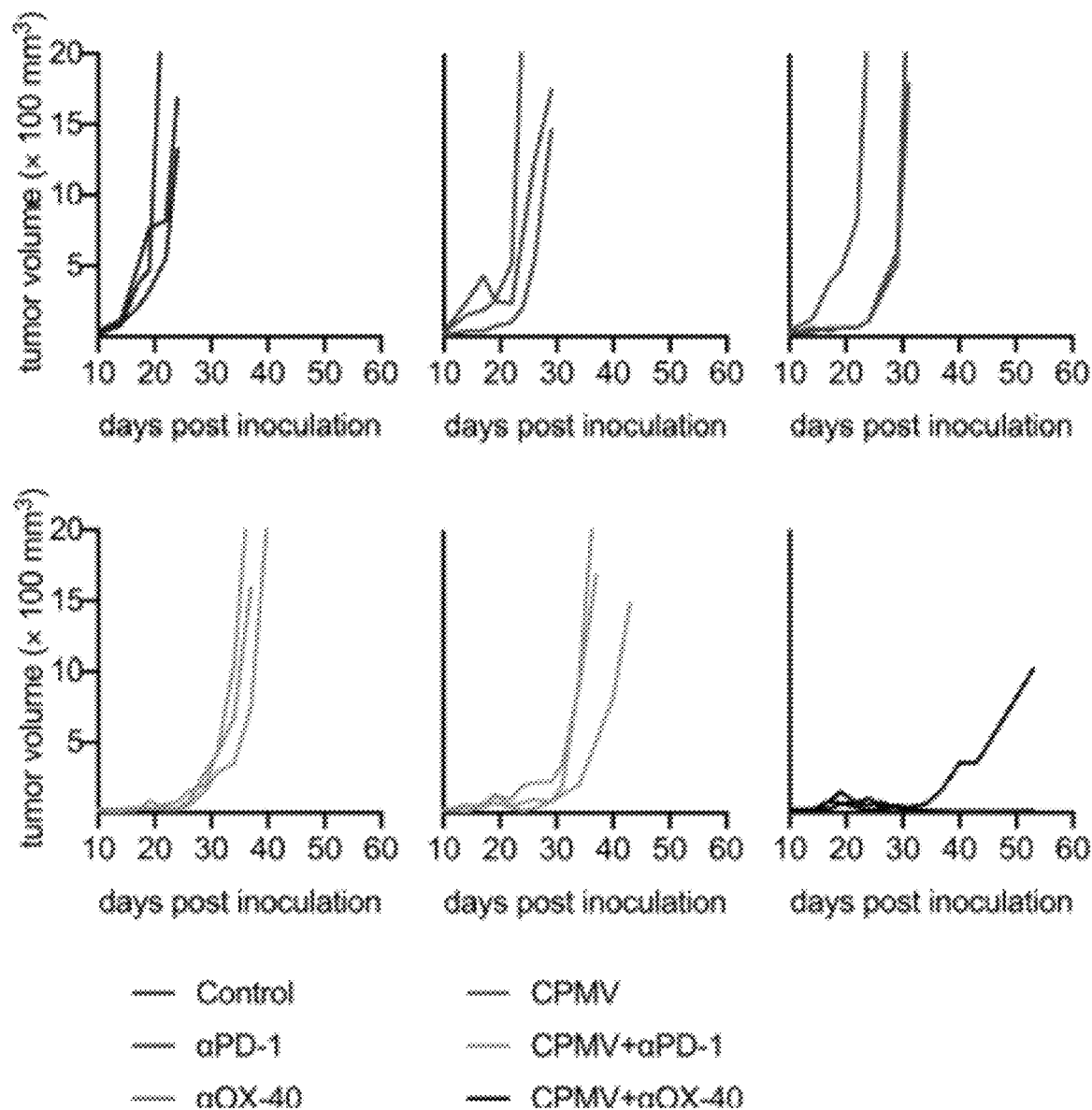
FIG. 14 illustrates tumor growth curve of individual mice in B16F10 dermal melanoma model. Mice were treated with PBS, PD-1 inhibitor (100 μg), OX40 agonist (100 μg), CPMV (100 μg), CPMV+PD-1 inhibitor, or CPMV+OX40 agonist.

Combined CPMV and OX40 Agonist Treatment Induces Profound Tumor Regression and Achieves Long-Term Survival in a B16F10 Melanoma Model To challenge our combination immunotherapy and selection strategy in an aggressive and immunosuppressive solid tumor model, we implanted $2.5 \times 10^5$ B16F10 melanoma cells intradermally (i.d.) in the flanks of syngeneic C57BL/6 mice, and administered CPMV monotherapy, antibody monotherapy (PD-1 inhibitor or OX40 agonist), combination therapy, or PBS as a control, with two doses injected directly into the tumor 10 and 17 dpi. We collected tumors from the mice on day 18 and phenotyped the T cells. We found that T cells from the PBS and CPMV monotherapy groups expressed similar levels of PD-1 and OX40 on effector CD8+ T cells, but Foxp3−CD4+ T cells from the CPMV monotherapy group were significantly more abundant compared to the PBS control (FIG. 13). Both antibody monotherapies delayed tumor growth and prolonged the survival of the animals to 31 dpi, whereas CPMV monotherapy and the combination of CPMV plus PD-1 inhibitor prolonged survival to 43 dpi. However, the combination of CPMV plus OX40 agonist prolonged survival to day 80. Notably, two of three treated mice in the latter group achieved complete tumor regression (FIG. 4B, C and FIG. 14) and these animals were fully protected against re-challenge with the same initial dose of B16F10 tumor cells (FIG. 4D).

Figure 4E:
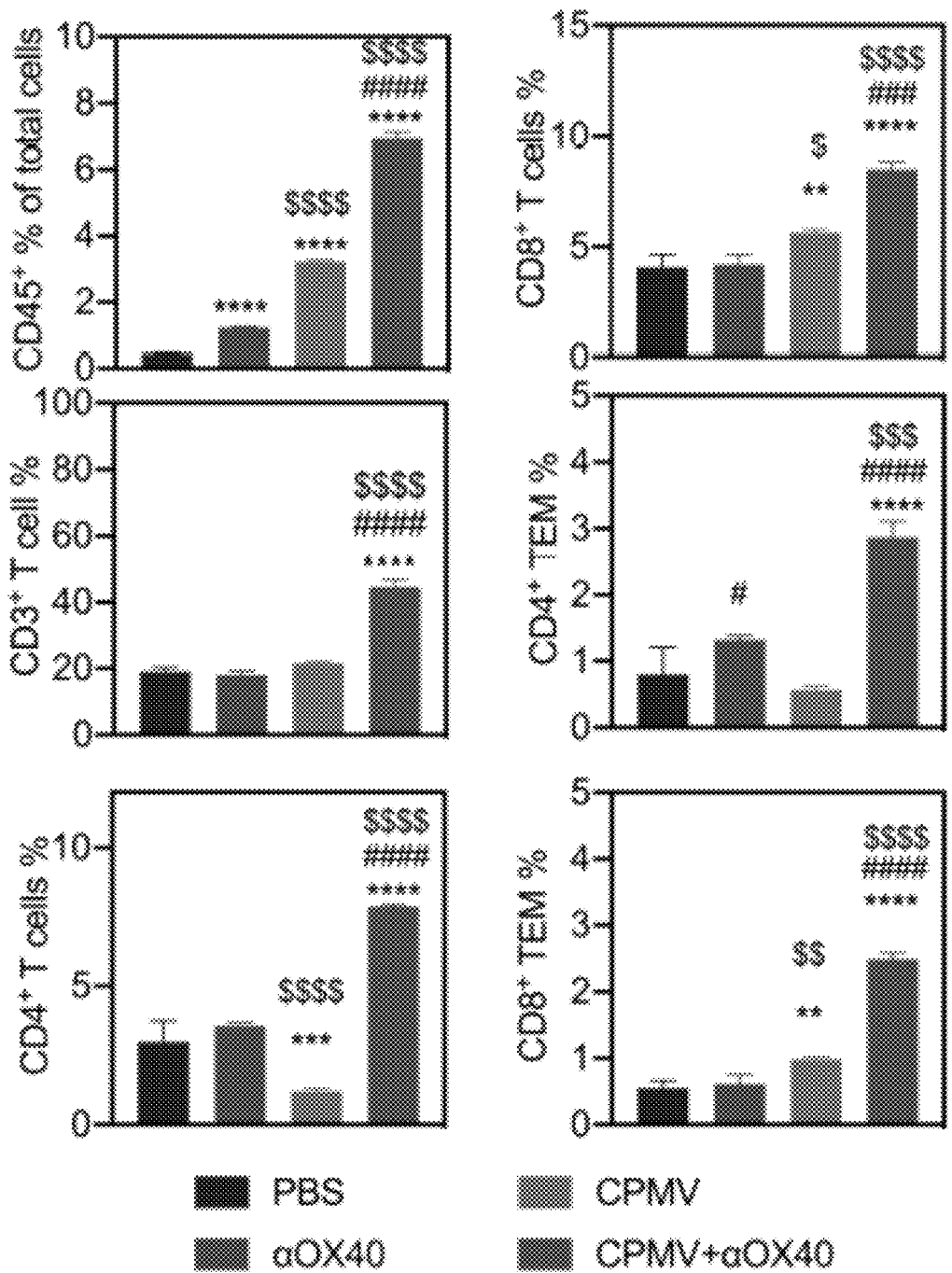
Figure 15A:
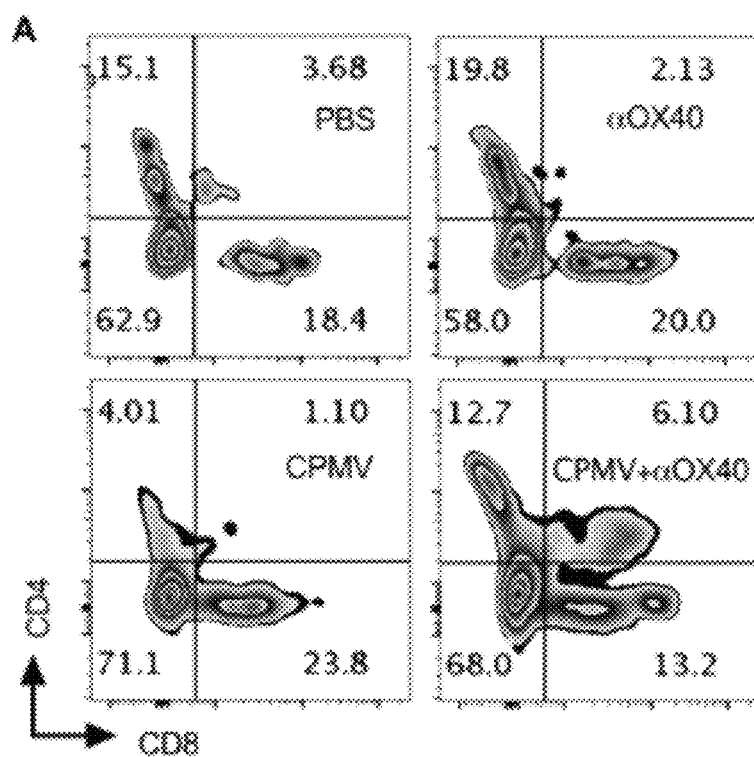
FIGS. 15(A-B) illustrate combined CPMV and OX40 agonist treatment induces the infiltration of lymphocytes in a B16F10 dermal melanoma model. A. Representative FACS plots of CD4+, CD4+CD8+, and CD8+T subsets gated on CD3+ T cells. B. Representative FACS plots of effector memory T cells in the CD4+CD8+ subset of T cells.
Figure 15B:
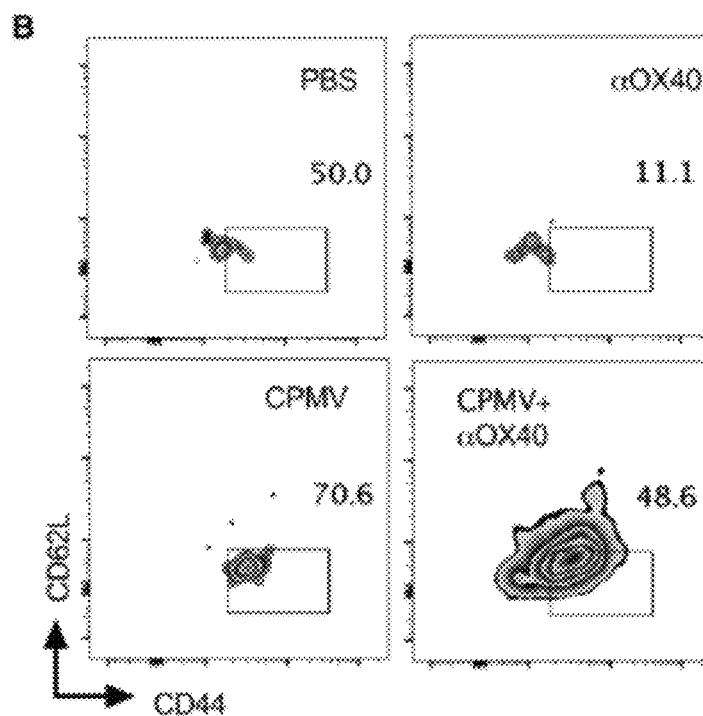

The total number of infiltrating leukocytes and lymphocytes in the tumors of the combination therapy groups were significantly higher than in the control group (15.8-fold for the CPMV plus OX40 agonist combination and 2.35-fold for the CPMV plus PD-1 inhibitor combination, FIG. 4E). Furthermore, tumor infiltration by CD4+ and CD8+ T cells (and their effector memory subsets) was significantly higher in the combination therapy groups compared to any monotherapy (FIG. 4E and FIG. 15). These results suggested that the CPMV plus OX40 agonist combination elicits a robust antitumor response and establishes effective long-term immunity in the B16F10 melanoma model by amplifying the CD4+ and CD8+ TIL populations.

Figure 4F:
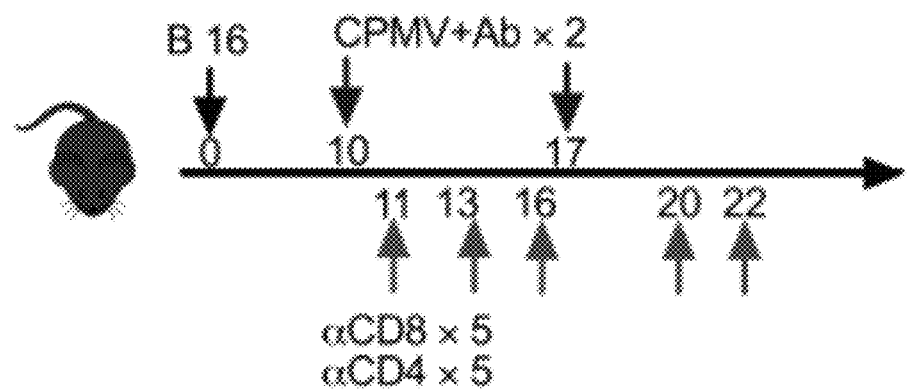
Figure 4G:
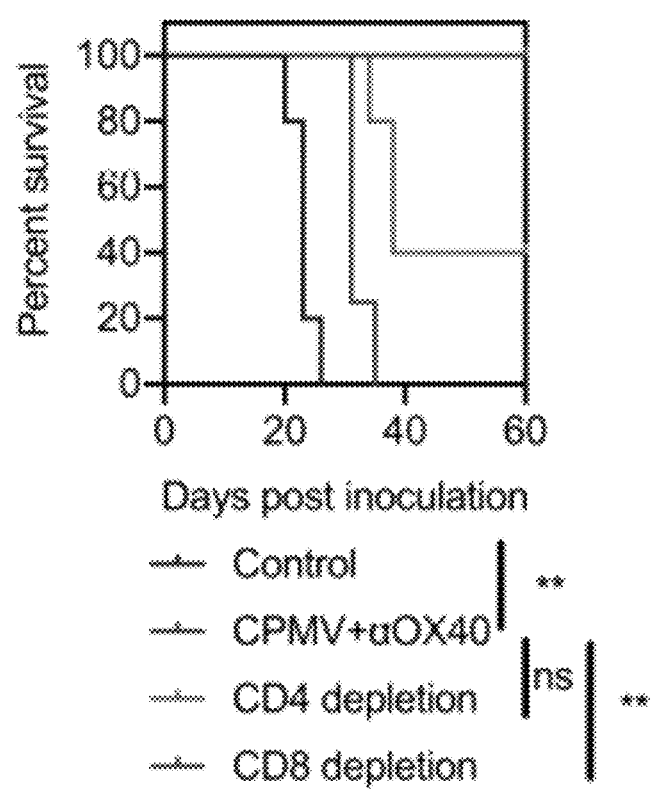
Figure 5:
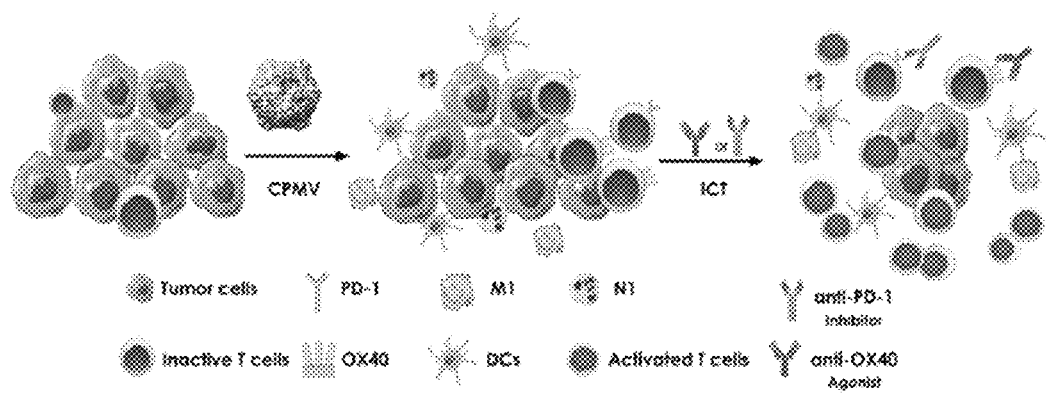
FIG. 5 illustrates a graphic showing an exemplary embodiment of a combination therapy including CPMV, an anti-PD-1 inhibitory antibody, and an anti-OX40 agonistic antibody described herein.
Figure 6A:
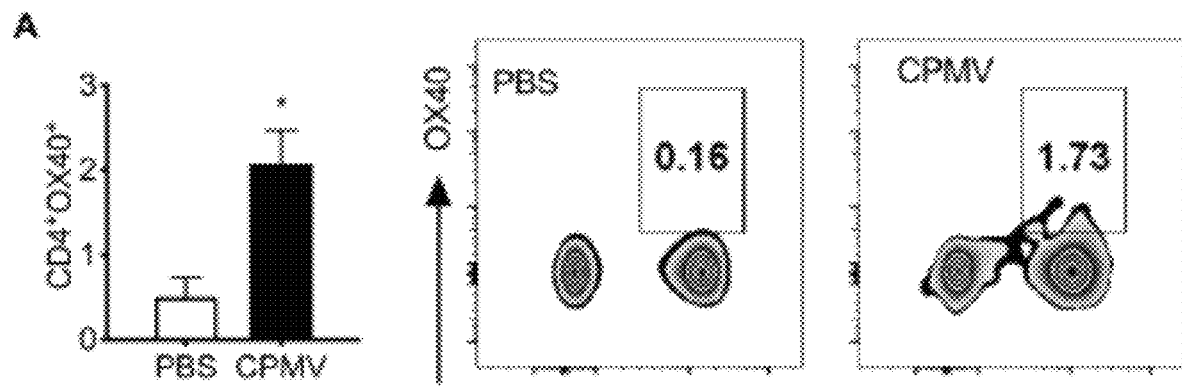
FIG. 6(A-D) illustrate CPMV induces the expression of OX40 and PD-1 on CD4+ T cells. C57BL/6 mice were inoculated (i.p.) with $2\times10^6$ ID8-Defb29/Vegf-A-luc cells. Tumor-bearing mice were injected (i.p.) with 100 µg CPMV (35 dpi) and peritoneal wash cells were collected 24 h later for analysis by flow cytometry. A-B. Percentages and representative FACS plots of OX40+CD4+(A) and PD-1+ CD4+ T cells (B) among CD3+ T cells. C-D. Percentages and representative FACS plots of Foxp3− effector T cell and Foxp3+ regulatory T cell subsets from OX40+(C) and PD-1+(D) gated on CD3+CD4+. Data are means±SEM (n=3). Statistical significance was calculated using a paired t-test (*p<0.05, p<0.01, *p<0.0005, ****p<0.0001).
Figure 6B:
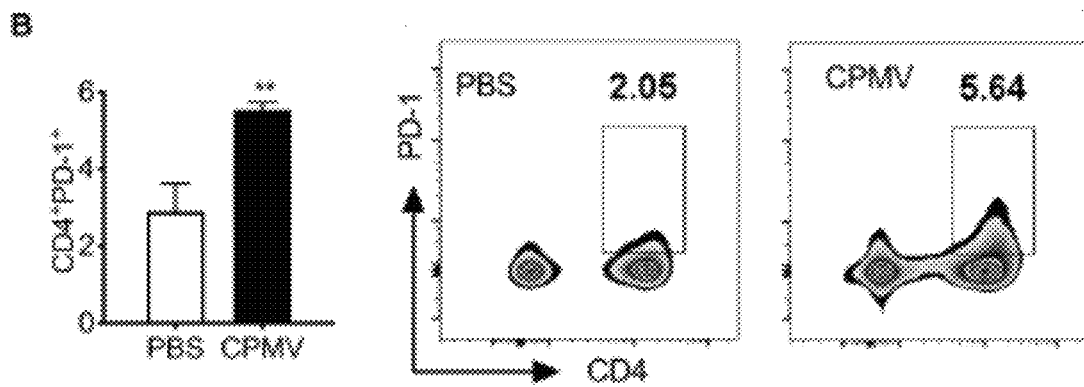
Figure 6C:
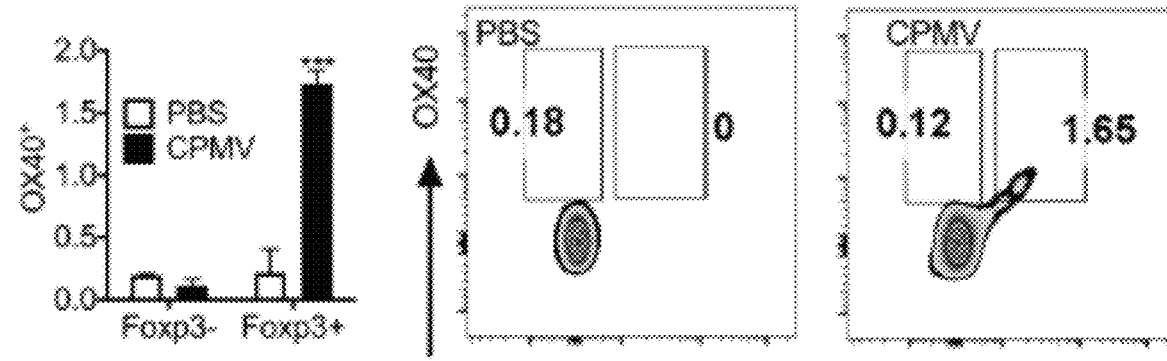
Figure 6D:
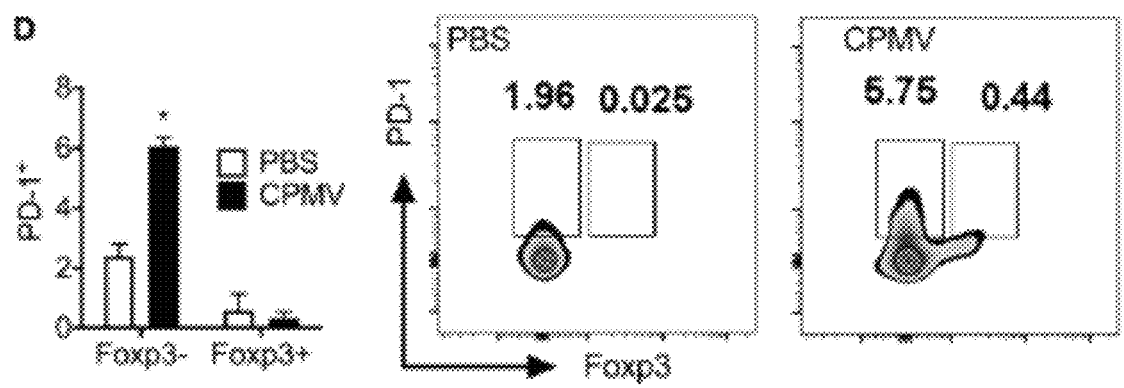

Finally, we conducted T cell depletion experiments to determine the functions of the infiltrated CD4+ and CD8+ T cells (FIG. 4F). Tumor growth was significantly faster in mice injected with a CD8-specific antibody than in mice receiving the combination treatment. However, two of the five mice injected with the CD4-specific antibody survived the tumor challenge (FIG. 4G). These results showed that the systemic antitumor response caused by CPMV and the OX40 agonist in the B16F10 melanoma model mainly required the presence of CD8+ T cells, with CD4+ T cells playing a lesser role. The B16F10 melanoma model therefore demonstrated that in situ vaccination with CPMV upregulated OX40 but not PD-1 expression on Foxp3 CD4+ effector T cells and the combination of CPMV and an OX40 agonist restored T-cell activation and achieved more potent antitumor effects than either ICT or CPMV alone.

In summary, we hypothesized that the upregulation of PD-1 and OX40 expression on CD4+ and CD8+ effector T cells following in situ CPMV vaccination would help to determine the most suitable ICT strategy, allowing different checkpoint-modulating drugs to be combined with CPMV for the treatment of different types of tumor. The in vivo therapeutic efficacy of the combination treatments we tested in this Example to confirmed this hypothesis.

In the ID8-Defb29/Vegf-A ovarian tumor model, single doses of CPMV upregulated PD-1 expression on Foxp3−CD4+ effector T cells whereas multiple doses upregulated both PD-1 and OX40. Combination therapy comprising CPMV plus a PD-1 inhibitor or OX40 agonist showed greater therapeutic efficacy than any monotherapy, but only the CMPV plus PD-1 inhibitor combination ensured 100% survival following a tumor re-challenge. The PD-1 inhibitor alone increased the population of IFNγ-secreting CD4+ T cells in peritoneal ascites while depleting the population of pro-tumor M2 macrophages, whereas CPMV monotherapy promoted the accumulation of both immunostimulatory and immunosuppressive cell types. M-MDSCs are immunosuppressive cells with characteristics of both M1 and M2 macrophages, but high doses of CPMV may promote their immunosuppressive behavior, contributing to tumor progression. In contrast, CPMV plus the PD-1 inhibitor not only limited the infiltration of immunosuppressive cell types, but also led to the accumulation of antitumor immune cells in peritoneal ascites, increasing the immunogenicity of the tumor microenvironment and boosting the therapeutic response. We previously showed that repeated doses of CPMV upregulated IFNγ secretion in the peritoneal cavity of ID8-Defb29/Vegf-A ovarian tumor-bearing mice, and this Th1 cytokine may increase PD-L1 expression on cancer cells. We therefore evaluated the levels of PD-L1 on tumor cells (CD45$^-$) in the ID8-Defb29/Vegf-A ovarian tumor microenvironment and showed CPMV alone significantly upregulated PD-L1 expression in cancer cells whereas CPMV plus the PD-1 inhibitor reduced PD-L1 expression by at least 50% compared to other groups. These results suggest that a PD-1-blocking antibody combined with CPMV could effectively counteract the immunosuppression elicited by solo CPMV treatments. Furthermore, a triple combination of CPMV with antibodies that block PD-1 and PD-L1 could extend the potent antitumor response against ID8-Defb29/Vegf-A ovarian cancer even further.

CPMV upregulated OX40 but not PD-1 expression on Foxp3−CD4+ effector T cells in the CT26 colon carcinomatosis and B16F10 melanoma models. The in vivo efficacy studies in both models confirmed that only the combination of CPMV plus the OX40 agonist significantly reduced the tumor burden and achieved better survival compared to monotherapy. This combination was also the only treatment that promoted the recruitment of antigen presenting cells (such as DCs, M1 and N1 cells) that subsequently triggered a T cell response. In addition, we observed that CPMV monotherapy exclusively increased the infiltration of CD8+ T cells but had a negligible effect on CD4+ T cells in both tumor models. In contrast, the OX40 agonist monotherapy promoted the infiltration of total CD4+ T cells and the level of IFNγ secreted by these cells was higher compared to other treatment groups. CD8+ cytotoxic T cells are thought to be critical for antitumor immunity, but CD4+ T cells are required to induce antitumor effects by supporting the activation and recruitment of CD8+ T cells. The combination therapy therefore incorporates the ability of OX40 activation to drive the proliferation of CD4+ T cells, including cytokine production and immune memory formation, and the ability of CPMV to convert the tumor microenvironment from a cold to a hot state, thus significantly enhancing the infiltration and activation of both CD4+ and CD8+ effector T cells and the attenuation of immunosuppressive cells. The synergistic effects of these processes lead to profound antitumor immunity.

Oncolytic virus immunotherapy is an attractive concept because oncolytic viruses replicate selectively within cancer cells, ultimately causing lysis and the release of tumor-associated antigens that induce antitumor immunity. In contrast, CPMV does not replicate within and kill cancer cells directly, and thus forms the basis of a novel class of immunostimulatory adjuvants. The antitumor effects of multiple doses of CPMV are attenuated by adaptive immune responses to the virus. In our experiments, this drawback was overcome by combining CPMV with appropriate checkpoint-targeting drugs, which achieved systemic antitumor immunity while reducing the number of CPMV doses required for therapeutic efficacy.

Thus, this Example shows that in situ CPMV vaccination upregulates the expression of at least two immune checkpoint regulators on CD4+ effector T cells in different tumor models. By selecting these checkpoint regulators as targets for ICT in combination with CPMV, the combined treatment recruits CD4+ and CD8+ immune cells and promotes their activation and antitumor potential. Furthermore, the combination therapy leads to tumor-specific immune responses against different cancers and induces long-lasting protection against tumor rechallenge.

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

What is claimed is:

1. A method of treating cancer in a subject, the method comprising administering in situ to the cancer of the subject a therapeutically effective amount of a cowpea mosaic virus or a cowpea mosaic virus-like particle in combination with administering an immune checkpoint therapy to the subject, wherein the cowpea mosaic virus and cowpea mosaic virus-like particles are not used as a vehicle for drug or antigen delivery.

2. The method of claim 1, wherein the immune checkpoint therapy comprises administering a positive or stimulatory immune checkpoint modulating agent to the subject.

3. The method of claim 2, wherein the positive immune checkpoint modulating agent is an OX40 (CD134) agonist.

4. The method of claim 3, wherein the OX40 agonist is an agonistic anti-OX40 monoclonal antibody.

5. The method of claim 1, wherein the immune checkpoint therapy comprises administering to the subject a negative or inhibitory immune checkpoint modulating agent.

6. The method of claim 5, wherein the negative or inhibitory immune checkpoint modulating agent is a programmed cell death protein 1 (PD-1) inhibitor.

7. The method of claim 6, wherein the PD-1 inhibitor is an inhibitory anti-PD-1 monoclonal antibody.

8. The method of claim 1, wherein the cowpea mosaic virus-like particle stimulates an anti-tumor response through recruitment of monocytes into a tumor microenvironment (TME), promotes signaling of the IFN-gamma pathway, and/or increase recruitment of tumor infiltrating neutrophils (TIN) and natural killer cells.

9. The method of claim 1, wherein the in situ administration of a cowpea mosaic virus or a cowpea mosaic virus-like particle to the cancer increases the expression of checkpoint regulators on Foxp3$^-$ CD4+ effector T cells in the tumor microenvironment.

10. The method of claim 1, wherein the in situ administration of a plant virus or virus-like particle to the cancer increases recruitment of tumor infiltrating lymphocytes (TILs) at a tumor site of the subject.

11. The method of claim 10, wherein the tumor infiltrating lymphocytes (TILs) are tumor infiltrating neutrophils (TINs).

12. The method of claim 1, wherein the administration of a cowpea mosaic virus or a cowpea mosaic virus-like particle and an immune checkpoint therapy increases tumor infiltration by antitumor neutrophils/macrophages, natural killer cells, and CD4+ and CD8+ effector T cells and inhibits immunosuppressive cells in the tumor microenvironment.

13. The method of claim 1, wherein the administration of a cowpea mosaic virus or a cowpea mosaic virus-like particle and an immune checkpoint therapy has a synergistic effect on the antitumor response of TILs at a tumor site of the subject.

14. The method of claim 1, wherein the cowpea mosaic virus or a cowpea mosaic virus-like particle and an immune checkpoint modulating agent are administered proximal to a tumor in the subject.

15. The method of claim 1, wherein the cowpea mosaic virus or a cowpea mosaic virus-like particle and an immune checkpoint modulating agent are administered to the subject by intratumoral injection.

16. The method of claim 1, wherein the cancer is selected from the group consisting of melanoma, colon cancer, and ovarian cancer.

\* \* \* \* \*